US012179091B2

(12) United States Patent
Anderson et al.

(10) Patent No.: US 12,179,091 B2
(45) Date of Patent: Dec. 31, 2024

(54) VIRTUAL AND REAL-WORLD CONTENT CREATION, APPARATUS, SYSTEMS, AND METHODS

(71) Applicant: NantG Mobile, LLC, Culver City, CA (US)

(72) Inventors: Shawn Semler Anderson, San Diego, CA (US); Matthew Wayne Geer, Ramona, CA (US); Jesse William Snyder, San Diego, CA (US); Michael E. Madden, III, San Diego, CA (US); John Wiacek, Los Angeles, CA (US); Jake Tyler Fyfe, Los Angeles, CA (US); Nicholas James Witchey, Laguna Hills, CA (US)

(73) Assignee: NantG Mobile, LLC

( * ) Notice: Subject to any disclaimer, the term of this patent is extended or adjusted under 35 U.S.C. 154(b) by 225 days.

(21) Appl. No.: 16/999,591

(22) Filed: Aug. 21, 2020

(65) Prior Publication Data

US 2021/0052976 A1    Feb. 25, 2021

Related U.S. Application Data

(60) Provisional application No. 63/014,977, filed on Apr. 24, 2020, provisional application No. 62/890,502, filed on Aug. 22, 2019.

(51) Int. Cl.
*A63F 13/216* (2014.01)
*A63F 13/211* (2014.01)
(Continued)

(52) U.S. Cl.
CPC .......... *A63F 13/216* (2014.09); *A63F 13/211* (2014.09); *A63F 13/212* (2014.09);
(Continued)

(58) Field of Classification Search
CPC .... A63F 13/216; A63F 13/211; A63F 13/212; A63F 13/217; A63F 13/52; A63F 13/816; G06F 3/011; G06F 3/04842; H04L 67/38
See application file for complete search history.

(56) References Cited

U.S. PATENT DOCUMENTS

| 8,682,879 B2 | 3/2014 | Kim et al. |
| 9,582,516 B2 | 2/2017 | McKinnon et al. |

(Continued)

FOREIGN PATENT DOCUMENTS

| EP | 2490182 | 8/2012 |
| WO | WO 2015/192117 | 12/2015 |

(Continued)

OTHER PUBLICATIONS

International Search Report and Written Opinion for International (PCT) Patent Application No. PCT/US2020/047364, dated Jan. 5, 2021 11 pages.

(Continued)

*Primary Examiner* — Yingchuan Zhang
(74) *Attorney, Agent, or Firm* — Sheridan Ross P.C.

(57) ABSTRACT

The present disclosure is directed to apparatus, systems, and methods to allow a user to create virtual and real-world game content to provide players with physically engaging virtual content that is anchored to real-world locations. A content creator is provided a set of "drag-n-drop" modular assets (e.g., encounter tiles, content tiles, creatures, chests, rooms, vehicles, etc.) that can be aggregated together to form a complete content set (e.g., a dungeon, level, puzzle, etc.) through which a player is able to engage the game via the real-world. Each individual modular asset may include a set of in-game challenge criteria that must be satisfied to complete an in-game challenge associated with the asset.

37 Claims, 36 Drawing Sheets

(51) Int. Cl.
  *A63F 13/212* (2014.01)
  *A63F 13/217* (2014.01)
  *A63F 13/52* (2014.01)
  *A63F 13/816* (2014.01)
  *G06F 3/01* (2006.01)
  *G06F 3/04842* (2022.01)
  *H04L 67/131* (2022.01)

(52) U.S. Cl.
  CPC ............ *A63F 13/217* (2014.09); *A63F 13/52* (2014.09); *A63F 13/816* (2014.09); *G06F 3/011* (2013.01); *G06F 3/04842* (2013.01); *H04L 67/131* (2022.05); *A63F 2300/1012* (2013.01); *A63F 2300/105* (2013.01); *A63F 2300/69* (2013.01); *A63F 2300/8005* (2013.01)

(56) References Cited

U.S. PATENT DOCUMENTS

| | | | |
|---|---|---|---|
| 9,925,462 | B2 | 3/2018 | Sakakibara |
| 9,996,976 | B2 | 6/2018 | Zhou et al. |
| 2005/0189715 | A1 | 9/2005 | Shideler et al. |
| 2009/0005140 | A1 | 1/2009 | Rose et al. |
| 2010/0164990 | A1 | 7/2010 | van Doorn |
| 2012/0122570 | A1* | 5/2012 | Baronoff ............... A63F 13/792 463/31 |
| 2015/0018094 | A1* | 1/2015 | Watari ................. A63F 13/355 463/31 |
| 2015/0109338 | A1* | 4/2015 | McKinnon ............ G06T 19/006 345/633 |
| 2016/0016083 | A1* | 1/2016 | Davis ................... A63F 13/216 463/5 |
| 2016/0078683 | A1 | 3/2016 | Sudol et al. |
| 2017/0176209 | A1 | 6/2017 | Ma et al. |
| 2018/0161624 | A1 | 6/2018 | Wrigg |
| 2018/0246562 | A1 | 8/2018 | Peterson |
| 2019/0019346 | A1 | 1/2019 | Cuthbertson et al. |
| 2019/0260703 | A1* | 8/2019 | Moskowitz ....... G06F 16/90324 |

FOREIGN PATENT DOCUMENTS

| | | |
|---|---|---|
| WO | WO 2018/074464 | 4/2018 |
| WO | WO 2018/148076 | 8/2018 |
| WO | WO 2018/224847 | 12/2018 |
| WO | WO 2019/079826 | 4/2019 |

OTHER PUBLICATIONS

Berry, et al., "The Augmented Composer Project: The Music Table," IEEE Computer Society, Proceedings of the Second IEEE and ACM International Symposium on Mixed and Augmented Reality, 2003, 2 pages.

International Preliminary Report on Patentability for International (PCT) Patent Application No. PCT/US2020/047364, dated Mar. 3, 2022 7 pages.

Official Action (with English translation) for Japan Patent Application No. 2022-512353, dated Apr. 18, 2023 9 page.

Green, et al. "Two-step Constructive Approaches for Dungeon Generation," arXiv:1906.04660v1, Cornell University, Jun. 11, 2019, 7 pages.

Extended European Search Report for European Patent Application No. 20855370.1, dated Jul. 24, 2023 12 pages.

Official Action (with English translation) for Japan Patent Application No. 2022-512353, dated Oct. 24, 2023 9 pages.

Official Action (with English translation) for Japan Patent Application No. 2022-512353, dated Feb. 13, 2024 4 pages.

Official Action for European Patent Application No. 20855370.1, dated Apr. 10, 2024 7 pages.

Official Action (with English translation) for Japan Patent Application No. 2022-512353, dated Jun. 26, 2024 13 pages.

Official Action (with English translation) for Korean Patent Application No. 10-2022-7009570, dated Apr. 4, 2024 29 pages.

\* cited by examiner

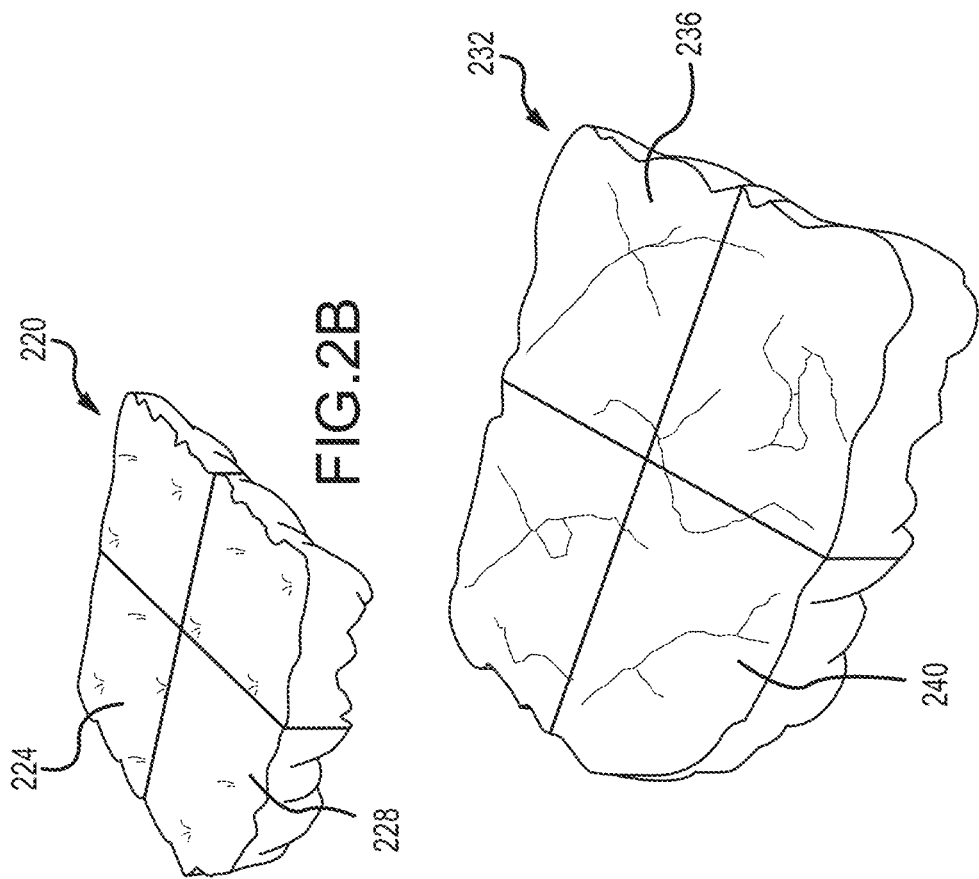

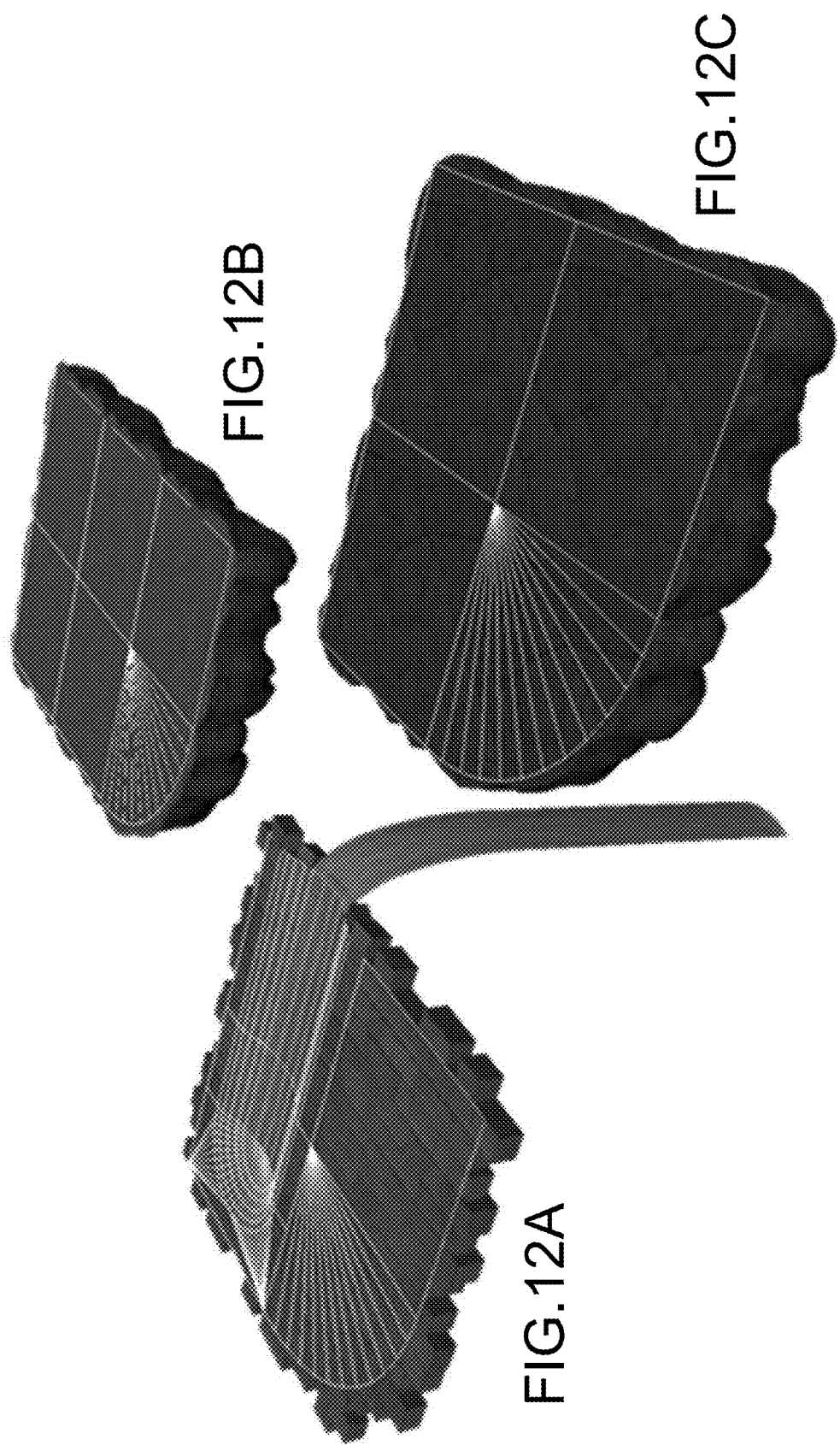

VIRTUAL AND REAL-WORLD CONTENT CREATION, APPARATUS, SYSTEMS, AND METHODS

CROSS-REFERENCE TO RELATED APPLICATIONS

This application claims priority to U.S. Provisional Patent Application Ser. No. 62/890,502, filed Aug. 22, 2019 and entitled "Virtual and Real-World Content Creation, Apparatus, Systems and Methods," and to U.S. Provisional Patent Application Ser. No. 63/014,977, filed Apr. 24, 2020 and entitled "Virtual and Real-World Content Creation, Apparatus, Systems and Methods," the entire disclosures of which are hereby incorporated herein by reference.

TECHNICAL FIELD

The present disclosure is generally directed to gaming. More specifically, the present disclosure is directed to apparatus, systems, and methods to allow a user to create virtual and real-world game content.

BACKGROUND

The background description includes information that may be useful in understanding the present inventive subject matter. It is not an admission that any of the information provided herein is prior art or relevant to the presently claimed invention, or that any publication specifically or implicitly referenced is prior art.

Location-based augmented reality (AR) games are growing in popularity. Such games require players to physically move toward a real-world location to play the game by engaging game content that is anchored at the real-world location. While in general many computer games offer access to tools or editors that allow content creators or other users to create new content for the game, typically referred to as "modding," such techniques often require fairly advanced computer skills. Only dedicated individuals willing to overcome the learning curve associated with such tools can and do create content.

There are numerous AR content development tools available. For example, U.S. patent application publication 2010/0164990 to Van Doom titled "System, Apparatus, and Method for Augmented Reality Glasses for End-User Programming," filed internationally on Aug. 15, 2006, describes an environment where an end-user programmer is able to visualize an ambient intelligent environment. Still, the end user must be technically astute in order to create desirable content. Another complex authoring tool is described in European patent application EP 2 490 182 to Ooi et al. titled "Authoring of Augmented Reality," filed Feb. 6, 2012. In the Ooi approach, an author must navigate complex menus and interfaces in order to create their desired content.

Further effort has been applied to toward providing access to AR content. For example, U.S. Pat. No. 8,682,879 to Kim et al. titled "Marker Search System for Augmented Reality Service," filed Apr. 16, 2010, describes a system where a search engine returns markers in response to a key word search. The markers can be identified by a device and, in turn, the device can obtain web content based on the marker. The content, an image for example, can then be superimposed on a display of the device. Although useful in accessing AR services, Kim still fails to provide insight into how a layperson can generate their own AR content with ease.

Even further progress is made by Berry et al. as described in the paper "The Augmented Composer Project: The Music Table" (Proceedings of the Second IEEE and ACM International Symposium on Mixed and Augmented Reality (ISMAR 2003)). Berry describes a system where users are able to learn about music through an AR system. The user creates patterns of cards and the AR system converts the patterns into musical phrases while also superimposing AR content on images of the cards. Unfortunately, the approach taken by Berry only leverages individual pieces of music bound to a card. Further the Berry approach does not provide for interactivity among the AR content. For example, the musical patterns generated by the cards are merely individual pieces of music played as the same time rather than inter-connectable functional elements through which more complex content can be created.

SUMMARY

Known games still lack the ability to allow players or other users to create content easily that also can fully engage players in the real-world from a physical, real-world perspective. Providing physically engaging virtual content is considered advantageous because this type of content would promote player health via physical interactions with the game content, promote player mental health via social interaction with other players, and create opportunities for further revenue streams.

Unfortunately, content creation tools are still outside the ability of non-skilled or non-technical users. Location-based computer games would ideally utilize easy-to-use methods or tools for non-technical individuals to create content for other people where the content can bind to the physicality of the real-world (e.g., to a physical object, to a physical real-world location, to a building, etc.).

Described herein are apparatus, systems, and methods to allow a user to create virtual and real-world game content. A content creator, or user, may be provided a set of "drag-n-drop" modular assets (e.g., encounter tiles, content tiles, creatures, chests, rooms, vehicles, treasures, devices, resources, spells, etc.) that can be aggregated together to form a complete content set (e.g., a dungeon, level, puzzle, mini-game, etc.) through which a player may be able to engage the game, whether virtually and/or via the real-world. The game content may be published to a game server to allow players to engage the game or to allow other content creators to augment the game content.

The present disclosure can provide a number of advantages depending on the particular configuration. These and other advantages will be apparent from the disclosure contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 2A is an example dungeon tile showing brick terrain and a water channel represented in a 2D isomorphic perspective in accordance with at least one embodiment of the present disclosure;

FIG. 2B is an example dungeon tile showing grass terrain represented in a 2D isomorphic perspective in accordance with at least one embodiment of the present disclosure;

FIG. 2C is an example dungeon tile showing rock terrain represented in a 2D isomorphic perspective in accordance with at least one embodiment of the present disclosure;

FIG. 12A is an example dungeon tile showing brick terrain and a water channel represented in a 2D isomorphic perspective in accordance with at least one embodiment of the present disclosure;

FIG. 12B is an example dungeon tile showing grass terrain represented in a 2D isomorphic perspective in accordance with at least one embodiment of the present disclosure;

FIG. 12C is an example dungeon tile showing rock terrain represented in a 2D isomorphic perspective in accordance with at least one embodiment of the present disclosure;

DETAILED DESCRIPTION

Figure 1:
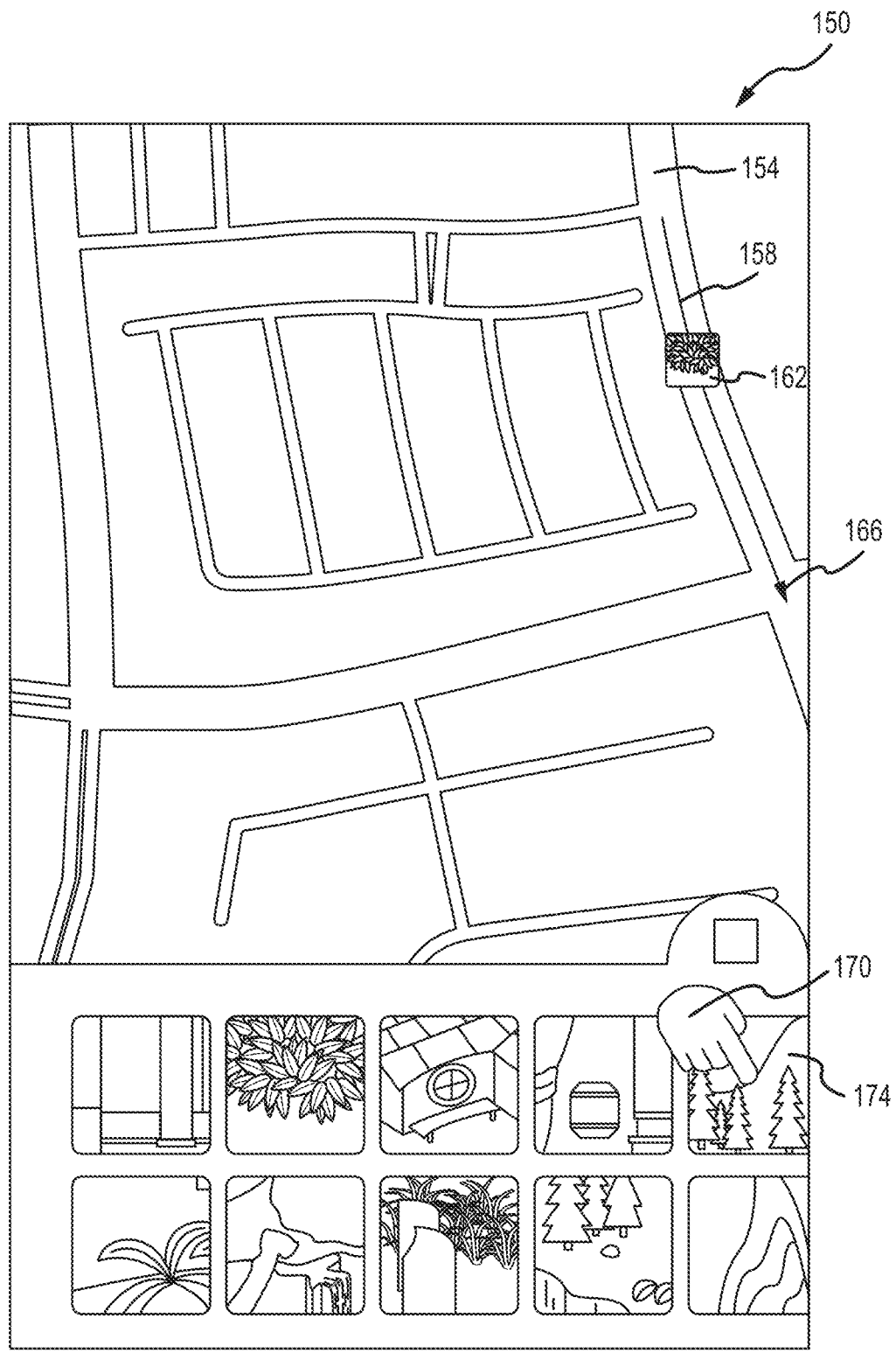
FIG. 1 is an illustration of placing encounter tiles on a game-view real-world map in accordance with at least one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present inventive subject matter. It is not an admission that any of the information provided herein is prior art or relevant to the presently claimed inventive subject matter, or that any publication specifically or implicitly referenced is prior art.

Embodiments of the present disclosure are generally directed to computer-based gaming, and more particularly, toward apparatus, systems, and methods to allow a user to create virtual and real-world game content. The game content can comprise various digital assets (e.g., textures, objects, software instructions, data structures, etc.) capable of existing in the memory of a computing device and/or executing on a processor.

A player is a person or entity playing a game, and a character is an in-game persona of a player. A content creator is a person or entity that uses modular assets to create an arrangement of game content (e.g., a dungeon encounter, a puzzle, etc.) that is engaged by the player. A user may be a player or a content creator person that engages with the tools or software to create content or play a game. An arrangement of content may also be autogenerated as a player plays a game, pre-generated prior to game play by a player, and/or a combination of autogenerated, pre-generated, and user created content.

A content creator, or user, may be provided a set of "drag-n-drop" modular assets (e.g., encounter tiles, content tiles, creatures, chests, rooms, vehicles, etc.) that can be aggregated together to form a complete content set (e.g., a dungeon, level, puzzle, mini games, etc.) through which a player may be able to engage the game, whether virtually and/or via the real-world. Each individual modular asset can include a set of in-game challenge criteria that must be satisfied to complete an in-game challenge associated with the asset. The in-game challenge criteria are defined in terms of attributes associated with the game (e.g., game level, points, damage, and/or the like). Further, the in-game challenge criteria can also be equated to or otherwise mapped to the physicality of the real-world as sensed via one or more sensors associated with the player (e.g., mobile device sensors and/or wearable device sensors including cameras, GPS receiver, accelerometer, gyroscope, magnetometer, proximity sensor, ambient light sensor, microphone, touchscreen sensors, pedometer, barcode reader, QR code sensor, air humidity sensor, barometer, heart rate sensor, thermometer, Geiger counter, etc.).

The following discussion is presented from the perspective of dungeon tiles. A dungeon tile represents a single gaming and/or challenge primitive and loosely represents a single gaming area unit; a single cell or room, for example. One or more dungeon tiles may be combined to form a dungeon tile arrangement. However, in some embodiments, the tiles may be blocks or having other dimensionality that can integrate or couple together. Although tiles are shown, it should be appreciated a tile is one type of modular asset. The disclosed subject matter also relates to other types of modular assets (e.g., characters, non-player characters, animals, ships, vehicles, monsters, objects, chests, doors, bridges, executable code, game events, game signals, a scene, AIs, etc.).

FIG. 1 is an illustration of placing encounter tiles on a game-view real-world map 150. As a content creator travels on the path 154, where the content creator has traveled is shown as line 158 and the current location is shown as arrow 166. Along the path, the content creator may place encounter tiles that a player may use to enter the encounter. For example, encounter tile 162 is placed along line 158. Using selection hand 170, the content creator may select an encounter tile 174 to place at the current location. Each encounter tile may be associated with a completed arrangement, and/or the content creator may create the content for the encounter tile after placing the encounter tile on the game-view real-world map 150. The game-view real-world map 150 may be associated with a real-world map corresponding to features (e.g., roads, trails, lakes, streams, buildings, parks, sports fields, art work, historical sites, significant weather sites, etc.) that a player may encounter while traveling in the real-world.

FIG. 2A is an example dungeon tile 200 showing brick terrain and a water channel represented in a 2D isomorphic perspective. Dungeon tile 200 comprises an arrangement of four content tiles, tiles 204, 208, 212, and 216. Content tile 204 is a square tile comprised of interlocking bricks, and content tile 208 is an arched convex tile comprising interlocking bricks with two arched convex sides and two straight sides, where the two straight sides interlock with adjacent tiles. An arched convex tile may also interlock with one or more arched concave tiles or may indicate one edge of the dungeon tile 200 that a player may not go past. The brick terrain of content tile 212 includes the start of a water channel, and the brick terrain of content tile 216 shows the continuation of the water channel to form a stream, creek, or river. When a content tile does not have a neighboring tile on a side having the end of a water channel, a waterfall may be displayed. When a character travels through a waterfall, the character may lose a life, may lose health points (e.g., debuff, aura, etc.), may exit the encounter, may be blocked from going further, or may experience other in-game consequences.

FIG. 2B is an example dungeon tile 220 showing grass terrain represented in a 2D isomorphic perspective. Dungeon tile 220 comprises an arrangement of four content tiles, including content tile 224 and content tile 228, each showing grass terrain. Content tile 224 is a square tile with a surface texture resembling grass. Content tile 228 is an arched tile having two arched convex sides and two straight sides, where the two straight sides interlock with adjacent tiles. As described in FIG. 2A, an arched convex tile may also interlock with one or more arched concave tiles, may represent an edge of the dungeon tile 220, or may be connected to another portion of the dungeon tile 220 via a bridge.

FIG. 2C is an example dungeon tile 232 showing rock terrain represented in a 2D isomorphic perspective. Dungeon tile 232 comprises an arrangement of four content tiles, including content tile 236 and content tile 240, each showing rock terrain. Content tile 236 is a square tile with a surface texture resembling interlocking rocks. Content tile 240 is an arched tile having two arched convex sides and two straight sides, where the two straight sides interlock with adjacent tiles. As described in FIGS. 2A and 2B, an arched convex tile may also interlock with one or more arched concave tiles, may represent an edge of the dungeon tile 232, or may be connected to another portion of the dungeon tile 232 via a bridge.

Figure 3A:
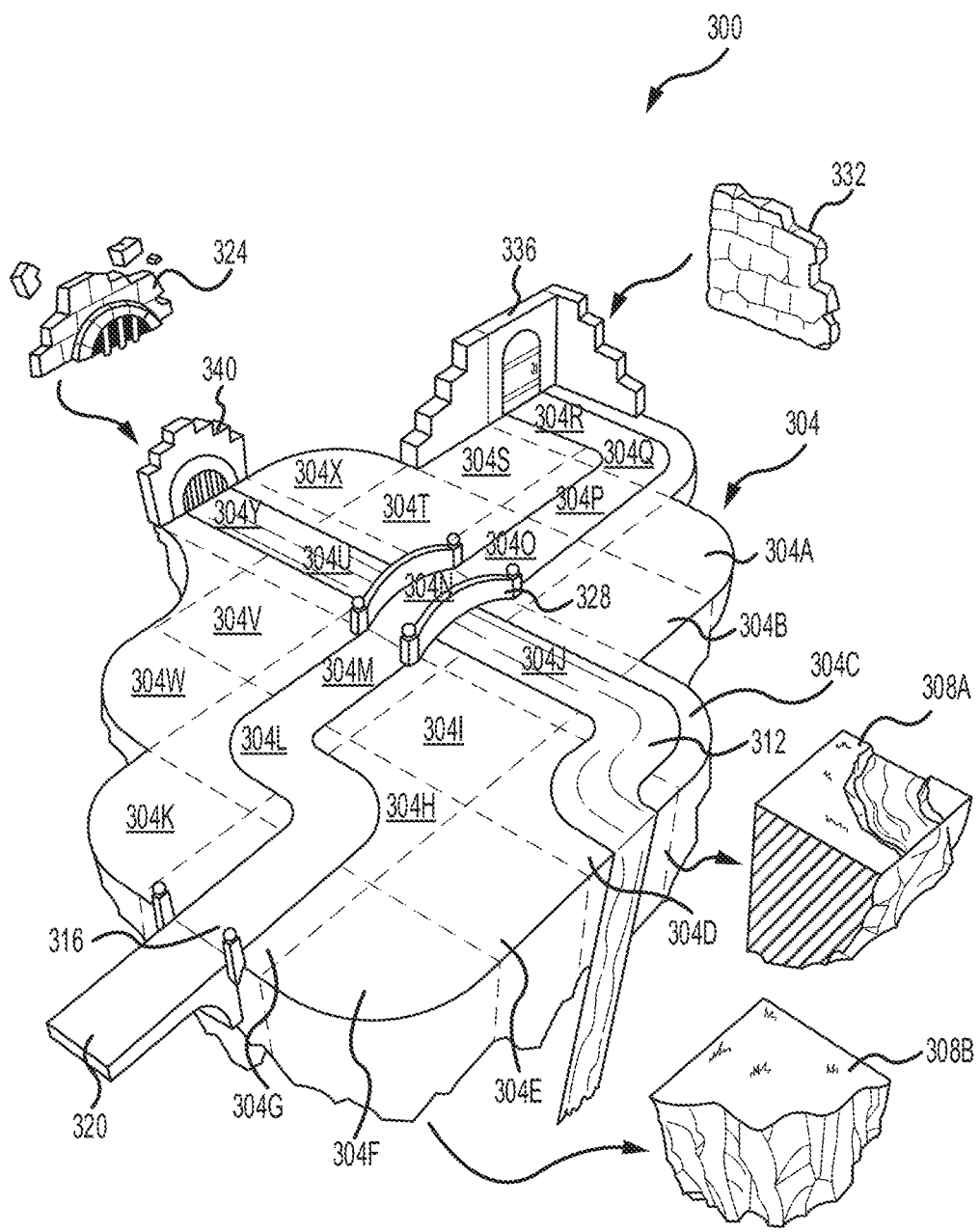
FIG. 3A is an illustration of a mockup of a dungeon tile arrangement in accordance with at least one embodiment of the present disclosure.

FIG. 3A is an illustration of a mockup of a dungeon tile arrangement 300. Dungeon tile arrangement 300 provides a further illustration of how multiple dungeon tiles can be combined into a larger encounter as represented by a dungeon tile arrangement. Each tile or block can be placed next to one or more neighboring tiles forming an aggregated set. Dungeon tile set 304 includes content tiles 304A through 304Y. Content tile 308A of a river bend is a rendering of content tile 304D, and content tile 308B of an edge tile is a rendering of content tile 304F. Other modular assets include water 312, path 316, gates 320 and 336, and bridge 328. Water 312 may be a creek, stream, river and/or the like that a player may cross by using bridge 328, swimming, jumping, using a boat, or otherwise. Further, crossing water 312 may require a certain skill (e.g., swimming, jumping, toughness, etc.) and/or one or more certain assets (e.g., a boat, rope, etc.). Similarly, crossing the bridge 328 may require fighting a monster 374, as shown in FIG. 3B, or engaging a non-player character 357, as shown in FIG. 3D.

The gate 320 may represent the entrance, or ingress, into the dungeon tile arrangement 300, and gate 336 may represent the exit, or egress, from the dungeon tile arrangement 300. The rendered wall 332 is the wall shown on tile 304R and attached to gate 336. The water source 340 is rendered in water source 324. The water source 340 may prevent the user from leaving or may represent a puzzle that the player must solve to use water source 340 as an exit. An exit may allow the player to return to a world-view map, such as the game-view real-world 150.

Figure 3B:
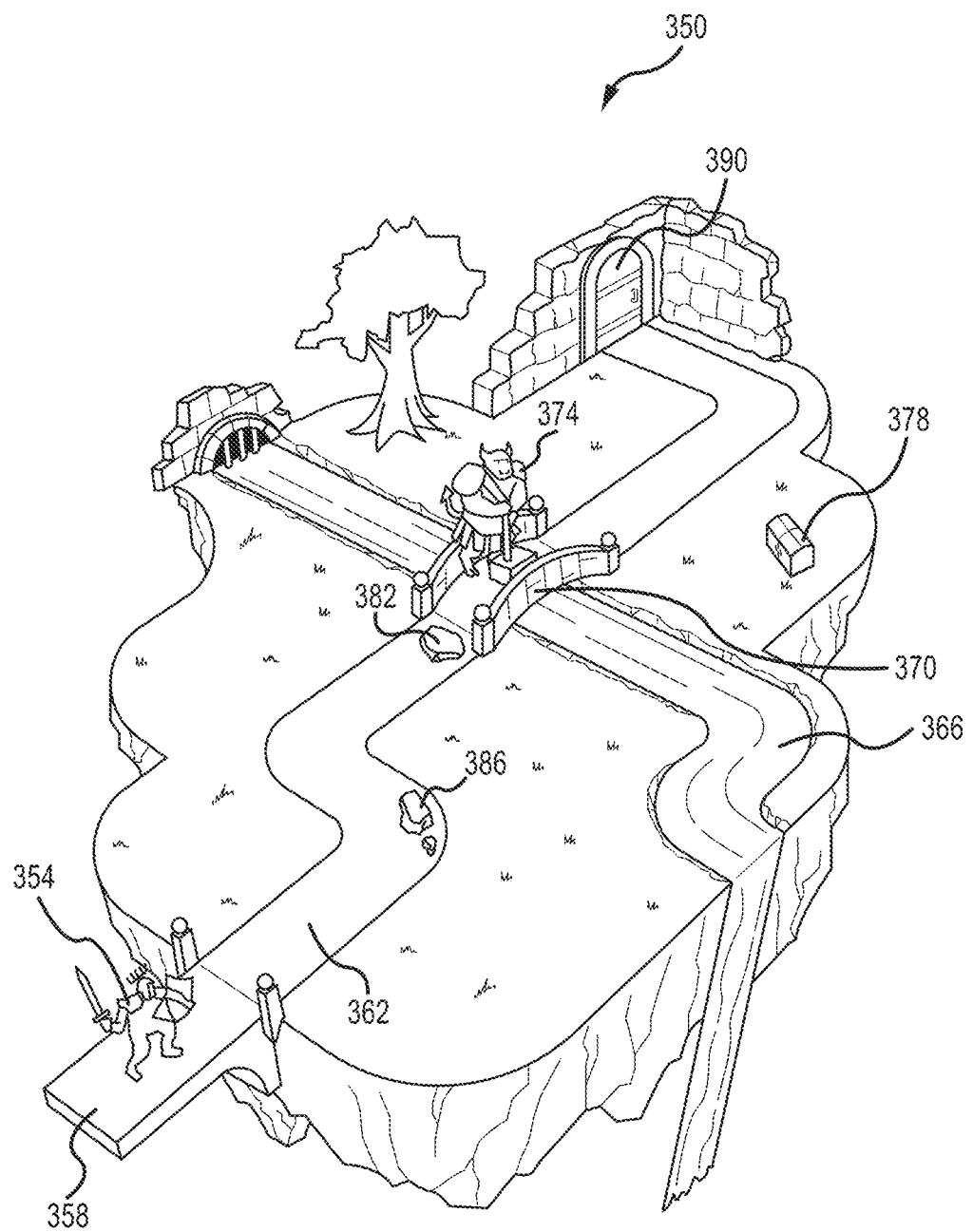
FIG. 3B is a rendered tile arrangement including a path, water, character, monster, trap, gates, bridges, and chest in accordance with at least one embodiment of the present disclosure.

FIG. 3B is a rendered tile arrangement 350 including a character 354, a path 362, water 366, a monster 374, a fight location 382, a trap 386, gates 358 and 390, a bridge 370, and a chest 378. The rendered tile arrangement 350 may be a rendering of the mockup dungeon tile arrangement 300, including additional modular assets. The rendered tile arrangement 350 illustrates a possible rendering of a final dungeon tile arrangement and modular assets in preparation for presentation to a player, and illustrates a more advanced arrangement of tiles having combat elements. This arrangement also includes a monster 374 and illustrates a possible form of combat. The trap 386 may present a puzzle, riddle, challenge, or other obstacle for the player to engage before continuing on the path 362. The fight location 382 may indicate proximity to the bridge 370, e.g., may be or correspond to a trigger that, when reached by a character, requires a player to engage the monster 374.

The gate 358 may be the entrance to the rendered tile arrangement 350 from the world-view map. The gate 390 may represent the exit, or egress, from the rendered tile arrangement 350. The exit may allow a player to return to the game-view real-world map 150 or may allow a player to travel to another level of the game.

Figure 3C:
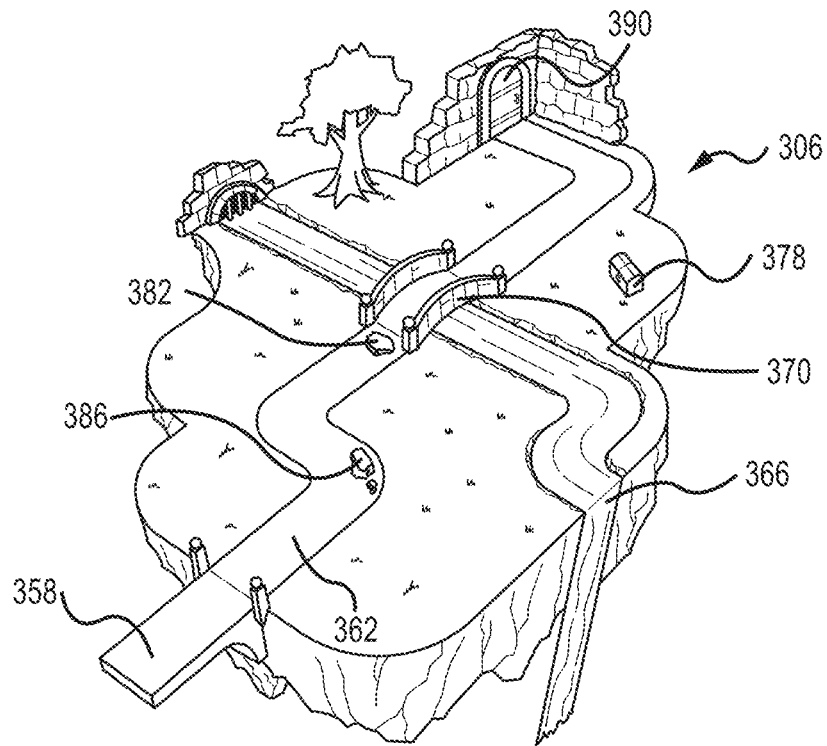
FIG. 3C is a rendered tile arrangement including a path, water, trap, gates, bridges, and chest in accordance with at least one embodiment of the present disclosure.
Figure 3D:
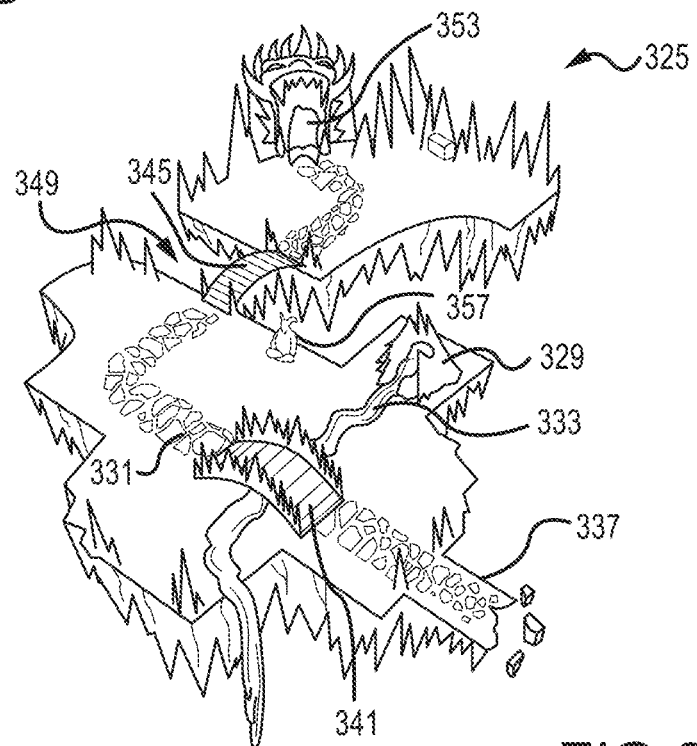
FIG. 3D is a rendered tile arrangement including a path, lava, gates, and bridges in accordance with at least one embodiment of the present disclosure.

FIG. 3C is a rendered tile arrangement 306 including a path 362, water 366, gates 358 and 390, bridge 370, chest 378, and trap 386. Illustrates how the disclosed tile arrangement can be used to create different instance encounters by changing the textures, content of each tile, or arrangements of the tiles for deployment or publishing in a game. The trap 386 may present a puzzle, riddle, or other obstacle for the player to engage before continuing on the path 362. The fight location 382 may indicate proximity to the bridge 370, and when reached by a player's character may trigger some in-game event.

The gate 358 may be the entrance to the rendered tile arrangement 350 from the world-view map. The gate 390 may represent the exit, or egress, from the rendered tile arrangement 350. The exit may allow a player to return to a world-view map, such as the game-view real-world map 150, or may allow a player to travel to another level of the game.

FIG. 3D is a rendered tile arrangement 325 including a volcano 329, path 331, lava 333, gates 337 and 353, and bridges 341 and 345. Bridge 341 allows a player to cross the lava 333 that flows from the volcano 329, and bridge 345 allows a player to cross from one portion of the dungeon encounter to another portion that are separated by the gap 349. The lava 333 is an obstacle similar to a river but may require a different skillset to cross (e.g., swimming may not be sufficient, but jumping or boating may be sufficient). A non-player character 357 may provide advice, or may represent a puzzle or riddle. The gate 337 may be the ingress and the gate 353 may be the dungeon encounter's egress.

The gate 337 may be the entrance to the rendered tile arrangement 325 from the world-view map. The gate 353 may represent the exit, or egress, from the rendered tile arrangement 325. The exit may allow a player to return to a world-view map, such as the game-view real-world map 150, or may allow a player to travel to another level of the game.

In the examples presented in FIGS. 3A-3D, there are several notable features that represent a challenge to a player. The main features of note include: a path (e.g., the path 316, 331, or 362), a river (e.g., the river of water 312 or 366, or the river of lava 333), a monster 374, a locked door (e.g., the gate 336, 353, or 390), and a locked chest (e.g., chest 378). For the sake of discussion, each of these features represent a challenge to the player, although in some embodiments one or more features may not represent a challenge to the player, and also in some embodiments one or more of the challenges may be optional. Other features corresponding to in-game challenges may also be provided. The path, for example, is a simple challenge as the player's character (e.g., character 354) merely needs to traverse the path. The river represents a more challenging aspect of the dungeon that might challenge the player further by requiring the character 354 to have a swim skill, a jump skill, or a boat asset; otherwise, the character 354 attempting to cross the river other than via a bridge (e.g., the bridge 328, 341, 345, 358, or 390) might virtually drown or get washed away. The monster 374 would likely be the most challenging feature in the dungeon and might require the player to defeat the monster 374 in combat. A door (e.g., the gate 336, 353, or 390), a rock (e.g., trap 386), and a chest 378 might be traps where the player might have to detect the trap, disarm the trap, then unlock or lock pick the locks.

In each of these cases, the challenge criteria for each feature have been described in terms of in-game attributes: moving the character 354, character swimming skill, character lock picking skills, character combat kills, in-game time, in-game movement, and/or the like. However, according to the techniques and inventive subject matter disclosed herein, the satisfaction of these challenges can also be mapped or otherwise correspond to real-world features or activities associated with the player and/or associated with the real-world environment coupled or bound with the game.

Consider the path, for example, with an entrance (e.g., the gate 320 or 358) starting in the lower left corner of the arrangement and an exit at the door (e.g., the gate 336 or 390) in the upper left corner of FIGS. 3A-C, and with an entrance (e.g., the gate 337) starting in the lower right corner of the arrangement and an exit at the door (e.g., the gate 353) in the upper left corner of FIG. 3D. From an in-game perspective, the challenge criteria (sans monster 374) might just require the player to move the character 354 from start to finish, which would take a time corresponding to the speed of movement of the character 354 in the game. From a real-world perspective, each tile section of the path might have corresponding real-world challenge criteria. The starting point for example, might require player to be physically located at a real-world coordinate (e.g., longitude and latitude, S2 cell identifier, zip code, street crossing, relative position to other real-world features, orientation, etc.) as determined by a GPS sensor in a player's cell phone or other mobile device (e.g., mobile device 504, etc.). Such a physical real-world requirement enables the player to initiate the encounter. The aggregated path length (the sum of each tile's path length) might require the player to walk (or run) an equivalent or correlated distance in the real-world, again, as sensed based on the movement of the player's mobile device or based on obtained corresponding sensor data. Still further, to complete the challenge of the path, the player might have to stop physical movement at a second real-world location. With respect to deployment, the first and second real-world locations may map to an entrance and exit to a jogging trail, for example.

Turning to the river, there are also a number of interesting in-game attributes that may be mapped to real-world challenge features. For example, the current of the river and its length may be mapped to a real-world hill that requires a player to run up the hill (i.e., swim against the current) in a certain amount of time; a requirement based on a sensed change in elevation via a sensor, for example. To traverse the river, there might be a joint requirement that the player's character 354 have an in-game swimming skill (i.e., at least one in-game criterion) and that the player physically cross a real-world river (i.e., at least one real-world criterion) by walking or running over bridge. In some embodiments, a water-proof wearable device (e.g., wearable device 556, a Fitbit®, an Oura® ring, a Garmin® Foot Pod, a Moov Now® Ankle Fitness Tracker, an iFit® Wireless Heart Rate Monitor, etc.) may be utilized to track a player's motion as the player actually swims in a pool or other body of water (e.g., the water 312 or 366), which actual swimming may correspond to swimming across the river in the game. Thus, the challenge criteria, both in-game and real-world, must be met to ford or cross the river in this example. For purposes of the present disclosure, one wearable device or multiple wearable devices, each including one sensor or multiple sensors, may be used by a player to influence or impact engagement with challenge tiles. The wearable devices may be devices worn around the head, foot, leg, waist, chest, hand, or other portions of the body.

Interestingly, the approach of mapping game features to real-world features, in this case water features, affords some opportunities from a revenue generation perspective. With respect to the river, the real-world challenge criteria might require a player to be located within or on a body of water near a boat rental. The boat rental company may sponsor the challenge. The player may rent a boat, possibly based on a discount obtained based on proof-of-play (e.g., presentation of a quick response (QR) code link to the rental company's website, etc.), and then spend time on the body of water. The rental company would generate revenue from the rental and the game company would generate revenue from the rental company due to the sponsored challenge.

Now consider the door and chest 378 where both are considered trapped and locked. Assuming the player's character 354 has detected the traps (e.g., an in-game skill check, etc.), to disarm the traps the player might have to complete one or more real-world challenges. Again, using one or more mobile device sensors the player might be required to run a set distance in a certain amount of time or otherwise engage in one or more physical activities. Alternatively, the player might have captured an image of a specified object, for example, a sponsored product (e.g., a Starbuck® logo, a can of Coke®, a toy, collectible card, an action figure, etc.). Once the trap has been appropriately dealt with, the player might be offered another physical challenge to overcome in order to pick the lock. The physical challenge might include moving the player's mobile device through a prescribed set of motions as sensed by an accelerometer in the device. If the player's movements match the lock's required accelerometer data signature, the lock is considered picked. Further, the in-game lock picking skill may be brought to bear in terms of matching to the lock's required signature. If the character's 354 skill is low, the match requirements might be strict requiring a tight tolerance to the set signature. If the character's 354 skill is high, the match requirements may be lessened so that the sensed signature requires less tolerance in order to match the real-world challenge signature criterion.

The monster 374, likely the most challenging feature of the dungeon encounter, has numerous opportunities to map challenge criteria to the real-world. First, the monster 374 might be able to move and chase the character 354, which may require the player to physically run away. Second, combat with the monster 374 may require that sensed health metrics of the player, heart rate for example, change by a desired amount. For example, if the player increases his or her heart rate by 10% for 30 seconds as sensed by a fitness sensor (e.g., Fitbit®, Apple Watch, Garmin Vivoactive, and/or the like), then the player's character 354 may land a strike on the monster 374. Third, the player might be required to move his or her mobile device according to specific motions, much like the lock picking example presented above, to initiate a combat strike or cast a spell. Naturally, there are quite a few other possible approaches that may map in-game challenges to real-world criteria, all of which are encompassed within the scope of the present disclosure. Thus, one should appreciate that a mapping from the in-game challenge criteria to real-world challenge criteria can take on many different forms and does not have to be a one to one mapping or a mapping having the same modality of challenge. For example, an in-game swimming challenge does not necessarily have to map to a real-world swimming challenge, but rather could map to a running challenge, a walking challenge, a home repair challenge, mowing the lawn, or other non-swimming modalities.

Regardless of the nature of the in-game challenge, the corresponding real-world criteria can be defined in terms of sensor data obtained from the real-world via one or more sensors. The sensor data can represent nearly any sensed data modality including acceleration data, movement data (e.g., IMU, etc.), location data (e.g., GPS, differential GPS, and/or other location information, including combinations of cell tower signals, wireless internet signals, Bluetooth® sensors, IP addresses, network environment data, and/or the like), image data, video data, temperature data, biometric data, elevation data, stress or strain data (e.g., mechanical properties, etc.), magnetic data, audio data, chemical data, wireless/networking data, olfactory data, radar data (e.g., Infineon® XENSIV™ 60 GHz radar chip, etc.), rates of change in data, higher order derivatives of data, or any other types of sensed data across a broad spectrum of modalities.

In most embodiments it is expected that the player will play the game via a mobile device while interacting with the real-world. Example mobile devices include computing devices such as cell phones, smart phones, tablet computers, health sensors (e.g., Fitbit®, and/or the like), watches, hand-held devices, PDAs, vehicles (e.g., sporting equipment, bikes, intelligent sparring equipment, skate boards, roller skates, eBikes, kayak, skis, scooters, automobiles, balls, pucks, sticks, etc.), or other types of mobile or portable devices. Further, such mobile devices can include one or more sensors capable of capturing digital representations of the player and/or the player's environments. Example sensors include magnetometers, accelerometers, GPS sensors, inertial measurement units (IMU), compasses, cameras (e.g., CCD, CMOS, etc.), thermometers, galvanometers, Hall probes, blood pressure gauges, heart rate monitors, brain wave sensors, piezoelectric sensors, strain or stress gauges, polarization filters, microphones, gyroscopes, proximity sensors, compression sensors, tension sensors, strain sensors, sound sensors, audio sensors, airflow sensors, pedometers, EEGs, stretch sensors, infrared sensors, touch sensors (e.g., capacitive, resistive, touch screens, etc.), or other types of sensors. The mobile device can include or couple with such sensors to collect, acquire, or otherwise obtain corresponding digital data in support of determining if a player satisfies real-world requirements of a challenge. While more preferred embodiments focus on a player using a mobile device, it is also contemplated that the sensor platform used to sense the player could be external or non-mobile devices, possibly including game consoles, computers, set to boxes, appliances, vehicles, security systems, or other typically stationary computing devices hosting one or more sensors.

Figure 10:
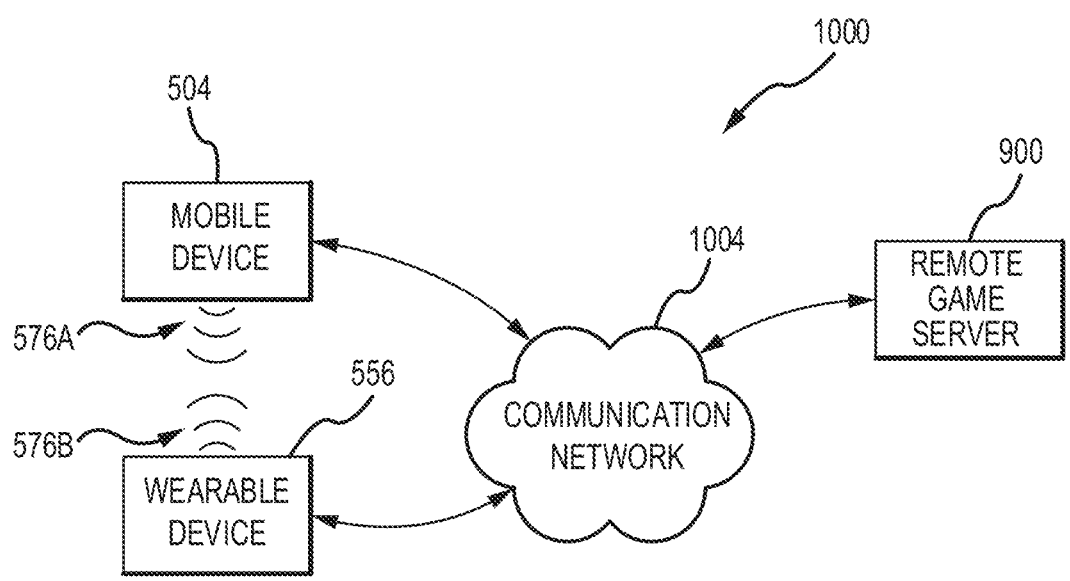
FIG. 10 is a block diagram of a system comprising a mobile device, a wearable device, a remote game server, and a communication network in accordance with at least one embodiment of the present disclosure.

One should appreciate that the sensor platform that provides digital representation can take on a broad spectrum of configurations. In some scenarios, the mobile device comprises all relevant sensors (e.g., incorporated into a smart phone, etc.). In other scenarios, sensors are incorporated into individual mobile devices; say a smart phone with a camera and GPS as well as a Fitbit® with biometric sensors. In yet other circumstances, the sensor platform can operate as a personal area network (PAN) where multiple sensors or devices communicate with a hub device, which then communicates with local or remote game servers or some combination of both. For example, a smart phone may operate as a hub while sensors or other devices placed in or around the player communicate with the smart phone (e.g., via 801.11ad, via BlueTooth®, etc.). The smart phone can then connect to the remote game servers via a network connection (e.g., via 3G, via 4G, via 5G, via WiFi, etc.), as shown in FIG. 10. Still further, the sensors may be remote to the player and sense the real-world environment. Thus, the sensor data may also include temperature data, weather data, traffic data, or other types of real-world environment data.

Within the context of computer game development, each tile represents a data object instance that is instantiated in the memory of the mobile device, or other computer gaming device, and then rendered on the display of the device. Each instance is a data structure having one or more members and/or methods determined by a corresponding class definition. The instance can have the in-game challenge criteria defined in terms of in-game values derived from the game itself, player actions, or other in-game features. One should appreciate that each asset may have zero, one, two, or more in-game challenge criteria where each challenge criteria may represent a different aspect of the game. For example, returning to the example of the tile having a monster challenge, the tile itself might have a simple path challenge and a requirement that the monster 374 be defeated. With respect to the data structure instance, these two criteria may be represented by the following pseudocode:

```
TileChallengeCriteria {
    IsMonsterDefeated == TRUE; AND
    TilePathDistanceTraveled >= 100
}
```

Here, there are two in-game challenge criteria that must be met to complete the overall tile challenge. Note that "AND" represents the logical operator AND. Other logical operators may include OR, NOT, XOR, NAND, IF-THEN-ELSE, or other type of logical operators. Any practical number of criteria can exist for an asset (e.g., tile, monster, chest, etc.). In this example, 100 represents any practical in-game distance units (e.g., meters, miles, kilometers, pixels, feet, etc.).

With respect to the inventive subject, each in-game challenge criteria can have a corresponding real-world criteria that might also be required to be satisfied before the challenge is considered overcome, where the real-world criteria is defined in terms of sensor data representing the real-world and obtained from one or more sensors as discussed previously. Returning to the TileChallengeCritieria discussed above, each constituent criterion can be represented by one or both of the in-game criteria and real-world criteria. For example:

```
IsMonsterDefeated {
    InGame_MonsterHitPoints <= 0; OR
    RealWorld_PlayerHeartRateIncrease >= 10 percent
}
TilePathDistanceTraveled {
    InGame_PathDistance >= 100; AND
    RealWorld_GPSDistance >= 100 yards
}
```

In these examples, the challenge criteria have definitions based both in-game and in the real-world. Any number of criterion (in-game, real-world, or any combination of both), can be used to define the criteria. One should note that these criteria also leverage logical operators. This feature is considered heavily advantageous for real-world game play and causal game play. Use of the logical operator OR indicates that the either of the in-game criteria or real-world criteria may be met to satisfy the total challenge criteria. This is useful because it provides for allowing a player to "cache" a dungeon or other encounter in their mobile device (or other computing platform) for later play, typically called "couch play." For example, a player might walk to a physical real-world park where a virtual dungeon instance has been placed. However, the player might not have time to complete the encounter at that moment. The player can cache the encounter, subject to permission or other authorizations, and play it later using strictly in-game features by causing the device and/or game to store the instance encounter in memory of the device. The example use of AND is present to illustrate the both the real-world and the in-game can be required as desired by the encounter designer or content creator. Thus, it should be appreciated that any combination of in-game, real-world, or other criteria can be used to create a complete set of challenge criteria for a tile, modular asset, or content arrangement.

Detection of satisfaction of these challenge criteria can be implemented using any typical programming technique. In some embodiments, the satisfaction of the challenge criteria can be monitored via using a listener that is registered with the game application. As data changes, the game application can then check a queue of listeners to see if any criteria have been satisfied. If so, the listener can trigger an event notification or simply call a registered, corresponding function call.

In-game criteria mapping to real-world criteria can take many forms. In some embodiments, there is a direct correlation of the nature (or modality) of the in-game criteria to the real-world requirements. For example, a distance traveled in the game may be mapped to a correlated distance in the real-world. More specifically, the in-game criteria might require a player's character 354 to travel 100 miles, which would correlate to one hundredth of the distance (e.g., 1 mile) in the real-world. However, the modality of the criteria is not required to be a corresponding modality in the real-world, as referenced above. This is an advantageous approach because game players would likely have differing physical capabilities. Consider a circumstance where a player lacks the ability to walk or run in the real-world. In such circumstances, the real-world criteria can take on player-specific requirements, possibly requiring the player to shake their mobile device a certain number of times, say 100 times to travel 100 miles. The shaking of the mobile device can be detected via sensor data obtained from an accelerometer in the mobile device. Therefore, aspects of the inventive subject matter include mapping in-game criteria to one or more real-world modalities and/or mapping to real-world modalities that are player-specific or that address player impairments such as being visually impaired, physically impaired, hearing impaired, emotionally impaired, or having other impairments.

To make the app and challenges more immersive for the users, the real-world environment could have filters or lenses applied to it. These lenses or filters may correspond to the tile or tile sets at the user's current location. The lenses or filters may be, for example, similar to Snapchat®, Instagram®, TikTok® or Facebook® lenses and filters. These lenses or filters would modify how the user see and hears the real-world environment. Each tile or tile set could have one or more filters and lenses associated with it telling the device how to augment the environment that is seen through the camera. Anything that a device displays, plays, or says could be augmented. For example, if a tile or tile set are of an elven city, then voices could be altered to sound like elven voices, faces could be morphed into elves (e.g., giving them pointy ears), and all structures that are visible through the camera could be morphed into more organic structures. If the tile or tile set are of an alien environment on a different planet, voices could be altered to sound like aliens; people's faces could be morphed to look like aliens by modifying their eyes and/or lips, and/or by adding antennas on their heads; structures could be altered to look more alien; the color of the sky and clouds could be changed; and all sounds could be modified to be more alien. The lenses or filters may reflect the environment, events (e.g. heat wave, blizzard, a haunted house or park for Halloween, a Santa's village for Christmas, a rock concert, etc.), season (e.g. summer, fall, wet, dry, etc.), time of day, and weather. For example, if there is a heat wave and a drought, then a plains tile set could be replaced with a desert tile set and the environment augmented to look more like a desert; cracks can be added in the ground; and/or a tint of yellow can be added to everything, making the vegetation in the environment look dead.

Additionally, the filters or lenses could have different intensity levels of effectiveness. At a low level they could modify objects very subtly, and at the highest level they could replace the objects completely, and everything in between. The level of intensity of the lenses or filters could be determined by how complete the tile set is for the user that created the challenge, the user's level that created the challenge, the popularity of the challenge, the level of the user trying to complete the challenge, device limitations, time of day, the similarity of the tile or tile set to the actual environment. The intensity level of effectiveness could have only two states based on whether and/or to what extent the environment matches the tile set (e.g., forest and forest match but, forest and city do not). The tile set could have many levels of effectiveness. A lookup table such as the one below, for example, may be used to determine the level of effectiveness, or a formula based on a total count (e.g. item count, item density, item rate of change, etc.) of similar features (e.g. trees, land, water, vegetation, elevation, wildlife, temperature, climate, etc.) that both the tile set and environment have in common could be used to determine the level of effectiveness.

| Effectiveness Level | Environment | Tile set |
|---|---|---|
| 95% | woods | forest |
| 100% | wood | wood |
| 95% | forest | woods |
| 100% | forest | forest |
| 50% | plains | woods |
| 45% | plains | forest |
| 25% | city | woods |
| 0% | ocean | forest |
| ... | ... | ... |

The filter or lenses can also be determined by the style of the tile set. For example, where a tile set has a cartoon style, everything could be modified to look like a cartoon. Possible style filters that can be applied include, for example: cartoon, dark, evil, old, young, age, happy, emotion, mood, fantasy, alien race, and/or others, and/or any combination of the foregoing.

Additionally, the challenge criteria can relate to two or more players rather than just a single player. The real-world criteria for a tile (or other asset) can require multiple players to work together, or even against each other, to satisfy the requirements of the challenge criteria. For example, a tile or arrangement might be the location of a battle between two opposing in-game forces (e.g., two in-game guilds, two in-game factions, two or more in-game rivals, etc.). The challenge criteria for the tile and/or battle might require that players from both factions participate in a real-world sporting event (e.g., baseball, basketball, golf, Ultimate Frisbee, curling, etc.). The winner of the real-world sporting event is then recorded in-game and furthers the game accordingly.

Thus far, the term "challenge" has been used in the context of a gaming challenge. It should be appreciated that the nature of challenges can vary widely depending on the core use-case context. It is contemplated that the disclosed techniques may be applied to other contexts outside of gaming. For example, these concepts may be applied to education, physical therapy, rehabilitation, physical education, military training, software development, on the job training, home repair, chores, a rally race, treatments of mental illness, or other types of use-cases. From the perspective of being "in-game," the challenges can represent nearly any condition required to progress the game including conditions associated with tiles, blocks, characters, non-player characters (NPCs), environments, villages, vehicles, animals, monsters, game world elements (e.g., fire, earth, wind, water, Gaia, etc.), starships, arrangements of content, metagame data, mini games, or other aspects of the game.

Tiles represent one possible modular asset. In some cases, the tiles might be visible in the sense they are rendered on a display as shown in FIGS. 3A-3D. However, in other embodiments the tiles may be non-visible, or hidden, and can represent a container to which other assets are anchored. This approach is advantageous because it permits the construction or creation of content that may be used for augmented reality (AR), mixed reality (MR), and/or virtual reality (VR) games where aspects of the real-world form the foundation for content (e.g., physical world features, terrain, buildings, signs, etc.). Alternatively, the non-visible features may be represented as sound or vibration of a mobile device. Still further, non-visible content could include executable code (e.g., scripts, modules, logical circuits, etc.) that can be used to create more complex encounters. For example, visible tiles could be connected together via a non-visible "circuit" where the circuit (i.e., executable code) takes input from the state of each of the visible tiles to determine an output state or activation of additional content.

U.S. Pat. No. 10,140,317 to McKinnon et al. titled "Wide Area Augmented Reality Location-Based Services," filed Oct. 26, 2017 (the entirety of which is hereby incorporated by reference herein), describes how a real-world area can be tessellated with tiles to which AR/MR/VR content is bound and is observed from a tile and a device point of view. The disclosed techniques in U.S. Pat. No. 10,140,317 can be adapted for use with the inventive subject matter by combining non-visible tiles and AR/MR/VR content with in-game and real-world challenge criteria.

As mentioned previously, the disclosed techniques can be applied to modular assets beyond dungeon tiles. Other types of in-game modular assets include blocks, creatures, monsters, animations, video cut scenes, images, decorations, audio content, trees, stones, liquids, vehicles, puzzles, circuits, logic gates, switches, generators (e.g., monster spawners, etc.), audio tracks, or other types of assets that can be instantiated within a game.

Arrangements of tiles or other modular assets can be created by one or more software-enabled editing tools on one or more computing devices (e.g., cell phone, tablet, computer with browser, set top box, gaming console, etc.). In some embodiments, a user (e.g., a player, a content creator, etc.) is presented with a user interface on a display through which the user is able to manipulate tiles and fit them together to make a desired arrangement. For example, the user interface can display available tiles or other assets for use. The user may then drag and drop a tile into a pre-established grid location. As new neighboring tiles are added, the editing tools can check to see if the two neighbor tiles are compatible, if desired, with each other by comparing the edge or interface attributes with each other (e.g., to verify that paths connect, water-ways connect, grass is next to grass, etc.) to ensure continuities within the arrangement. Further, in cases where multiple grid locations need to be filled, the user can fill the regions with a single fill actions that populates that region with one or more types of base or filler tiles (e.g., grass tiles, rock tiles, brick tiles, etc.).

The content creation tools, as alluded to above, can include one or more validation facilities that ensure that the assets fit together properly. Each modular asset, such as tiles, can include in-game attributes that define the features or capabilities of each asset's interface to other assets. For example, a tile asset may have multiple edges that link to the edges of other assets. Each edge will have defining attribute characteristics that may include, among others, path definitions, terrain type definitions, theme type (e.g., sci-fi, fantasy, horror, puzzle, drama, romance, etc.) capabilities (e.g., programmatic features, executable code, etc.), callable APIs, or other features. If two edges that mate together have complimentary features, the validation facility will permit the two tiles to mate. If the features are not complimentary, the validation facility will not permit the two tiles to mate. From another perspective, a monster asset might include an attribute that describes the monster's preferred terrain type. If a content creator attempts to place the monster on a tile lacking the specific terrain type attribute, the validation facility will notify the content creator of the conflict. The results of such validations could be enforced to eliminate conflicts, or the conflicts could be overridden by the content creator, possibly to further their desired story. Still further, the ability of a content creator to override such restrictions might be based on a paid "fee" (e.g., subscription, micro transaction, etc.) to enable such overrides.

The validation facility can be implemented in multiple ways. In some embodiments, the assets will include required attributes and/or optional attributes that can be checked the validation facility through a look up table. In other embodiments, the assets can include one or more interface contracts that define the permitted interfaces capabilities. The interface contracts define what services or capabilities the assets interfaces have to offer as well as what services or capabilities the asset is expecting from other assets. An astute reader will appreciate that this approach is an adaptation of the concept of an API contract. This approach is considered useful because it eases the burden on the content creator for debugging their arrangement of content by ensuring that the arrangement of assets makes technical sense. In some scenarios, the validation facility can be turned off as desired by the content creator.

The palette of tiles or other modular assets within the editing tool can take on a vast array of possibilities. In some scenarios, the set of modular assets available to the content creator is limited from the total complete set based on one or more criteria, possibly based on a permission level (which may be tied to a level of in-game achievement or to a subscription level) or authentication level. The tile sets or modular assets can be collectible in the sense that the player or the player's character 354 has to collect the assets and each asset has a rarity associated with it (e.g., basic, common, uncommon, rare, ultra-rare, unique, chaser, sets, etc.). As the player collects the assets or pays for the assets, the player's asset palette grows. In order to obtain or otherwise collect the assets the player might have to satisfy one or more collection criteria that depends on in-game attributes and/or real-world attributes in a similar fashion as the challenge criteria. For example, to collect a unique tile, the player might have to be the first person in a given time frame to visit multiple geographic locations in an area, e.g., by visiting Disneyland®, Legoland®, and Seaworld® in southern California within one week. In addition, or alternatively, the player might simply purchase the assets or purchase a sponsored product that yields the assets in response to validation of a transaction.

In view that the modular assets and tiles may come in sets, it is possible that the sets may form synergetic effects. Thus, when combined, they might confer in-game (or real-world) bonuses on neighboring tiles. Further, a tile set that is completed (e.g., collect all mountain range tiles, collect all temple tiles, etc.) might also have combined set effects. For example, in embodiments where assets are dynamic or can change with time based on the features of the game, synergetic assets might have a larger impact on the game. Consider a mountain monster placed in a mountain tile. The monster might have a larger amount of hit points due to the synergetic effect of the mountain tile (i.e., the monster and tile both have the terrain type "mountain"). If the same monster is placed in a plains tile, the monster might have reduced hit points because the terrain types don't match. Still further, neighboring tiles or assets might confer bonuses to the monster based their attributes as well.

In some especially contemplated embodiments, the tiles (or modular assets) can be bound to physical real-world collectible objects such as action figures, trading cards, gaming tokens, models, player registered objects, or other real-world items. For example, consider collectible tiles as combined with a real-world collectible card game. The card game, likely a standalone table top game, can include cards that represent locations or challenges that must be overcome in the card game to advance the computer game. Further the cards can be printed with recognizable features (e.g., images, pictures, QR codes, bar codes, etc.) or other types of identifiers, possibly unique identifiers. When a player purchases the cards, not only can they play the real-world card game, but they may also scan the cards with their mobile device using computer vision techniques (e.g., OpenCV, SIFT, TILT, DoG, HoG, Canny edges, etc.).

Example mobile device computer recognition techniques can be found in U.S. Pat. No. 7,016,532 and associated daughters to Boncyk et al. titled "Image Capture and Identification System and Process," the entirety of each of which is hereby incorporated by reference herein. Example edge detection techniques can be found in U.S. Pat. No. 10,229,342 to Song et al. titled "Image-Based Feature Detection using Edge Vectors," also incorporated in its entirety by reference. Once the cards are recognized, the player will have the corresponding asset or tile information available for creating content such as encounter. The physical cards can also be printed or manufactured and distributed with rarities to create a further enriched game-play/real-world experience. Still further, the cards can be placed next to each other to form a desired arrangement of a full encounter experience, a dungeon challenge, for example. The mobile device can scan the arrangement to create the specific instance of the encounter. Thus, the cards become part of the editing tools. Example techniques that can be adapted for use to support card-based content creation are described in U.S. Pat. No. 9,892,560 to Wiacek et al. titled "Marker-based augmented reality authoring tools," filed on Sep. 11, 2015 and incorporated by reference herein in its entirety.

Once an arrangement has been completed to the satisfaction of the content creator, the creator can deploy or publish the instance of the arrangement. In some scenarios, the arrangement will be bound to a geographic location (e.g., a park, a point of interest, a building, a statue, etc.). In other cases, the arrangement might be bound to an object (e.g., a toy, a vehicle, etc.) or other types of items. Depending on the nature of the editing tools and the corresponding game software, the arrangement can be compiled into a package for download or upload. In some cases, the package can include a serialized data file that defines the arrangement in the form of a markup language (e.g., YAML, JSON, XML, and/or the like) that can be transmitted to other computing devices over a network. The arrangement can be stored in one or more content servers that index the arrangement or other content based on location information (e.g., geo-coordinates, S2 cell identifier, elevation, vSLAM data, IMU data, etc.).

One should appreciate that the arrangement can be tested before deployment through numerous techniques. The content creator can make the instance available to faction members, guild members, in-game friends, or other players through a limited publication that requires authorization to access the content. The editing tools can include alpha or beta test facilities to support publications the instances to the desired individuals or groups. Once testing is complete to the satisfaction of the content creator, the content creator can publish the instance to the game servers, which then would make the encounter available to other players. In some situations, the published encounter may also have in-game or real-world requirements that must be met before other players can engage the content; having a specific geolocation or recognizable image features, for example. Other game players can then receive the published arrangement or associated content once they satisfy any initial criteria; being at the correct geolocation, for example. In view that prime geolocations are a limited commodity, it is possible the game players may rate published content so that the most highly rated or most interesting content is easily made available at a geolocation. Alternatively, a location can be reserved based on a fee schedule or an auction.

Some version of contemplated editing tools can also capture the nature of a local real-world area, possibly from Google® Maps, Google Street View, OpenStreetMap® (see URL www.openstreetmap.org). The physical structure of the area (e.g., roads, sidewalks, yards, parks, rivers, streams, forests, and/or other physical structure) can then be used to create an in-game template for the arrangement. For example, if the content creator wishes to create an encounter near a park, the editing tool can download a map of the park, possibly from Google® Maps, and create a tessellated arrangement of tiles having paths that simulate the walkways through the park that may be rendered as a forest path. The content creator can then populate the template with additional or different tiles to fit their content needs. For example, a local real-world pond may form an in-game template for a liquid feature. The content creator may instantiate a lava pool (e.g., the lava 333) using the template, for example.

To continue the concept of creating templates, real-world features and metadata obtained through a mapping service such as OpenStreetMap® can be mapped to in-game features. In some scenarios, the real-world features can be assigned attributes (e.g., a Tuple, name-value pairs, metadata, hierarchically arranged attributes, namespace, and/or other assigned attributes, etc.) that represent the nature of the feature. For example, a biome such as a forest area can be represented by a boundary defined by a vector storing longitude and latitude coordinates as well as attributes describing the type of forest. The level of detail can be fractal to some degree. The forest attributes may include types of flora (e.g., types of trees, types of bushes, relative abundance of each type, etc.) or types of fauna (e.g., types of predators, types of prey, types of insects, relative populations, etc.) and so on. Such attributes can map directly to in-game features of tiles/or influence the gameplay of the corresponding tiles. An in-game tile that is anchored to a geolocation of a real-world forest can be assigned virtual plants, virtual animals, or virtual resources (e.g., wood, herbs, etc.) that correspond to the actual location as determined by the real-world attributes of the real-world forest. However, it is also contemplated that the virtual features of the tile (or arrangement of tiles) do not necessarily have to correspond to the real-world features. Other types of biomes can include desert, water, ocean, jungle, mesas, plains, savannas, tundra, mountains, hills, cities, air, space, lunar, or other types of biomes. The entire spectrum from mapping exactly to real-world attributes to not mapping at all to real-world attributes is contemplated.

Consider a scenario where a tile arrangement, tile set, or tile palette is anchored to a real-world region, say a local park but the nature of the collections of tiles is different from the real-world. As mentioned previously the boundary of the park can be defined in terms of a set of real-world coordinates. The boundary can be used to render tiles when the mobile device is within the region. Although the region is in fact a park, the region can be mapped to a different type of region or biome in the game. The mapping can change as time passes to suit the needs of the game. For example, the game might include one or more in-game events that alter the nature of a biome or environment. In a fantasy game, players could band together to cast an in-game spell that causes a desert to become forest, or in a sci-fi game, players deploy a terraforming device to change the nature of the environment. While the boundary of the park doesn't change, the environmental attributes or the biome in the game can be changed or modified. Such changes can occur with intent (e.g., by game designers, by programmers, by game players, by content creators, and/or the like), on a regular basis perhaps seasonally, on an irregular bases, in response to in-game events, in response to real-world events (e.g., news stories, natural disasters, charity walks, seasons, weather, and/or other real-world event), or based on other conditions. The approach of mapping real-world features to in-game features is considered advantageous because the approach provides game content where players can compete with each other to make the in-game world map to their desires; one faction might want the park to be a forest so they can harvest wood while a second faction might want the park to be a desert so they can mine minerals, for example.

Once a content creator deploys or otherwise publishes his or her arrangement, the content creator may receive some form of compensation for his or her work. In such scenarios, the game server (or other computer) can also operate as a transaction server that receives compensation from a player and transfers the compensation to the content creator account. One should appreciate that the compensation can be take on many different forms. It is contemplated that the compensation can include monetary transactions, game point transactions, reaction transactions (e.g., thumbs up, emoticons, likes, etc.), in-game currency, virtual currency, tips, cryptocurrencies, or other forms of exchange. Yet further, the tiles or other modular assets can also include features that allow advertisers to inject promotions into the tiles. For example, if a tile includes a building that has a poster on the wall, the poster might have NULL content and that can be accessed by an advertiser via the game server. Assuming the advertiser pays a fee, the advertiser can inject their promotional content into the poster so that the promotional content can be rendered in game. A portion of the fee might go to the content creator while other portions might go to the game company running the game server.

In some embodiments, a content creator that deploys or otherwise publishes his or her arrangement may be required to pay an upkeep fee, may need to maintain a current subscription to the game, and/or may need to receive a certain minimum threshold of positive user feedback in order to keep the encounter available on the remote game server(s). Additionally, positive rated arrangements may be used for story content, and players with higher rated arrangements may receive elevated rewards.

It is also contemplated the modular assets can include challenge criteria that depend on distributed ledger (e.g., blockchains, hash graphs, chained data structures, directed acyclic graphs, etc.) technologies. The advantage of such an approach is that players who experience the content might gain a cryptocurrency benefit for besting the content challenges. The act of playing the content can be essentially the act of mining cryptocurrency. This can be achieved by calling a hash function for each action taken by the player where the hash value can be considered a pseudo-random number. If the hash value takes on a specific value, akin to a proof-of-work signature but rather a proof-of-play, the player can be awarded a corresponding token. Further, the actions of the player can be notarized on a distributed ledger (e.g., Hyperledger, IOTA, Ethereum, BitCoin, Hashgraph, etc.) as a form of "Proof-of-play." The reward may be provided in lieu of the content's typical reward or may be provided in addition to the content's typical reward. By providing an additional reward, it is expected that players will wish to engage the content multiple times.

The disclosed approach, as mentioned previously, specifically provides for both playing a game within the virtual construct of the game as well as in the real-world. Due to the nature of having dual challenge criteria (i.e., in-game and real-world criteria), players have multiple options in how they can interact with them. One feature that arises from these capabilities includes allowing the player to archive or cache an encounter for later play, as referenced previously. Once a player receives permission or authorization from the game server, possibly based on geolocation of the player, the player's device can receive the cached content. The cached content can be received via a markup language as described above. Of particular note, in view that an arrangement of content is based on modular assets primitives, it is possible that serialized description of the arrangement can be quite minimal an only include necessary information to re-instantiate the arrangement. For example, rather than transmitting all files such as audio files, textures, and so on, the serialized data might only include assets identifiers (e.g., GUIDs, UUID, serial numbers, tokens, etc.). The local device can re-instantiate the arrangement using the identifiers and based on locally stored support files such as textures and/or audio files.

Figure 4A:
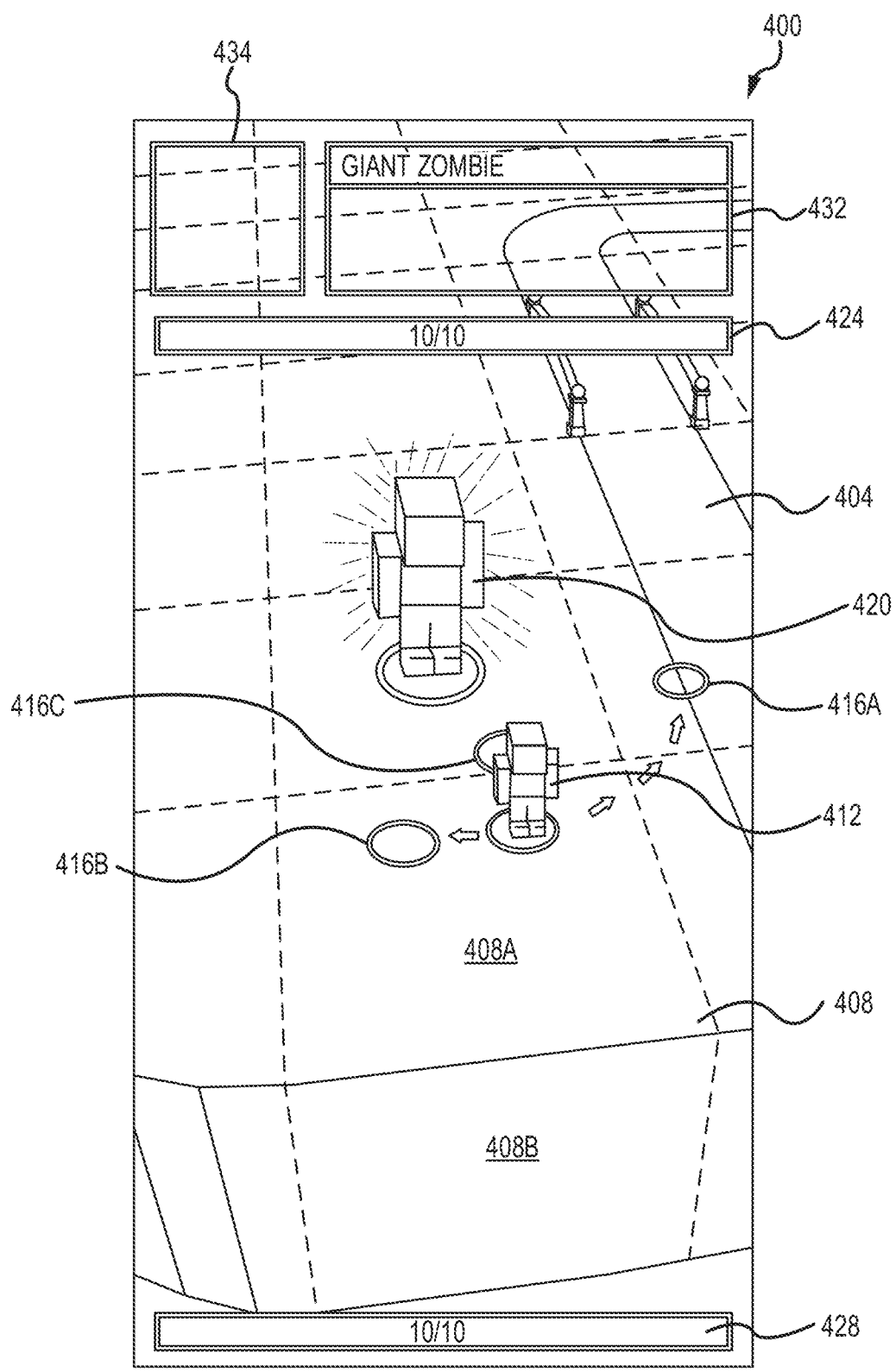
FIG. 4A is an illustration of a dungeon arrangement comprising block tiles deployed and rendered on a mobile device in accordance with at least one embodiment of the present disclosure.
Figure 5:
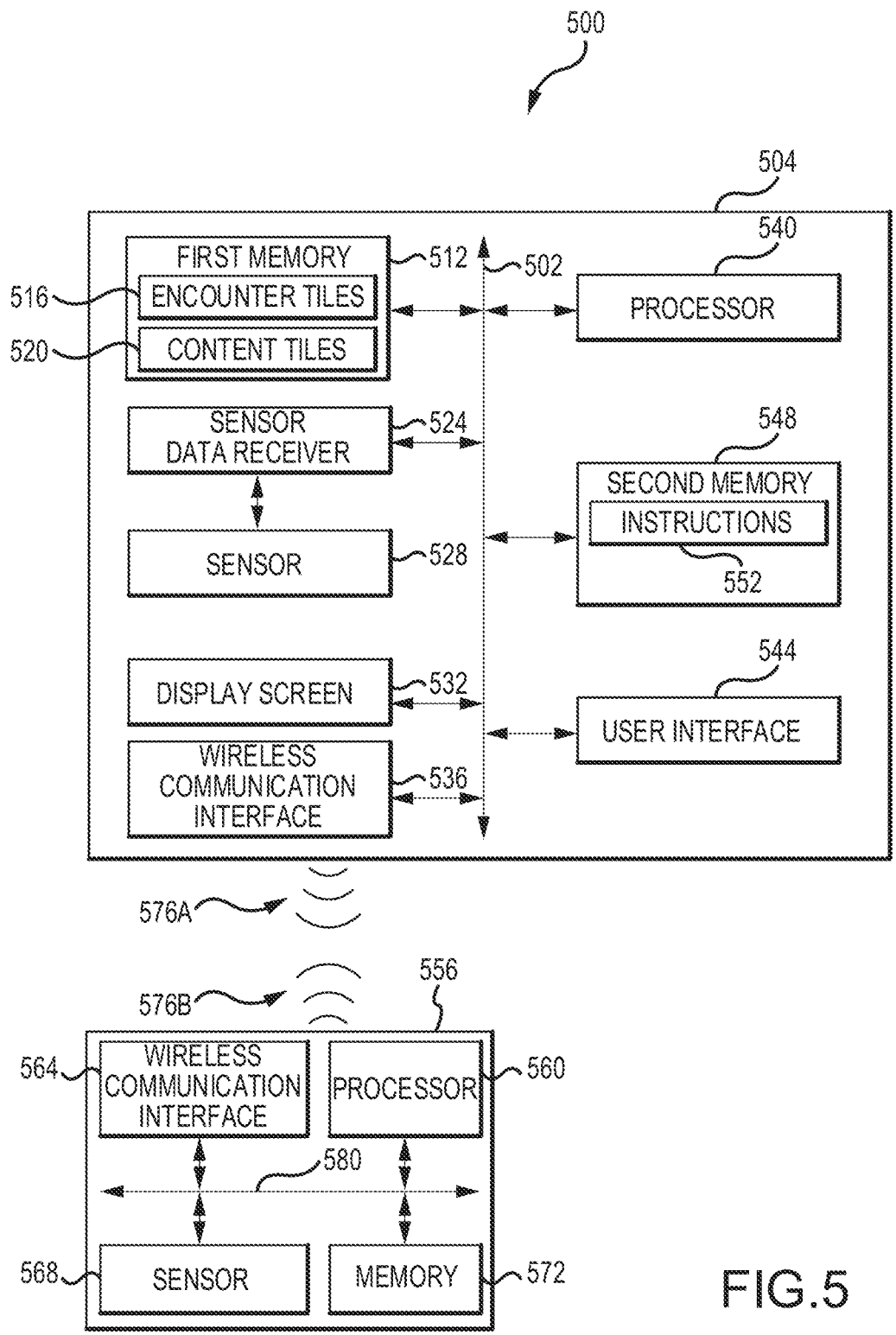
FIG. 5 is a block diagram of a system in accordance with at least one embodiment of the present disclosure.

FIG. 4A is an illustration of a dungeon arrangement 400 comprising block tiles deployed and rendered on a mobile device. An example mobile device 504 and wearable device 556 are shown in FIG. 5. Dungeon arrangement 400 comprises content tiles, such as content tile 404 and 408. The top portion of content tile 408 is shown as square 408A and the side portion is shown as square 408B. Typically, the side portion of a content tile is shown when there is no adjacent content tile (e.g., an edge tile).

A character 412 may move in one of three direction as shown in circles 416A-C. The monster 420 may react to the character's 412 action or lack of action. Circle 416A is on a portion of the path 404. Health display 424 shows the health of the monster 420 during combat, e.g., 10 out of 10, and health display 428 shows the health of the character 412. Display 432 shows the title, "Giant Zombie," of the dungeon arrangement 400, and display 434 typically shows additional content.

The dungeon arrangement 400 may be rendered on a smart phone display as an example. Although this particular arrangement is rendered as a 3D image on a smart phone display, it should be appreciated that the arrangement can be rendered according to other dimensionalities. For example, the arrangement may be rendered as a 2D tile set, 2.5D (e.g., isomorphic view, etc.), 3D, and so on. Interestingly, it is possible to render a 4D tile set where the 3D view represents a single 3D cross section of the 4D space. As a person moves, the person's movement can be detected by sensors in the mobile device (e.g., GPS, IMU, visual simultaneous localization and mapping (vSLAM), etc.) and cause the 3D cross section to change. Thus, one aspect of the inventive subject matter is considered to include 4D tiles and comprise providing access to 4D tiles to content creators.

Figure 4B:
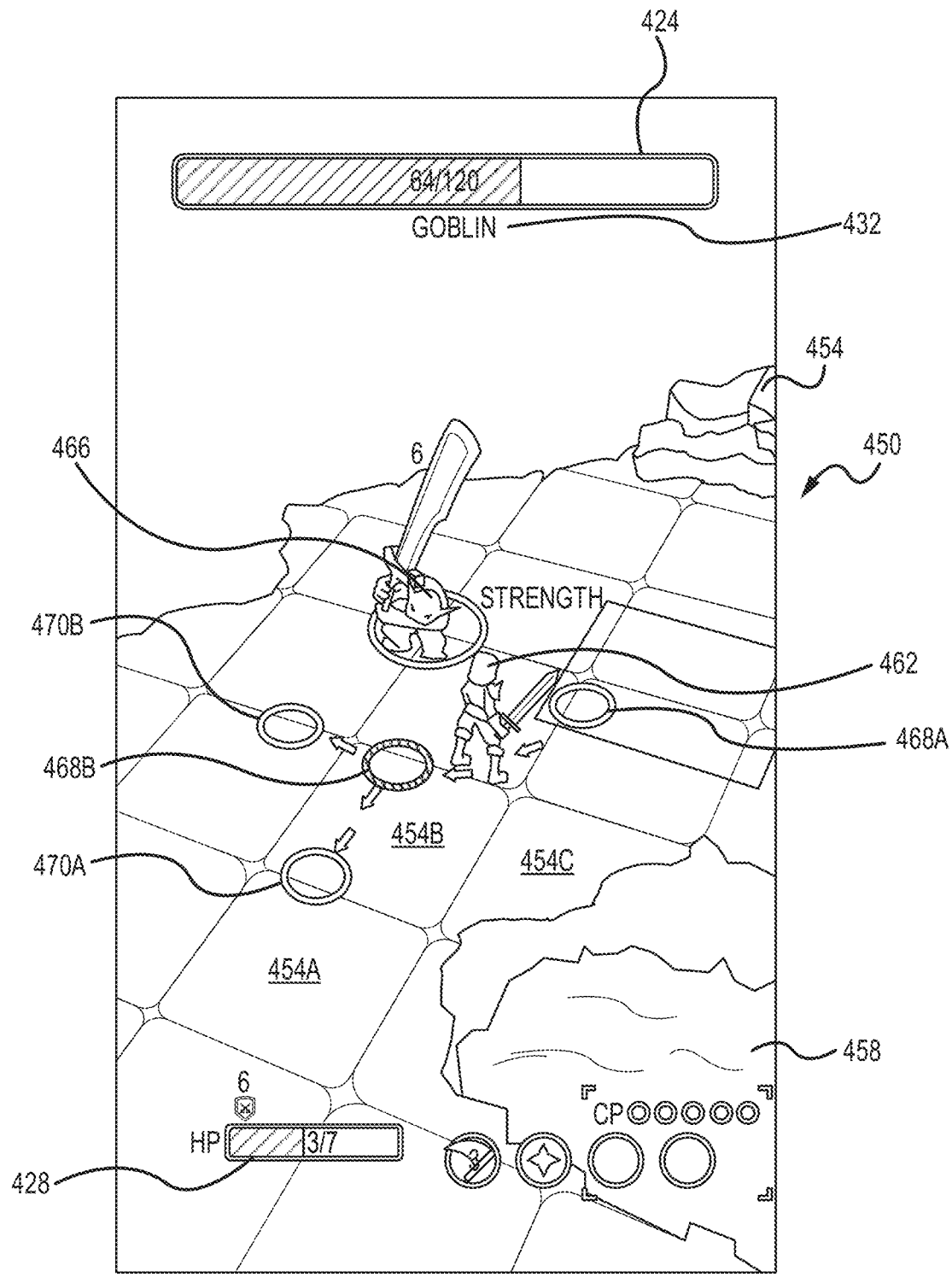
FIG. 4B is a prototype dungeon tile arrangement having combat elements in accordance with at least one embodiment of the present disclosure.

FIG. 4B is a prototype dungeon tile arrangement 450 having combat elements. The prototype tile arrangement 450 illustrates a possible rendering of a final dungeon tile arrangement and modular assets in preparation for presentation to a player, and illustrates a more advanced prototype arrangement of tiles (i.e., in block form) and having combat elements.

The prototype dungeon tile arrangement 450 comprises content tiles, such as content tiles 454A-C. As shown in FIG. 4A, health display 424 shows the health of the monster 466 during combat, e.g., 64 out of 120, and health display 428 shows the health of the character 462. Display 432 shows the title, "Goblin," of the prototype dungeon arrangement 450. The character 462 may move in one of two directions, as shown by circle 468A and 468B. If the character 462 moves to circle 468B, then the character's 462 next move may be to circle 470A or 470B. The boulder field 454 may restrict the movement of the character 462 or may require the use of a skill to overcome the obstacle. Opening 458 is another obstacle that may cause the character 462 to lose a life, lose health points, prevents movement, requires the use of a skill to overcome, and/or the like.

FIG. 5 is a block diagram of a system 500. System 500 comprises a mobile device 504 and a wearable device 556. Mobile device 504 comprises a first memory 512, a sensor data receiver 524, one or more sensors 528, a display screen 532, a wireless communication interface 536, a processor 540, a second memory 548, and a user interface 544. By way of example, first memory 512 and second memory 548 may be disk drives, optical storage devices, solid-state storage devices such as a random access memory (RAM) and/or a read-only memory (ROM), which can be programmable, flash-updateable and/or the like. The mobile device 504 is shown comprising hardware elements that may be electrically coupled via a bus or network 502.

The mobile device 504 may be or include computing devices such as cell phones, smart phones, tablet computers, health sensors (e.g., Fitbit®, and/or the like), watches, hand-held devices, PDAs, vehicles, equipment (e.g., sporting equipment, bikes, intelligent sparing equipment, skate boards, roller skates, eBikes, kayak, skies, scooters, automobiles, balls, pucks, sticks, etc.), or other types of mobile or portable devices.

The wearable device 556 is shown comprising hardware elements that may be electrically coupled via a bus or network 580. Bus or network 580 may be the same or similar to bus or network 502. The hardware elements of the wearable device 556 include processor 560, wireless communication interface 564, one or more sensors 568, and memory 572. Although only one wearable device 556 is shown in FIG. 5, embodiments of the present disclosure encompass systems 500 that comprise two or more wearable devices 556.

Figure 9:
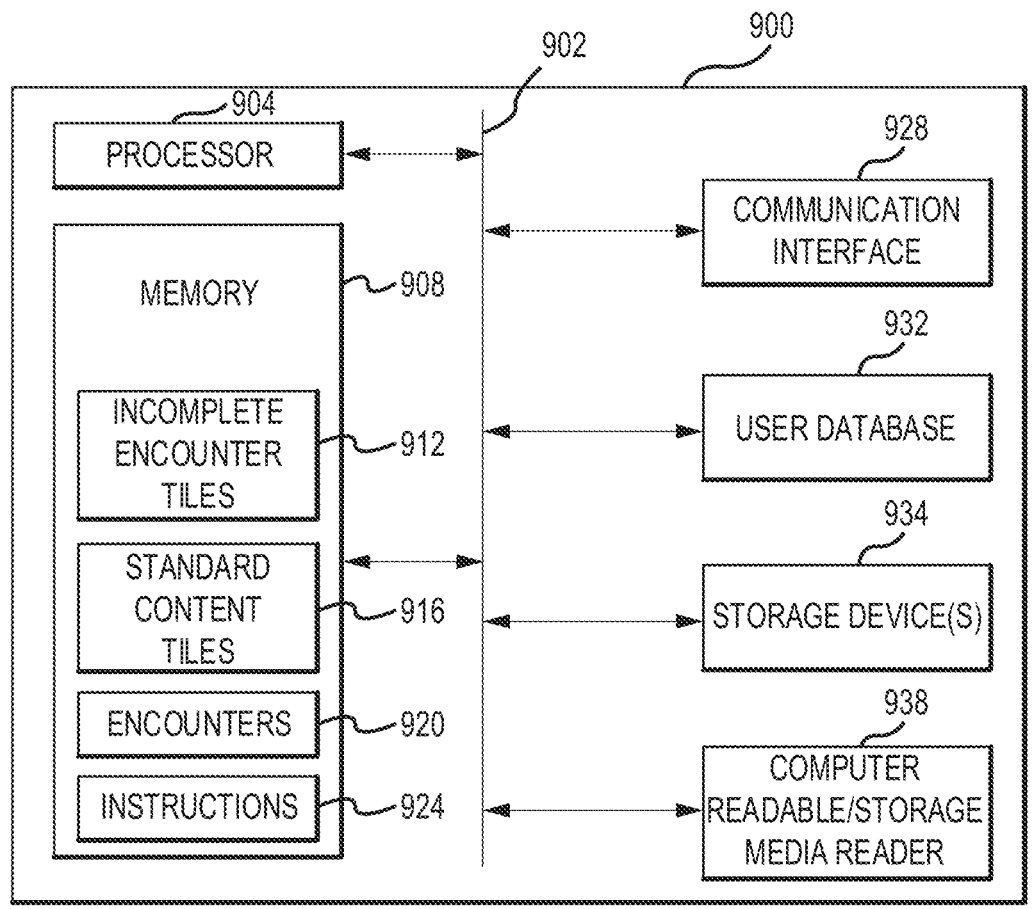
FIG. 9 is a block diagram of remote game server in accordance with at least one embodiment of the present disclosure.

First memory 512, second memory 548, and memory 572 may be the same or similar to memory 908, as shown in FIG. 9. First memory 512 comprises encounter tiles 516 and content tiles 520. As described previously, encounter tiles 516 may be associated with a completed arrangement, and/or the content creator may create the content for the encounter tile after placing the encounter tile on a game-view real-world map. Each encounter tile 516 comprises an arrangement of one or more content tiles 520.

Figure 6:
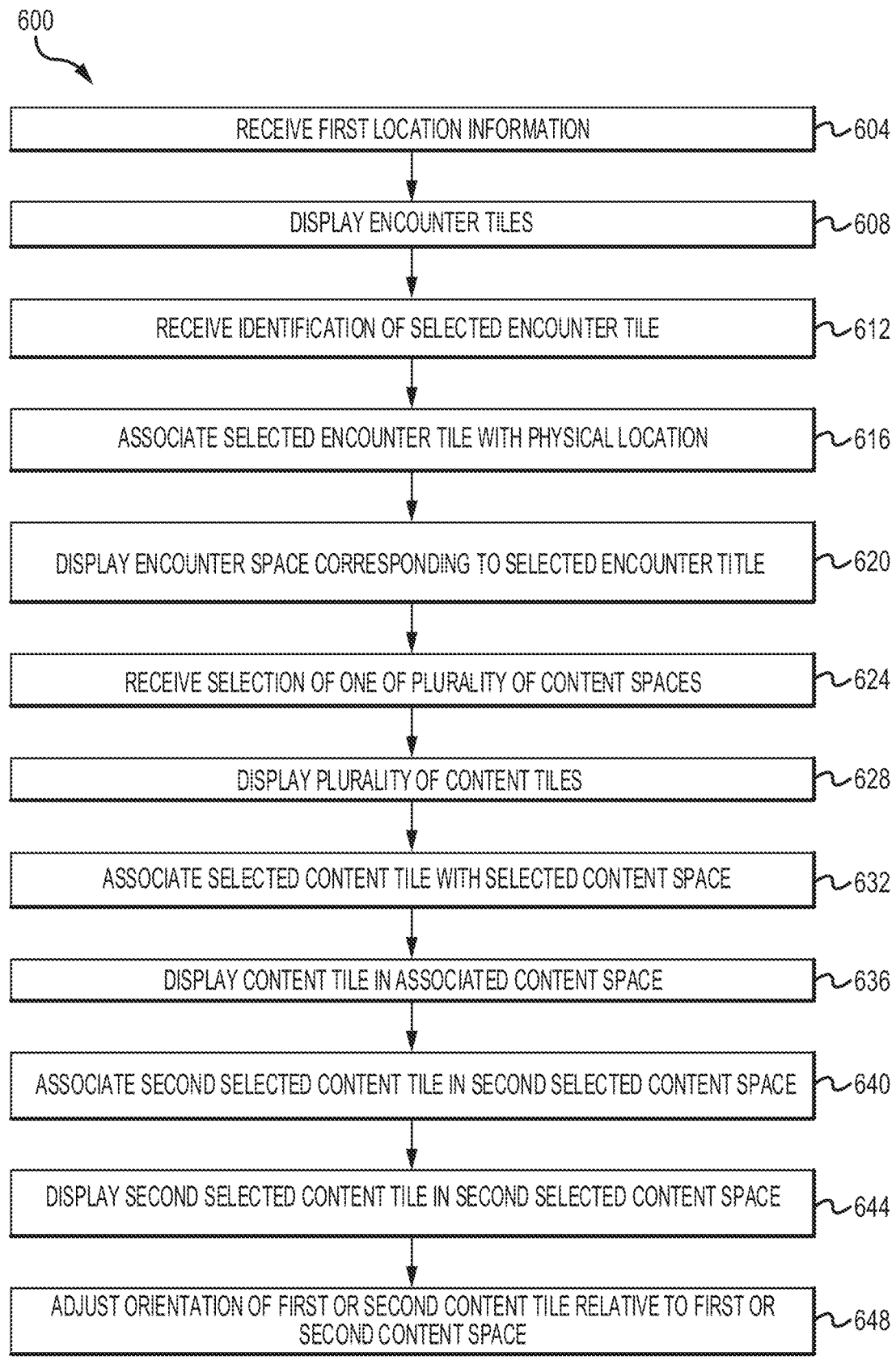
FIG. 6 is a flowchart of a process to create game content in accordance with at least one embodiment of the present disclosure.
Figure 7:
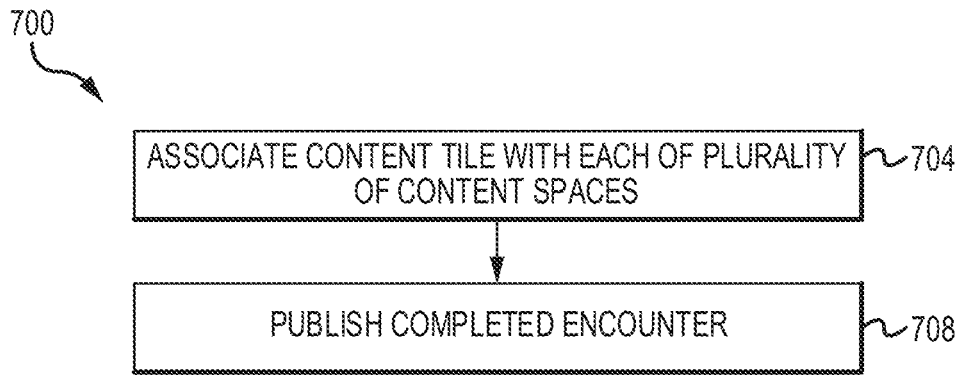
FIG. 7 is a flowchart of a process to create content in accordance with at least one embodiment of the present disclosure.

Instructions 552 of second memory 548 include an operating system, and code to perform the processes illustrated in FIGS. 6, 7, and/or 8. Instructions 552 are executed on processor 540, and may include software to communicate with wearable device 556 and content creation server 900, as shown in FIG. 9.

Processor 540 of mobile device 504 and processor 560 of the wearable device 556 may be the same or similar to processor 904, as shown in FIG. 9.

Sensors 528 and 568 may be the same or similar. In this example embodiment, sensor 528 is incorporated into an individual mobile device 504, which may be, for example, a smart phone with a camera and GPS, or any other mobile device described herein. Sensor 568 is incorporated into a wearable device 556, which may be, for example, a Fitbit® with biometric sensors or any other wearable device described herein. One or both of sensors 528 and 568 may comprise any type of sensor described herein, and/or a camera, GPS receiver and/or other location sensor, accelerometer, gyroscope, magnetometer, proximity sensor, ambient light sensor, optical sensor, near field communication sensor, tension sensor, strain sensor, sound sensor, stretch sensor, orientation sensor, position sensor, microphone, touchscreen sensors, pedometer, barcode reader, QR code sensor, air humidity sensor, barometer, heart rate monitor sensor, thermometer, Geiger counter, and/or the like. Sensor data receiver 524 retrieves sensor data from one or more sensors 528 and provides the sensor data to the processor 540.

In yet other circumstances, the sensors 528 and 568 comprise a sensor platform that may operate as a personal area network (PAN) where multiple sensors or devices communicate with a hub device, which then communicates with remote game servers, as described previously. For example, a smart phone may operate as a hub while sensors or other devices placed in or around the player communication with the smart phone (e.g., via 801.11ad, via BluetTooth®, etc.). Still further, the sensors may be remote to the player and sense the real-world environment. Thus, the sensor data may also include temperature data, weather data, traffic data, or other types of real-world environment data.

Wireless communication interfaces 536 and 564 may communicate using Wi-Fi, Bluetooth®, ZigBee, GSM, LTE, or any other wireless communication protocol. Typically, mobile device 504 and wearable device 556 communicate directly via radio frequency signals 576A and 576B. Alternatively, mobile device 504 and wearable device 556 may communicate through a network, such as communication network 1004, as shown in FIG. 10. The wearable device 556 may transmit real-world sensor data from the sensor 568 to the mobile device 504 via wireless communication interface 564

In some embodiments, mobile device 504 and wearable device 556 may communicate over a wired connection. Alternatively, wearable device 556 may be a drone that comprises one or more sensors, and sensor data is transferred to the mobile device 504 via wireless communication interface 564 to wireless communication interface 536 of mobile device 504.

The mobile device 504 includes a display screen 532. The display screen 532 can be any display that can display information, such as a touch screen, a Liquid Crystal Display (LCD), a Light Emitting Diode (LED) display, a plasma display, and/or the like. User interface 544 comprises one or more input devices (e.g., a mouse, a keyboard, touchscreen, etc.). In some embodiments, wearable device 556 includes a display screen similar to or the same as display screen 532.

FIG. 6 is a flowchart of a process 600 to create game content. The process 600 begins at step 604 and comprises arranging content tiles in an encounter space. At step 604, the mobile device of a content creator receives the first location information corresponding to a physical location via a sensor data receiver. At step 608, the mobile device displays one or more encounter tiles from an encounter tile set. The encounter tiles that are displayed may comprise a subset of available encounter tiles where the subset is selected based on the first location information. At step 612, the content creator selects an encounter tile from the displayed encounter tiles. At step 616, the selected encounter tile is associated with a physical location based on the first location information in a computer game. At step 620, the mobile device displays an encounter space and associated content spaces corresponding to the selected encounter tile. The encounter space is divided into a plurality of content spaces. At step 624, the content creator selects one of a plurality of content spaces. In step 628, a plurality of content tiles is displayed on a display screen to the content creator. One of the content tiles may correspond to a real-world challenge criterion that required real-world sensor data to be satisfied and an in-game challenge criterion that can be satisfied without real-world sensor data.

In step 632, the content creator selects a content tile and the selected content tile is associated with the selected content space. In step 636, the selected content tile in the associated content space is displayed. In step 640, a second content tile is selected from a subset of the content tiles by the user and is associated with a second selected content space. The subset of content tiles may be selected based on the selected content space or a characteristic of a content tile adjacent the selected content space. In step 644, the second selected content tile in the second selected content space is displayed. In step 648, the orientation of the first or second content tile relative to the first or second content space is adjusted. For example, the adjusted orientation may align the first and second content tiles to be adjacent. A validation facility may validate the combination of content tile types, locations, and alignment to validate the game content before publishing to a remote game server, as shown in FIG. 7, or during arrangement of the tiles.

Creation of game content may be performed on a mobile device, such as mobile device 504 as shown in FIG. 5, or in combination with one or more game servers, such as remote game server 900 as shown in FIG. 9. The remote game server may provide the game content to players to engage the game content or to content creators to augment the game content.

FIG. 7 is a flowchart of a process 700 to create game content. The process 700 begins at step 704. In step 704, standard content tiles are associated with each of a plurality of content spaces by a user to create an arrangement of standard content tiles within an encounter space. A content creator may select content tiles from a subset of a plurality of standard content tiles. One or more of the standard content tiles may have a virtual challenge criterion and a real-world challenge criterion, where the real-world criterion requires sensed real-world data to be satisfied. In step 708, the completed encounter is published. Publishing may consist of transferring information defining the completed encounter from a user's mobile device to a game server, such as remote game server 900 as shown in FIG. 9, to be incorporated into game play. The completed encounter and/or game may be streamed via a Twitch channel to players. Published user-generated encounters may be reviewed by other users, and the user feedback may be used in the decision to retain or remove a user-generated encounter from the plurality of encounters.

Figure 8:
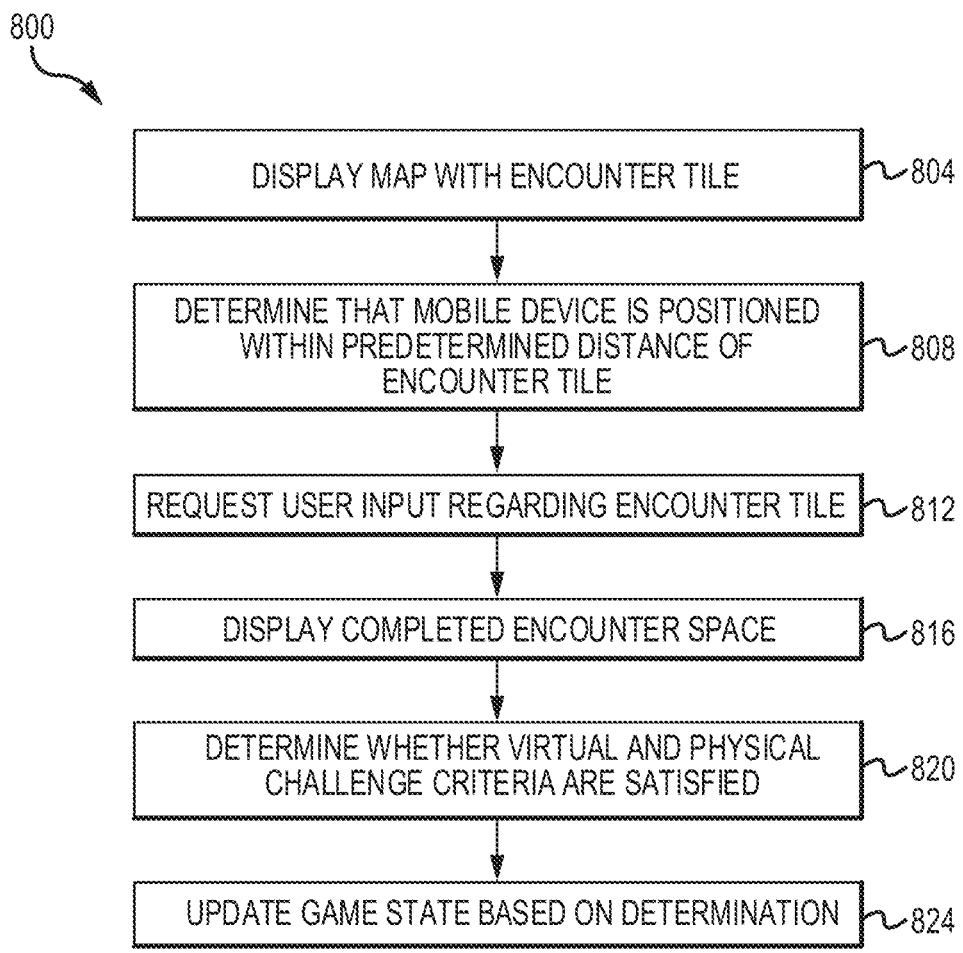
FIG. 8 is a flowchart of a process to play a game in accordance with at least one embodiment of the present disclosure.

FIG. 8 is a flowchart of a process 800 to play a game. The process 800 begins at step 804. In step 804, a map that includes an encounter tile is displayed to a user, for example, on the display screen 532 of a mobile device 504, as shown in FIG. 5. The map may be a game-view world-view map as described in FIG. 1. In step 808, the process 800 determines if the user's mobile device is positioned within a predetermined distance of the encounter tile displayed on the map. An encounter tile may represent game content created by a user following processes 600 and/or 700. In step 812, user input is request regarding the encounter tile. For example, the user may save or cache the encounter tile to play later, may avoid or skip the encounter tile, or may engage the encounter tile. In step 816, the completed encounter space is displayed when the user engages the encounter tile.

In step 820, the process 800 determines whether the virtual and physical challenge criteria are satisfied by the user. The physical challenge may comprise moving a predetermined distance, climbing a predetermined elevation, achieving a predetermined heart rate, logging a predetermined number of steps, moving the mobile device a predetermined pattern, playing a predetermined sport, reaching a predetermined location, and/or purchasing a predetermined product. The physical challenge may include using a treadmill, omni-directional treadmill, and/or other gym equipment. Based on the determination, the game state is updated in step 824.

FIG. 9 is a block diagram of a remote game server 900. The remote game server 900 is shown comprising hardware elements that may be electrically coupled via a bus or network 902. The hardware elements may include one or more central processing units (CPUs) 904; memory 908; communication interface 928; user database 932; storage device(s) 934; and computer readable/storage media reader 938. By way of example, memory 908 may be disk drives, optical storage devices, solid-state storage devices such as a random access memory (RAM) and/or a read-only memory (ROM), which can be programmable, flash-updateable and/or the like.

Memory 908 may further be connected to a computer readable/storage media reader 938. The computer readable/storage media reader 938 can further be connected to a computer-readable storage medium, which computer-readable storage medium (as well as, in some embodiments, storage device(s) 934) which may represent remote, local, fixed, and/or removable storage devices and storage media for temporarily and/or more permanently containing computer-readable information. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The remote game server 900 may also comprise software elements, shown as being currently located within a memory 908, including incomplete encounter tiles 912, standard content tiles 916, encounters 920, and instructions 924. Incomplete encounter tiles 912 include user created game encounter tile arrangements that may still require further development or that have not been published. Encounters 920 include game system created game encounter tile arrangements, and/or user created game encounter tile arrangements that have been published. Incomplete encounter tiles 912 and encounters 920 comprise standard content tiles 916. Alternatively, game encounter tile arrangements may be stored in a mobile device while a content creator develops game content, as described in FIG. 5.

Instructions 924 include an operating system, and code to perform the processes illustrated in FIGS. 6, 7, and/or 8. It should be appreciated that alternate embodiments of remote game server 900 may have numerous variations from the embodiments described above. For example, customized hardware might also be used and/or particular elements might be implemented in hardware, software (including portable software, such as applets), or both. Further, connection to other computing devices such as network input/output devices may be employed. Instructions 924 may be stored in storage device(s) 934.

Examples of the processor 904 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The communication interface 928 may permit data to be exchanged with the communication network 1004, as shown in FIG. 10, another network, and/or any other computing device described above with respect to the computer environments described herein. Communication interface 928 may support networking technologies such as Wi-Fi, Bluetooth®, ZigBee, Ethernet, LTE, and/or GSM, and/or may utilize a dedicated Ethernet connection, fiber optics, and/or other wired or wireless network connections. Communication interface 928 is the same or similar to communication interface 536 and/or communication interface 564, as shown in FIG. 5. Communication interface 928 may be a cloud interface to cloud services or a cloud application programming interface (API). Additionally, or alternatively, the communication interface 928 may comprise a graphic user interface (GUI) and input/output devices allowing interaction with a user. It should be appreciated that alternate embodiments of communication interface 928 may have numerous variations from the embodiments described above. For example, customized hardware might also be used and/or particular elements might be implemented in hardware, software (including portable software, such as applets), or both.

Storage device(s) 934 may be used to store primitives, rule sets, real-world challenge criteria, in-game challenge criteria, encounter tiles, content tiles, encounters, graphic elements, processor instructions, operating system, or other data.

User database 932 may be any type of database, including a relational, hierarchical, object-oriented, NoSQL, XML, and/or flat file database. User database 932 includes database servers such as an SQL Server, SQLite, Oracle Database, Sybase, Informix, MySQL, MongoDB, or other database. User database 932 may be used to store user information, including user login ID, user authentication information, user preferences, user game data, user subscription information, or other data.

FIG. 10 is a block diagram of a system 1000 comprising a mobile device 504, a wearable device 556, a remote game server 900, and a communication network 1004. Mobile device 504 may be used to create content and publish the content over communication network 1004 to the remote game server 900 or retrieve game content. Sensor data from one or more sensors in the wearable device 556 may be used by the mobile device 504 to determine if a real-world challenge has been satisfied. Furthermore, location sensors in the mobile device 504 and/or wearable device 556 may be used to determine the location of a user during game content creation and/or during game play.

Figure 20:
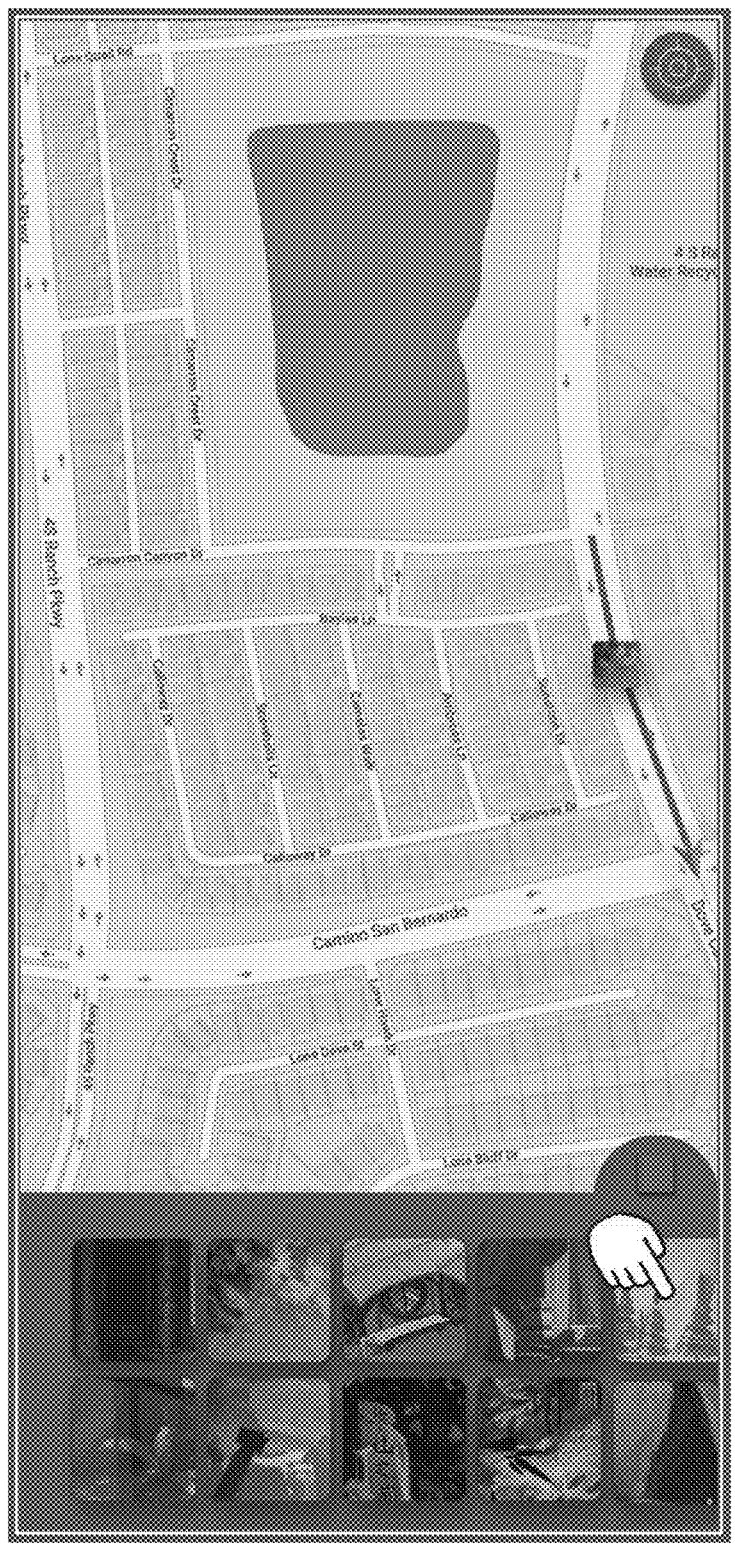
FIG. 20 is an illustration of a player selecting another encounter tile to place on a game-view real-world map in accordance with at least one embodiment of the present disclosure.
Figure 21:
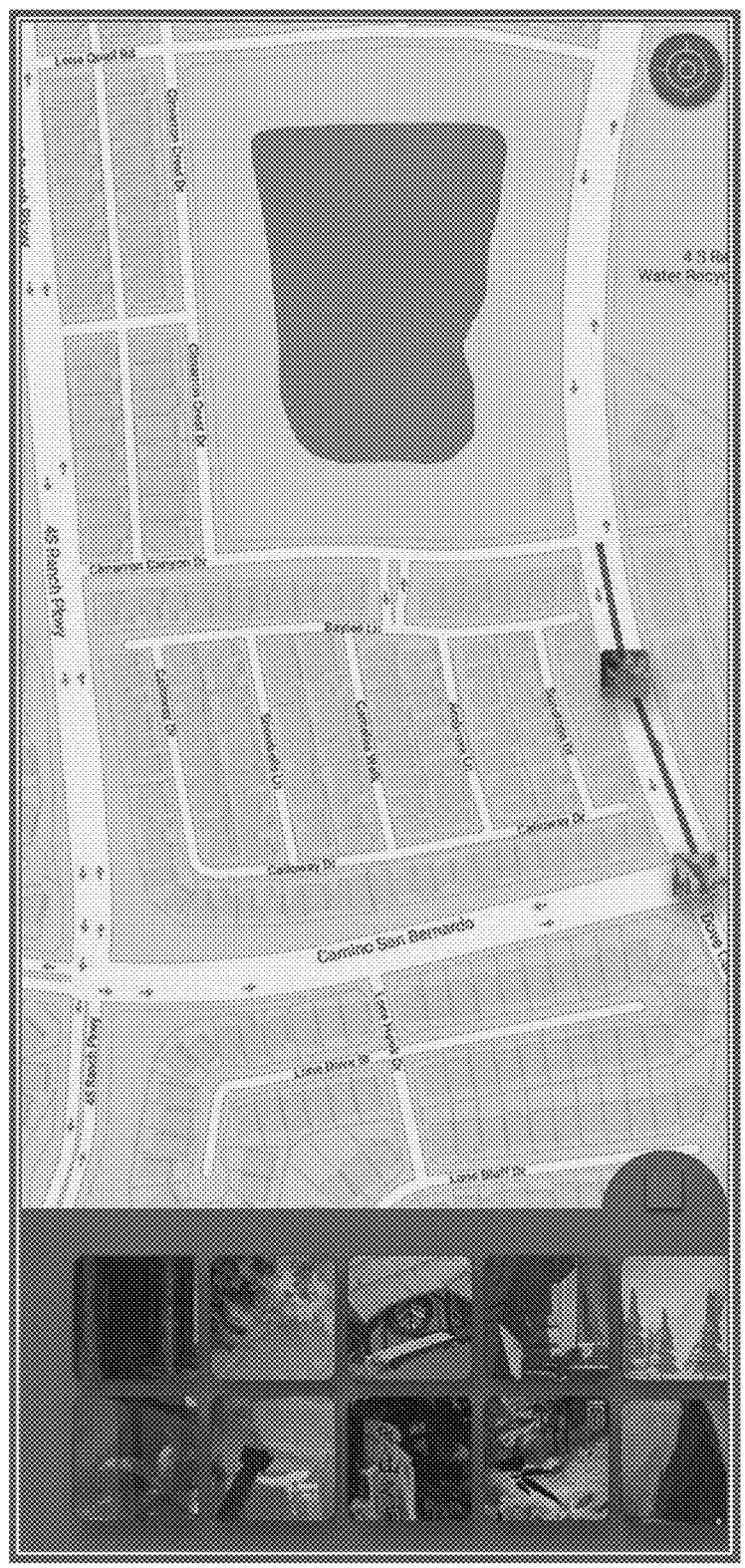
FIG. 21 is an illustration of a player placing another encounter tile on a game-view real-world map in accordance with at least one embodiment of the present disclosure.
Figure 22:
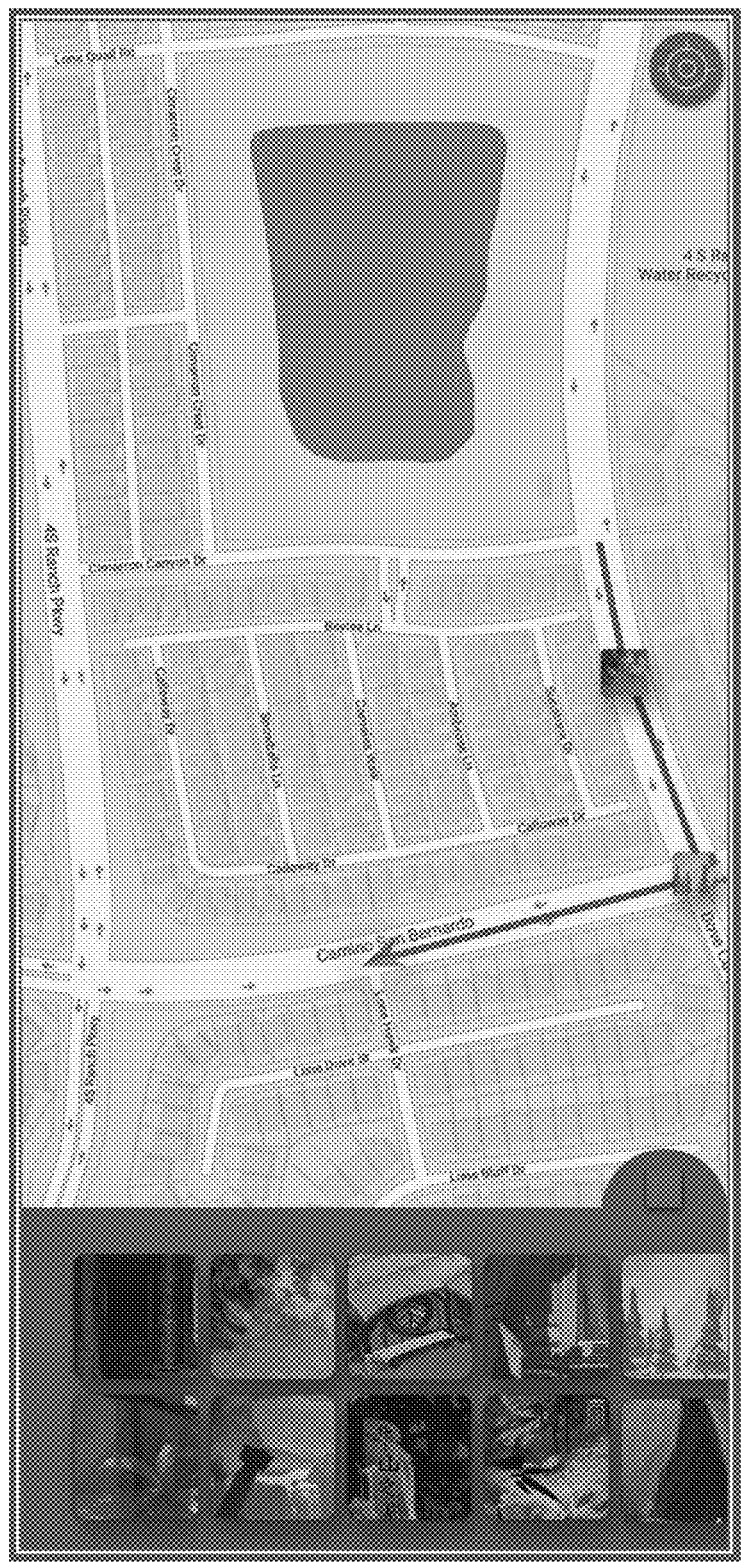
FIG. 22 is an illustration of a player traveling further along a path after placing an encounter tile on a game-view real-world map in accordance with at least one embodiment of the present disclosure.
Figure 23:
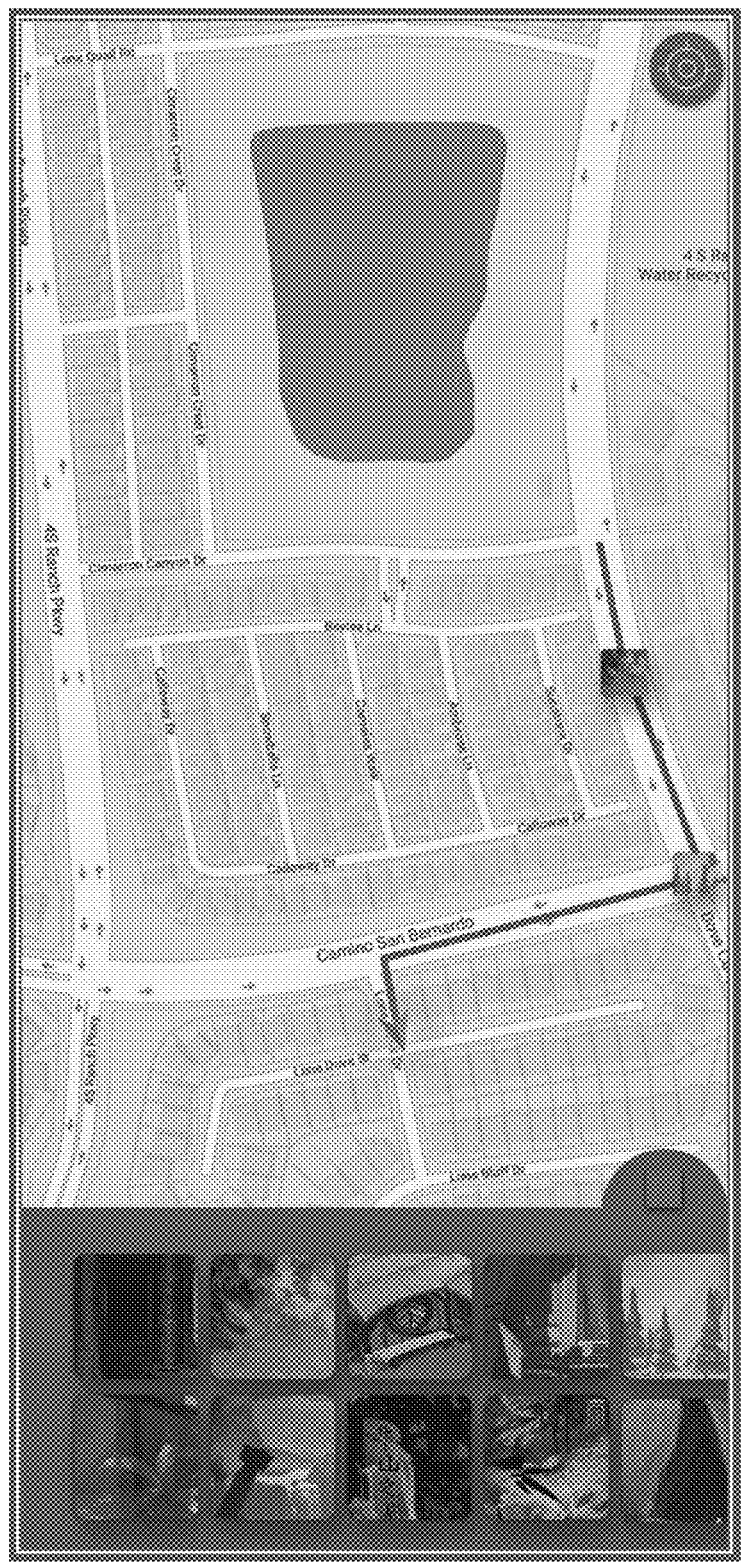
FIG. 23 is an illustration of a player traveling further along a path on a game-view real-world map in accordance with at least one embodiment of the present disclosure.
Figure 24:
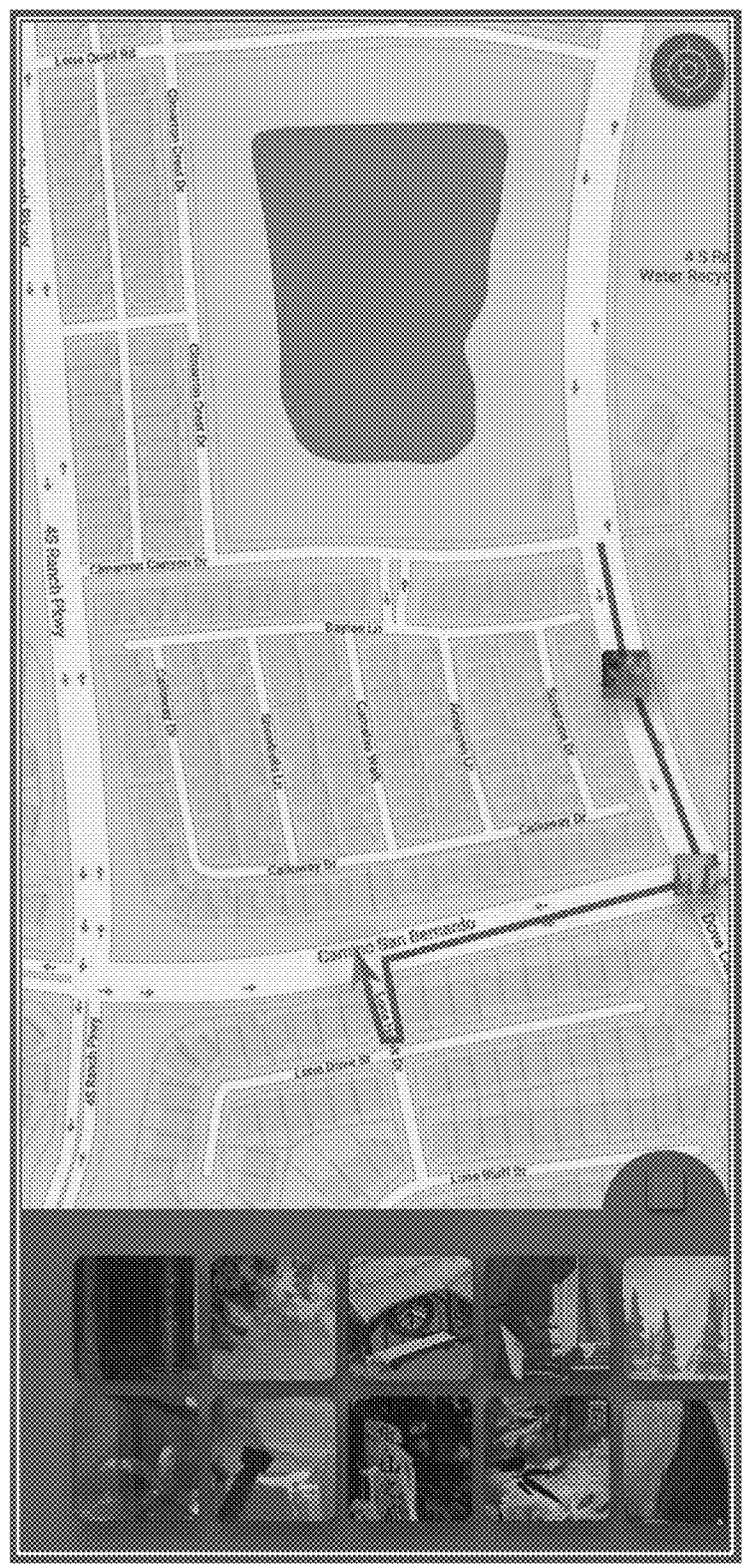
FIG. 24 is an illustration of a player traveling back along a path on a game-view real-world map in accordance with at least one embodiment of the present disclosure.
Figure 25:
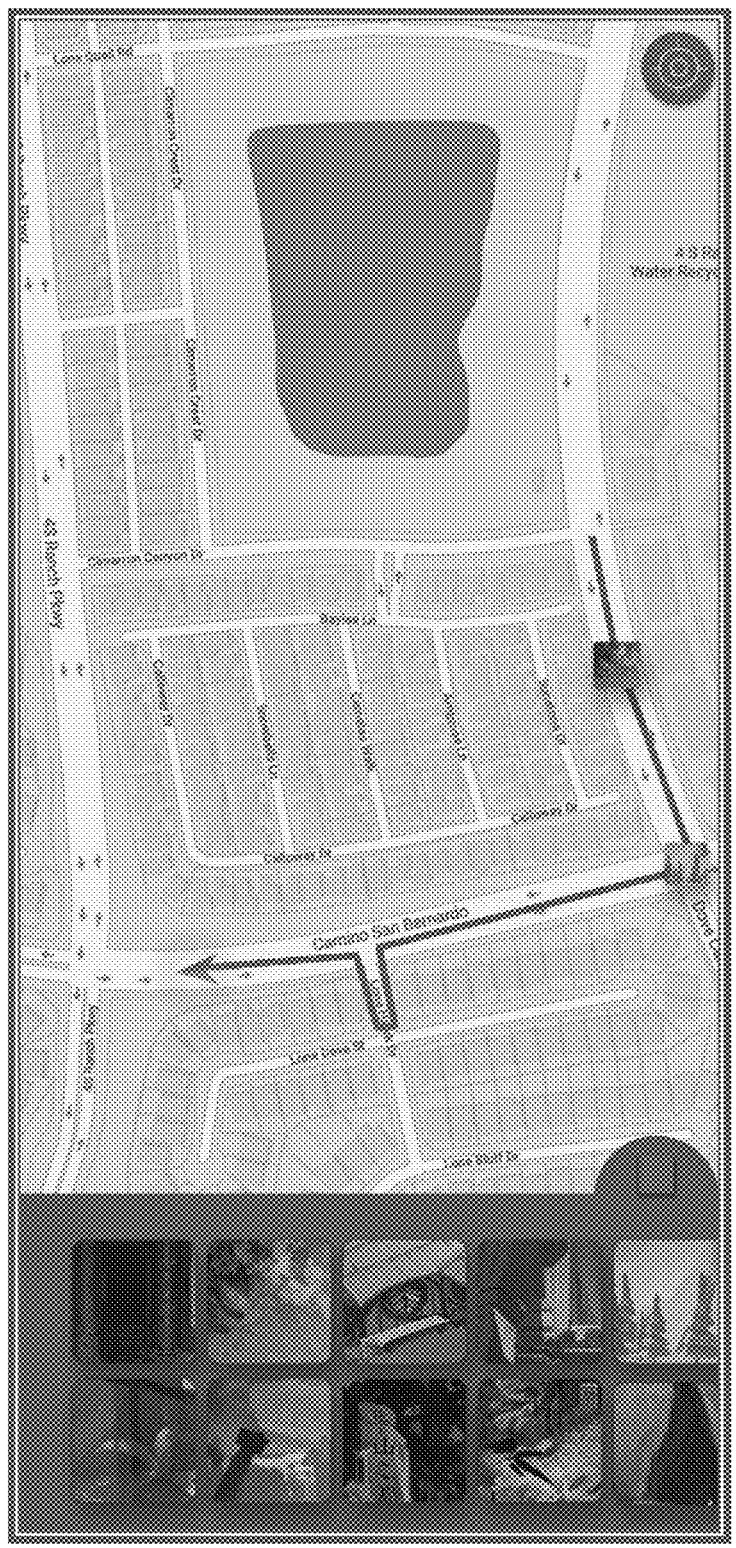
FIG. 25 is an illustration of a player continuing to travel along a path on a game-view real-world map in accordance with at least one embodiment of the present disclosure.
Figure 26:
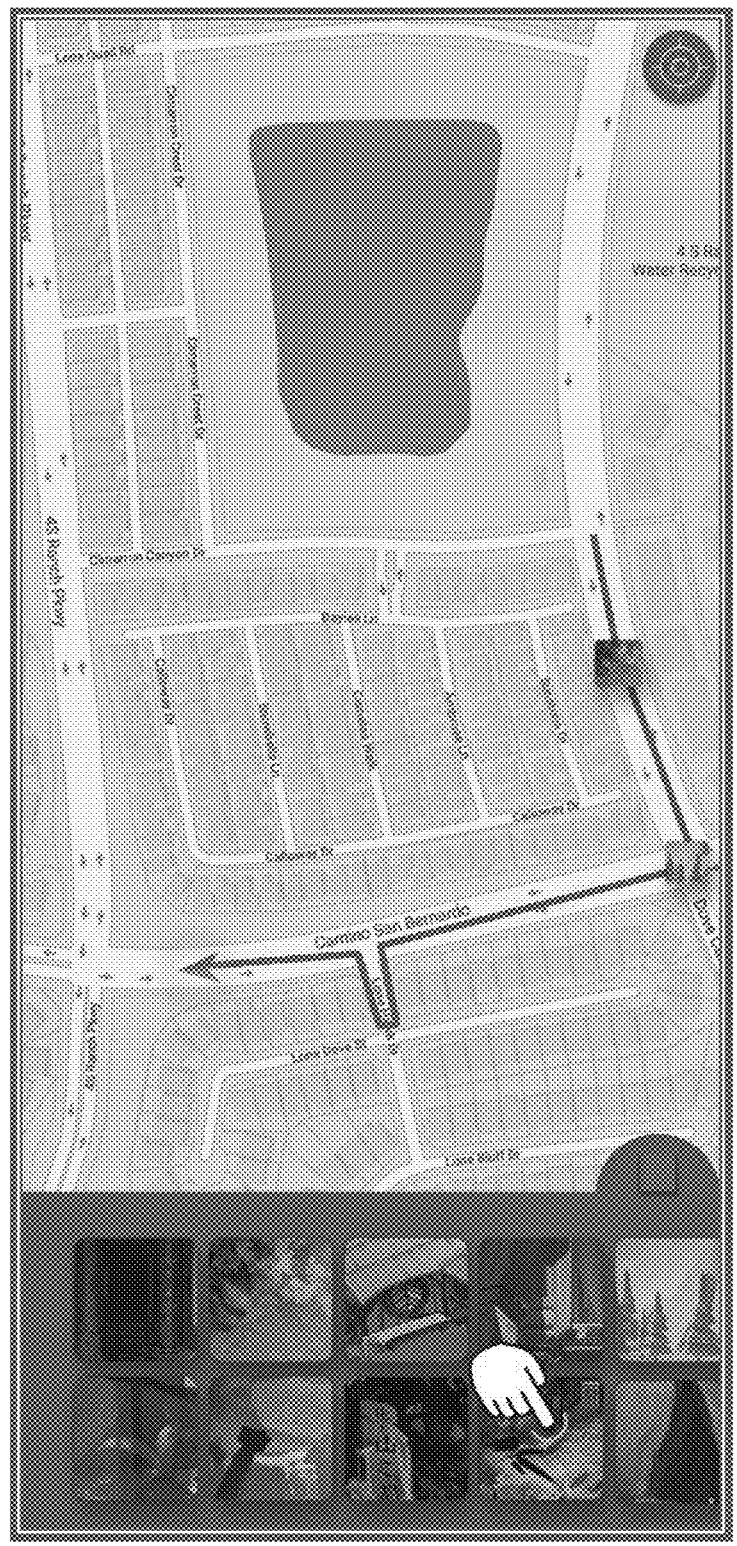
FIG. 26 is an illustration of a player selecting a third encounter tile to place on a game-view real-world map in accordance with at least one embodiment of the present disclosure.
Figure 27:
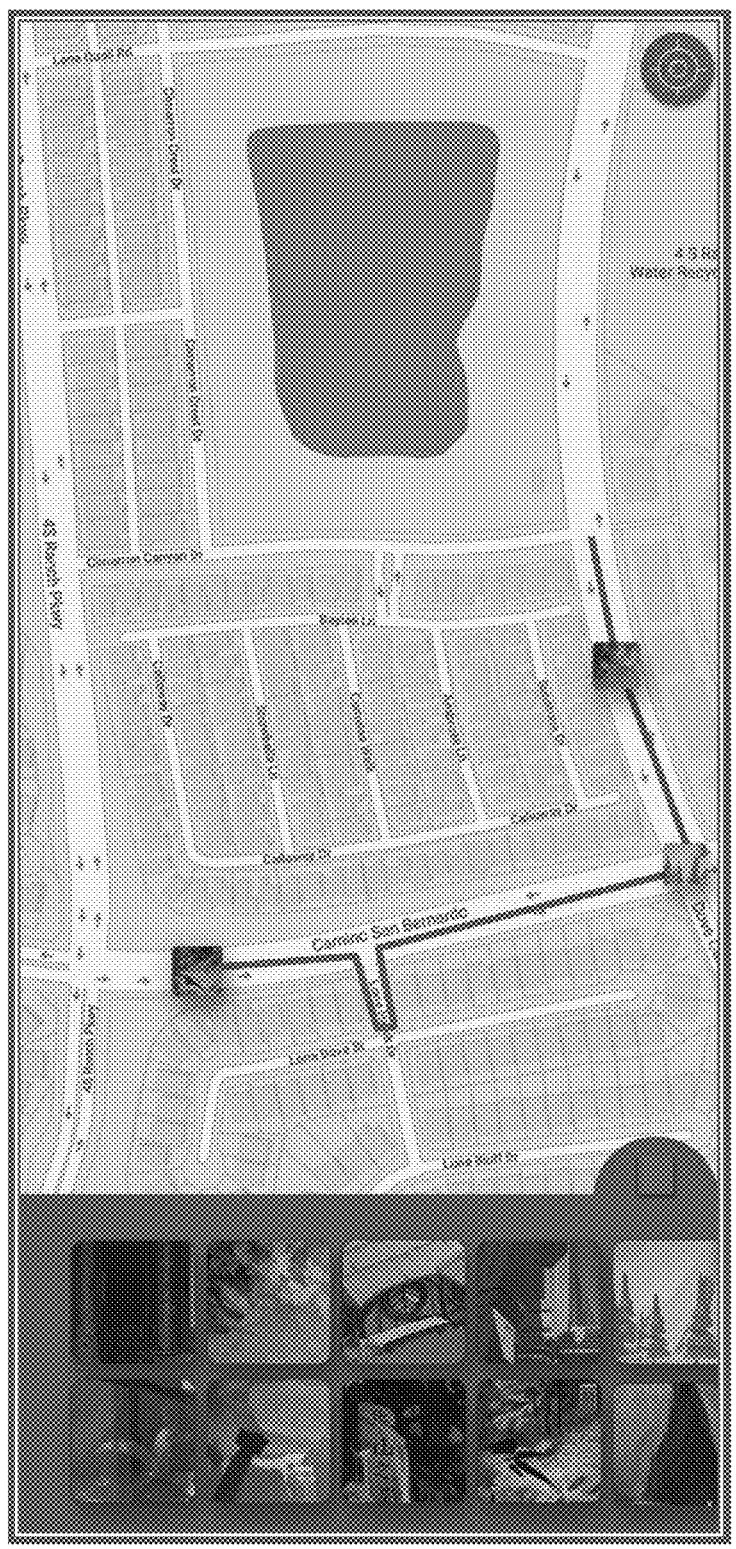
FIG. 27 is another illustration of a player placing an encounter tile on a game-view real-world map in accordance with at least one embodiment of the present disclosure.
Figure 28:
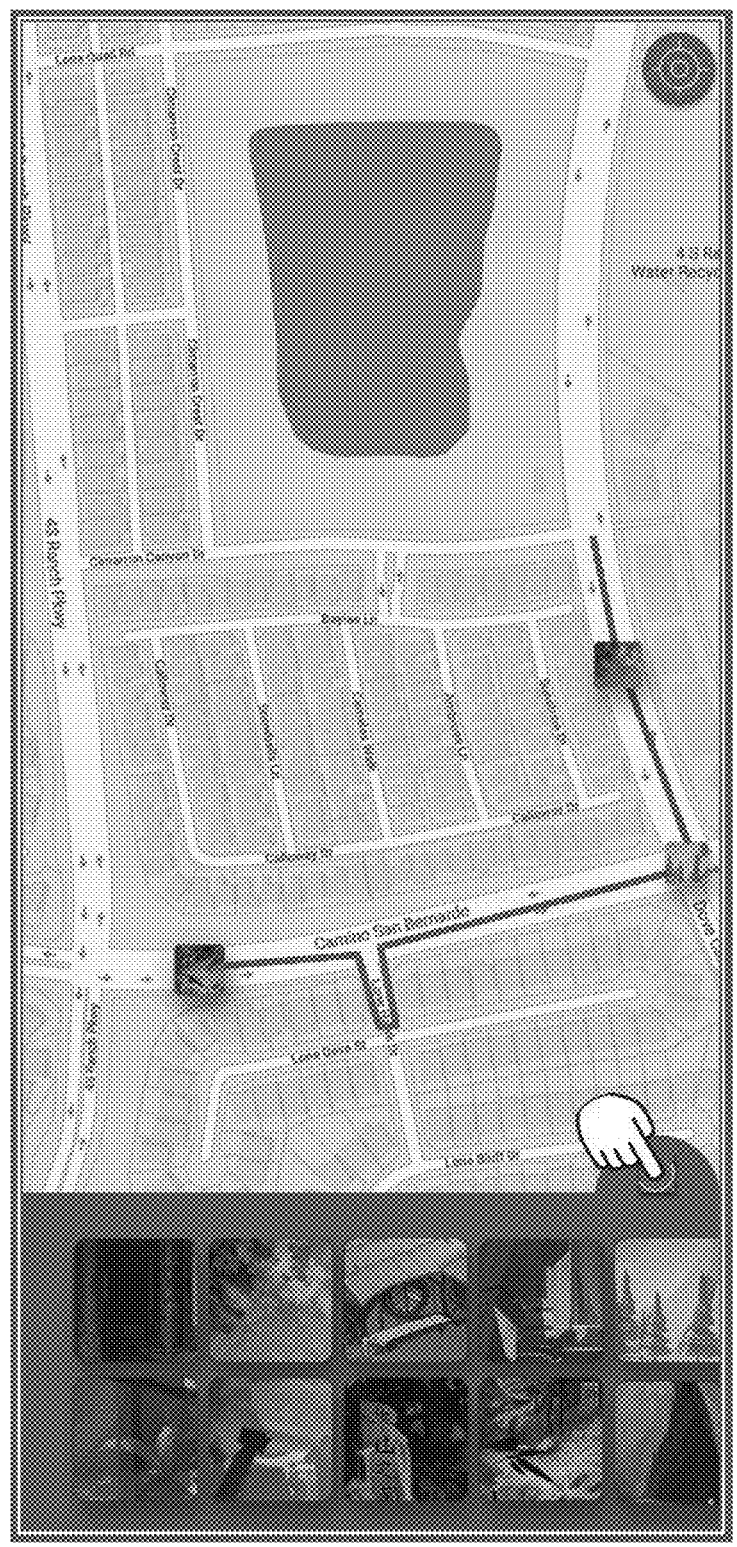
FIG. 28 is an illustration of a player pressing a stop button to cease recording a path on a game-view real-world map in accordance with at least one embodiment of the present disclosure.
Figure 29:
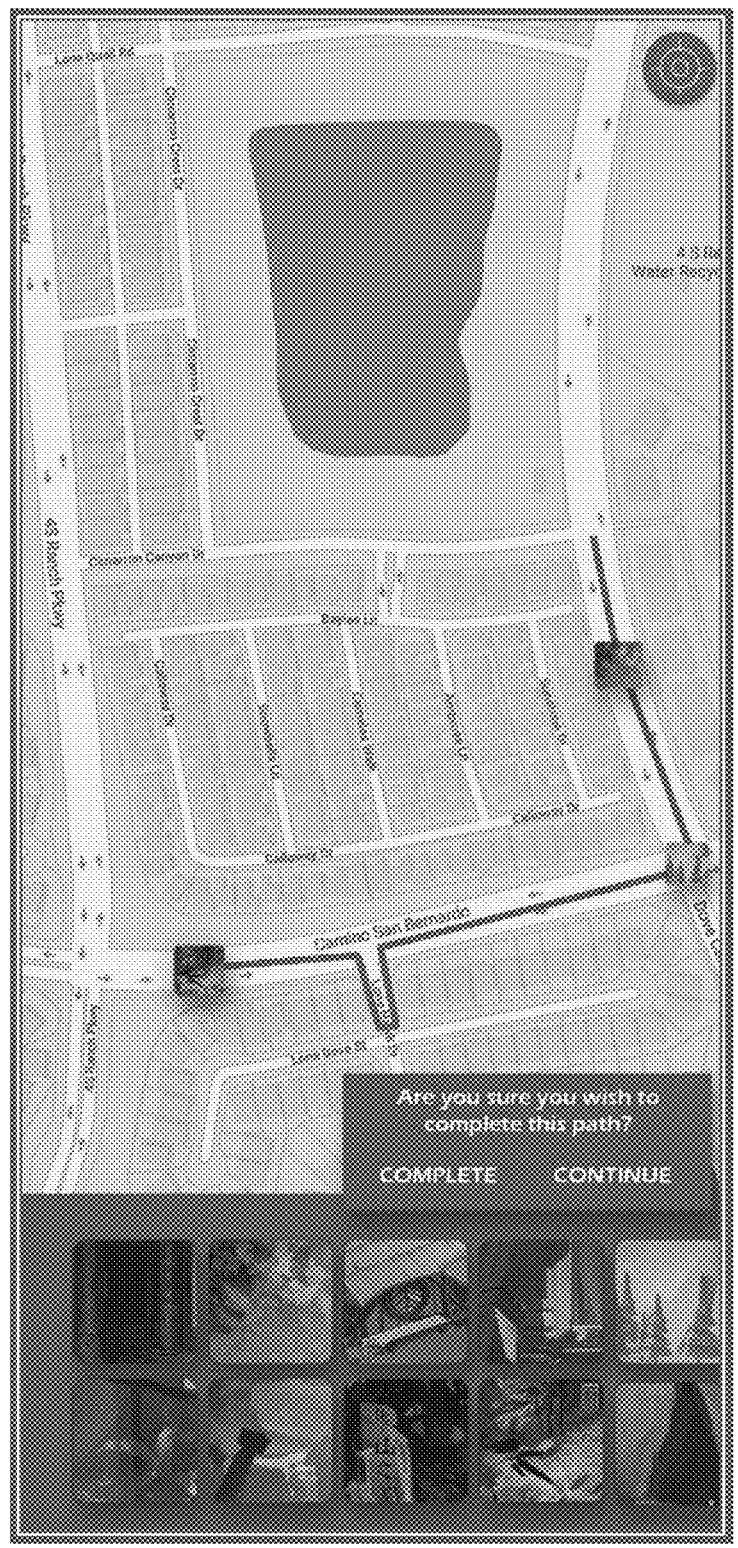
FIG. 29 is an illustration of an example confirmation box to stop recording a path on a game-view real-world map in accordance with at least one embodiment of the present disclosure.
Figure 30:
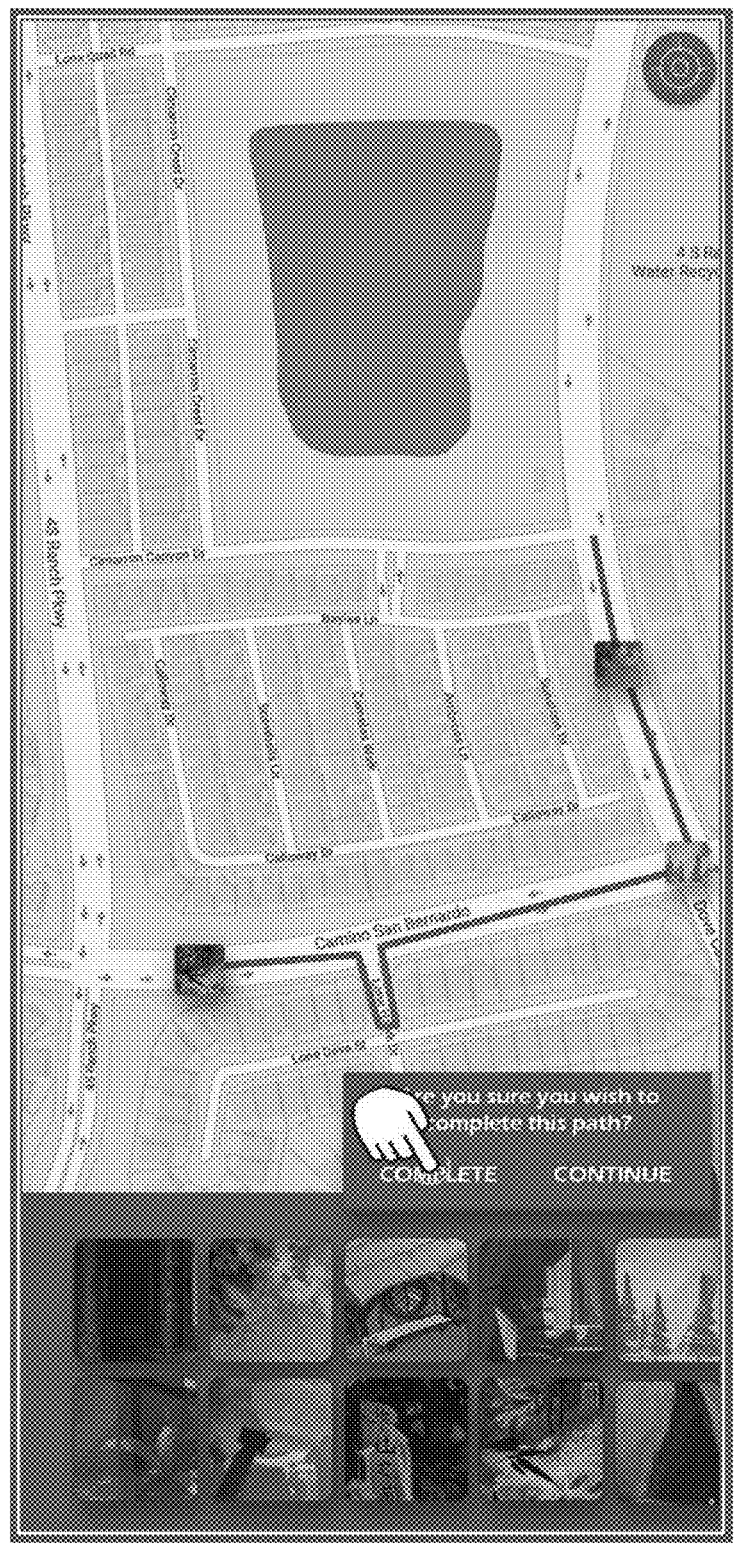
FIG. 30 is an illustration of a player confirming to stop recording a path on a game-view real-world map in accordance with at least one embodiment of the present disclosure.
Figure 31:
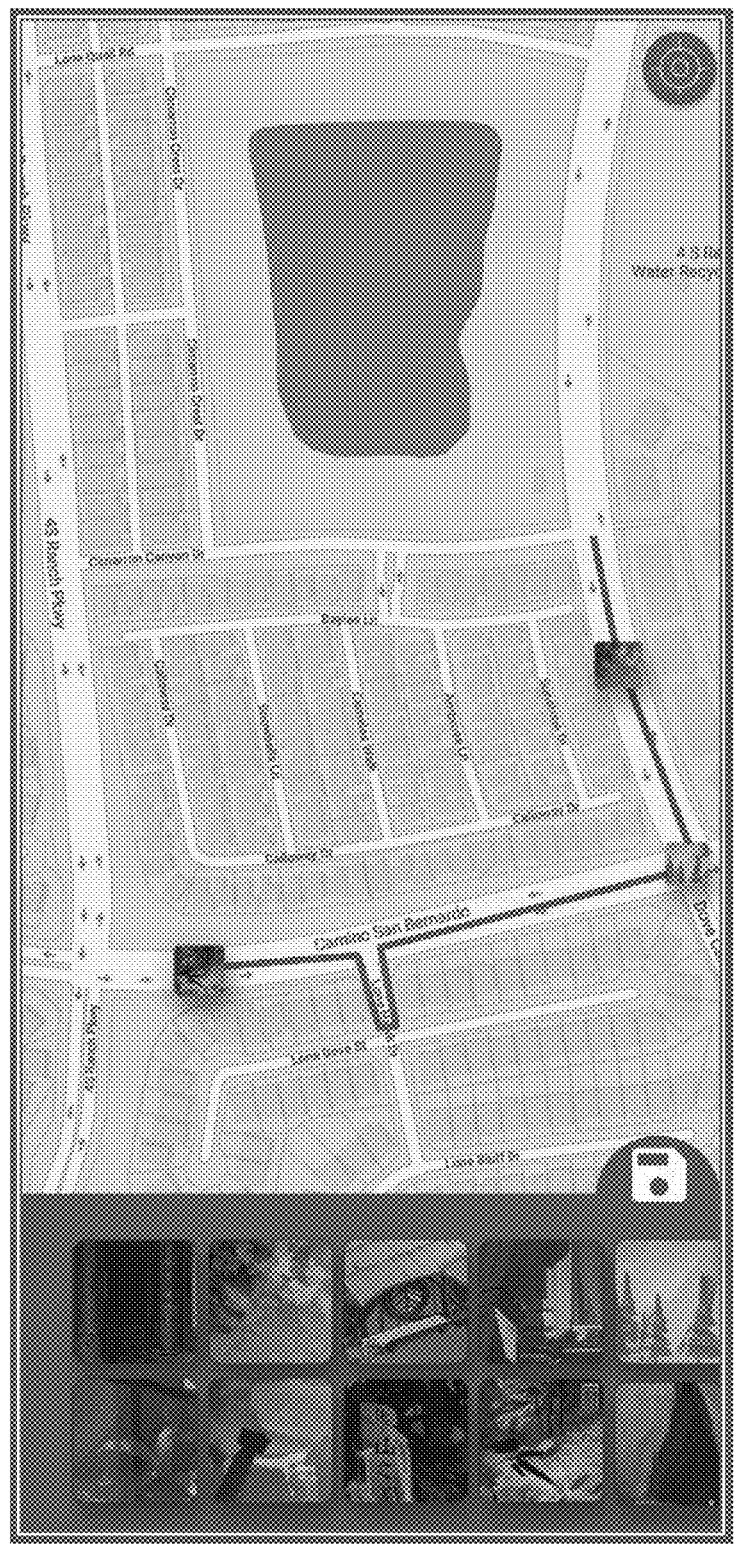
FIG. 31 is an illustration of a save button used to save a recording of a path on a game-view real-world map in accordance with at least one embodiment of the present disclosure.

When representing the challenge on the map, rather than just drawing an icon on the map (as shown, for example, in FIGS. 1 and 20), the whole map area proximate the icon representing the challenge could be augmented based on the type of tile or tile set that is being used for the challenge. For example, the map shown in FIGS. 1 and/or 20 could be modified by changing the color or attributes of the area surrounding the icon representing the challenge (e.g., the icon 162) on the map area to gray if a rocky tile set is used. As another example, the same map area could be changed to green when a forest tile set is used, and trees and other vegetation could be added to the map. The changes to the map could be additive (see, for example, U.S. Pat. No. 10,403,051, entitled "Interference Based Augmented Reality Hosting Platforms" and filed on Nov. 9, 2018, the entirety of which is hereby incorporated by reference herein, for interference based AR content), by adding and combining all the different tile sets for the different challenges that are being used for that area. Different colors could represent different tile set types. For example, dark green could represent forest and woods; light green could represent prairie and plains; yellow could represent desert and sands; red could represent lava and volcanic; blue could represent water and ocean; and silver could represent industrial and city. The colors could be blended for overlapping challenges.

Communication network 1004 may include networking technologies such as Wi-Fi, Bluetooth®, ZigBee, Ethernet, LTE, and/or GSM, and/or may utilize a dedicated Ethernet connection, fiber optics, and/or other wired or wireless network connections. Additionally, communication network 1004 may be a cloud network allowing access to cloud services.

Figure 11:
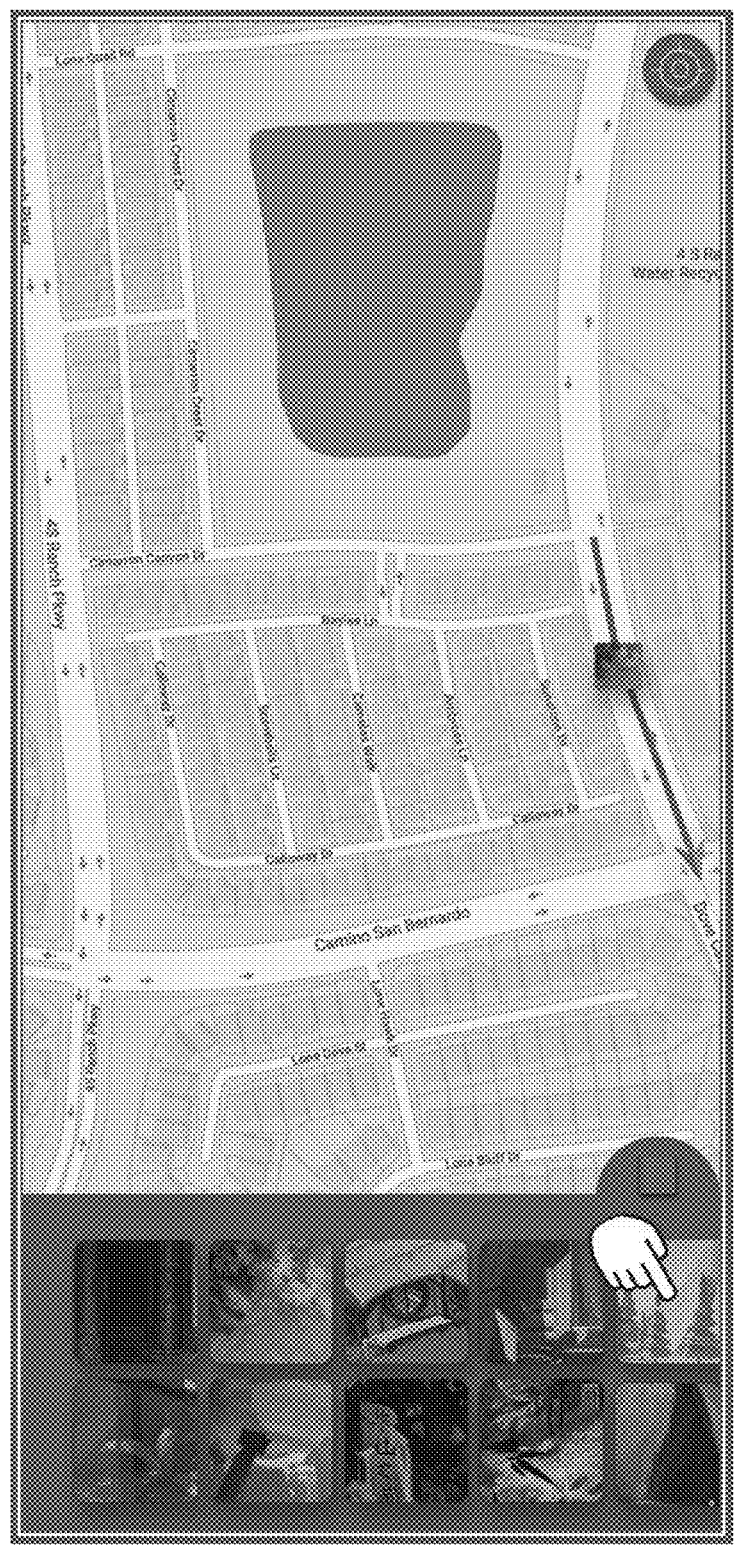
FIG. 11 is an illustration of placing encounter tiles on a game-view real-world map in accordance with at least one embodiment of the present disclosure.
Figure 13A:
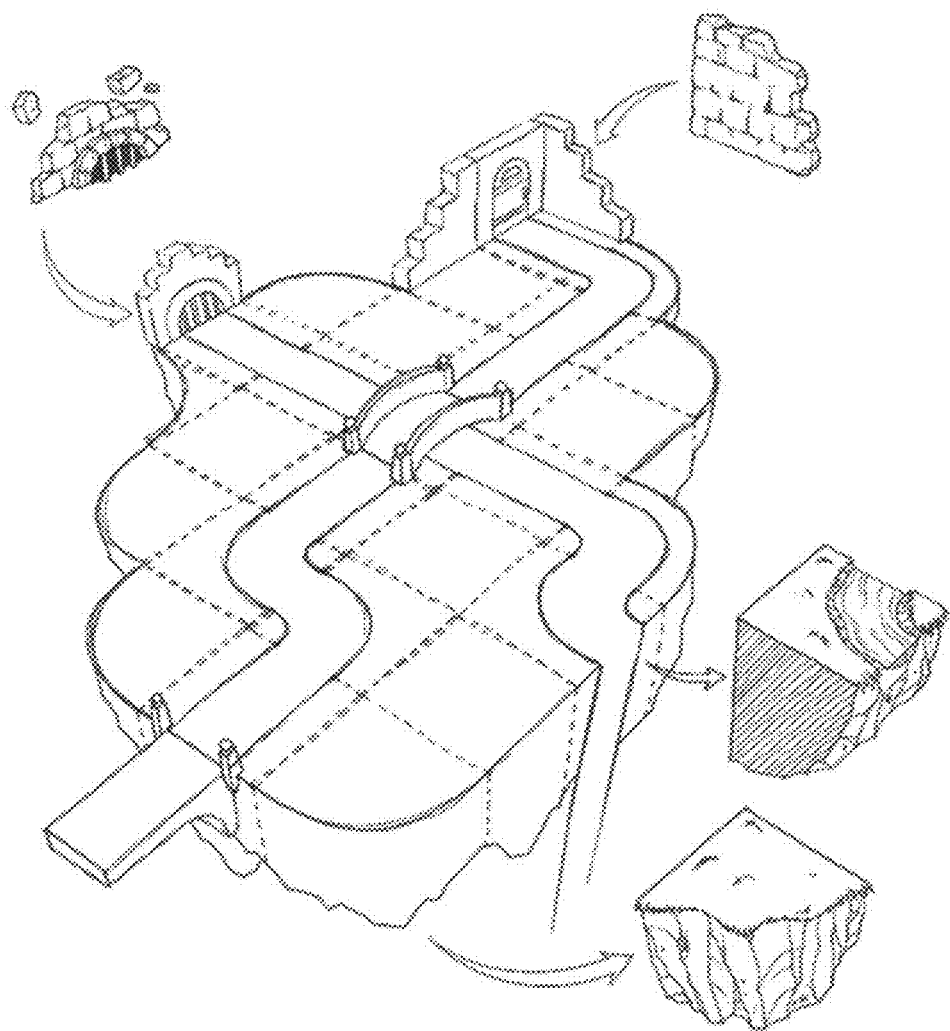
FIG. 13A is an illustration of a mockup of a dungeon tile arrangement in accordance with at least one embodiment of the present disclosure.
Figure 13B:
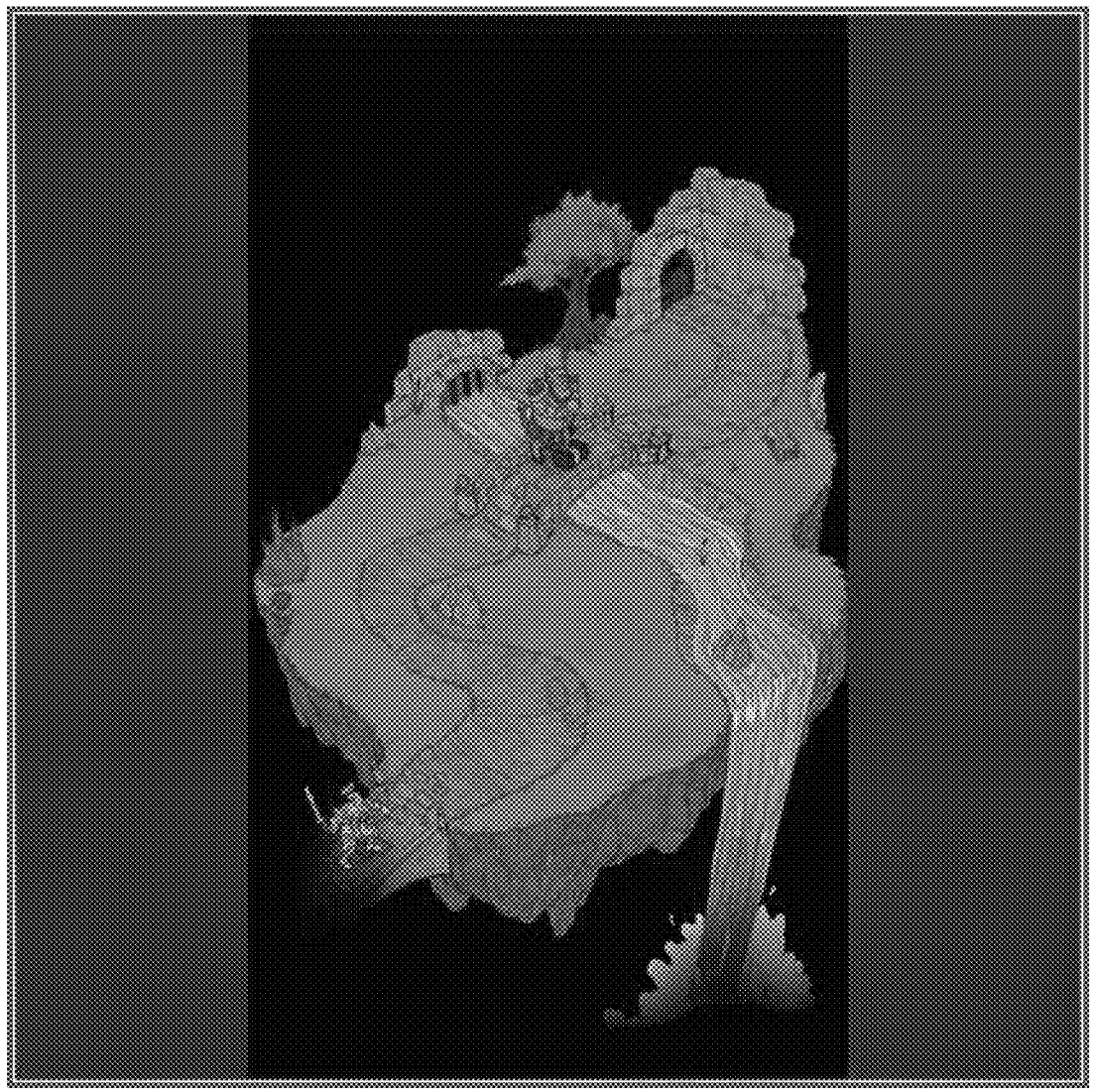
FIG. 13B is a rendered tile arrangement including a path, water, character, monster, trap, gates, bridges, and chest in accordance with at least one embodiment of the present disclosure.
Figure 13C:
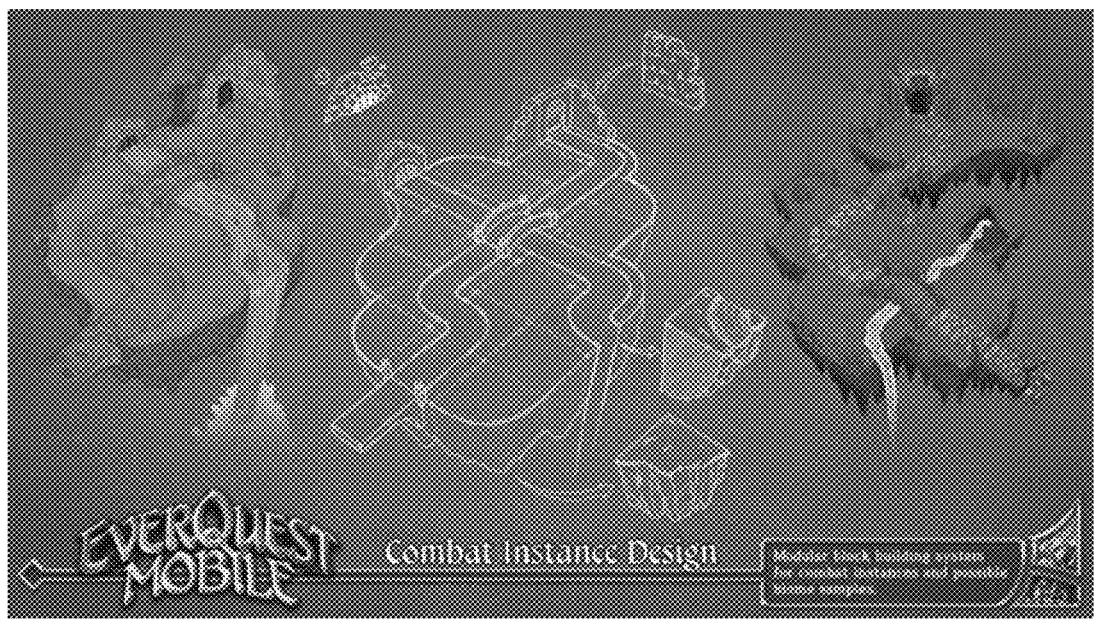
FIG. 13C is an illustration of a mockup and two rendered tile arrangements in accordance with at least one embodiment of the present disclosure.
Figure 14A:
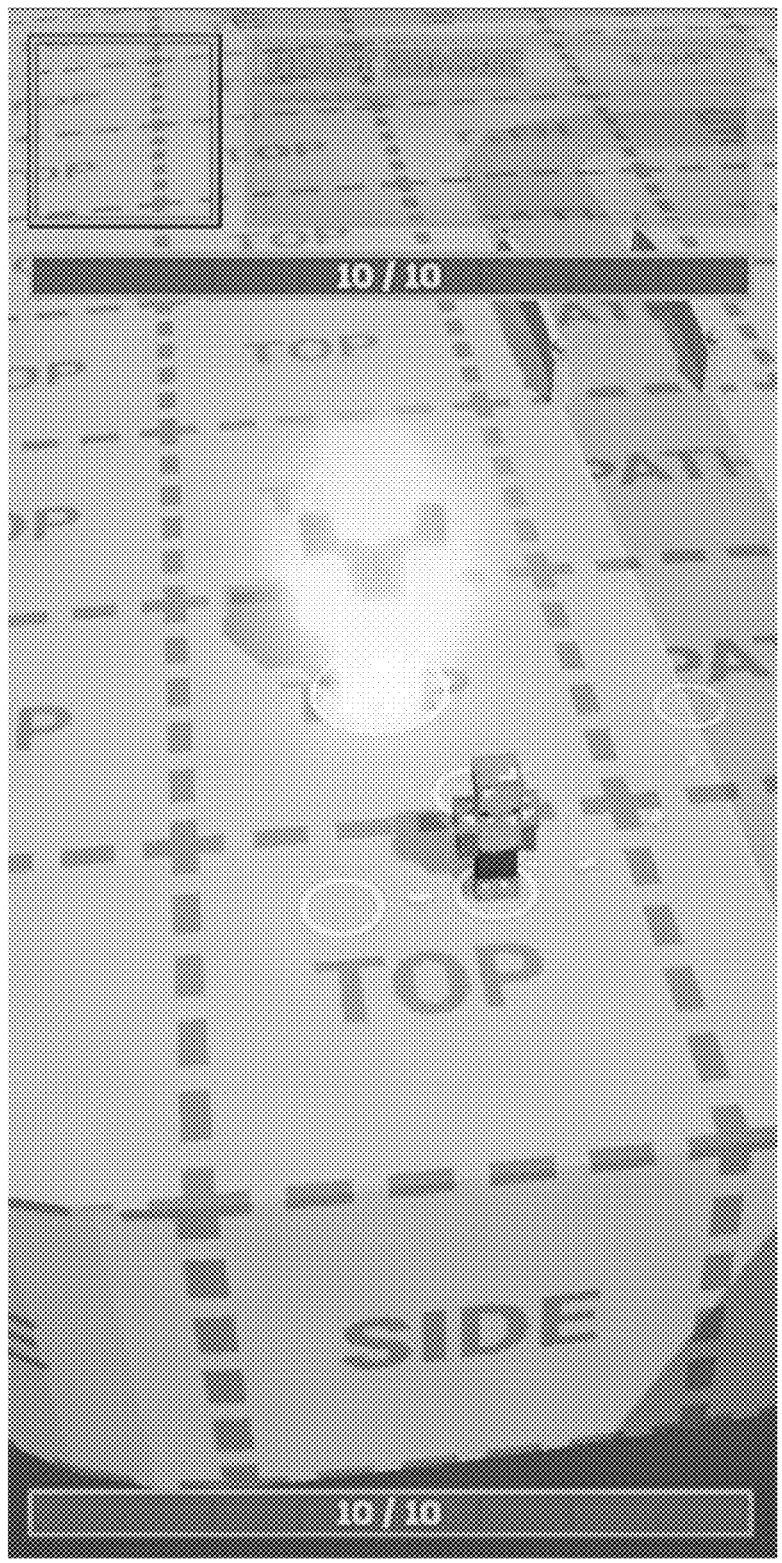
FIG. 14A is an illustration of a dungeon arrangement comprising block tiles deployed and rendered on a mobile device in accordance with at least one embodiment of the present disclosure.
Figure 14B:
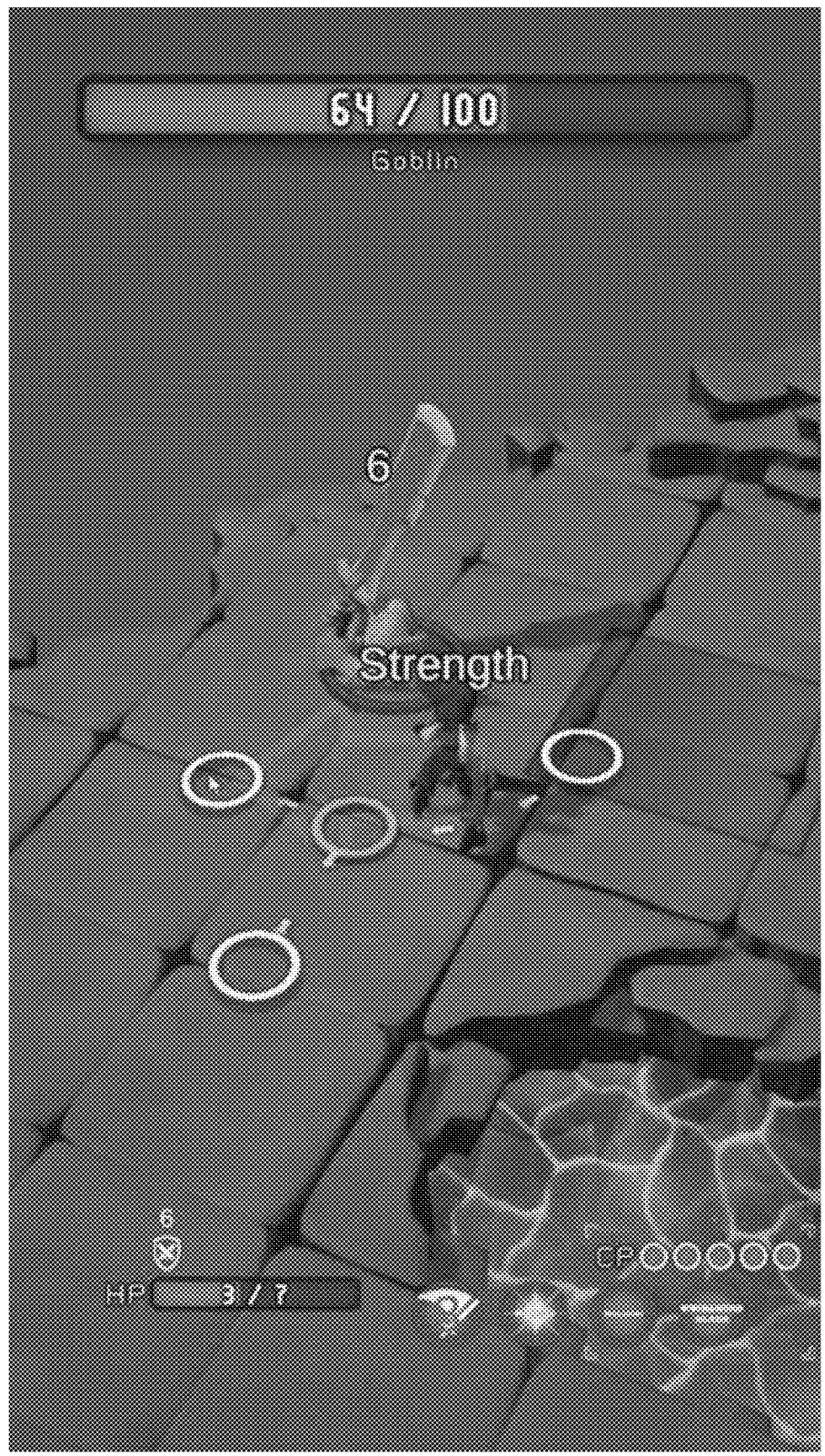
FIG. 14B is a prototype 3D dungeon tile arrangement having combat elements in accordance with at least one embodiment of the present disclosure.
Figure 15:
FIG. 15 is a prototype dungeon tile arrangement having combat elements in accordance with at least one embodiment of the present disclosure.
Figure 16:
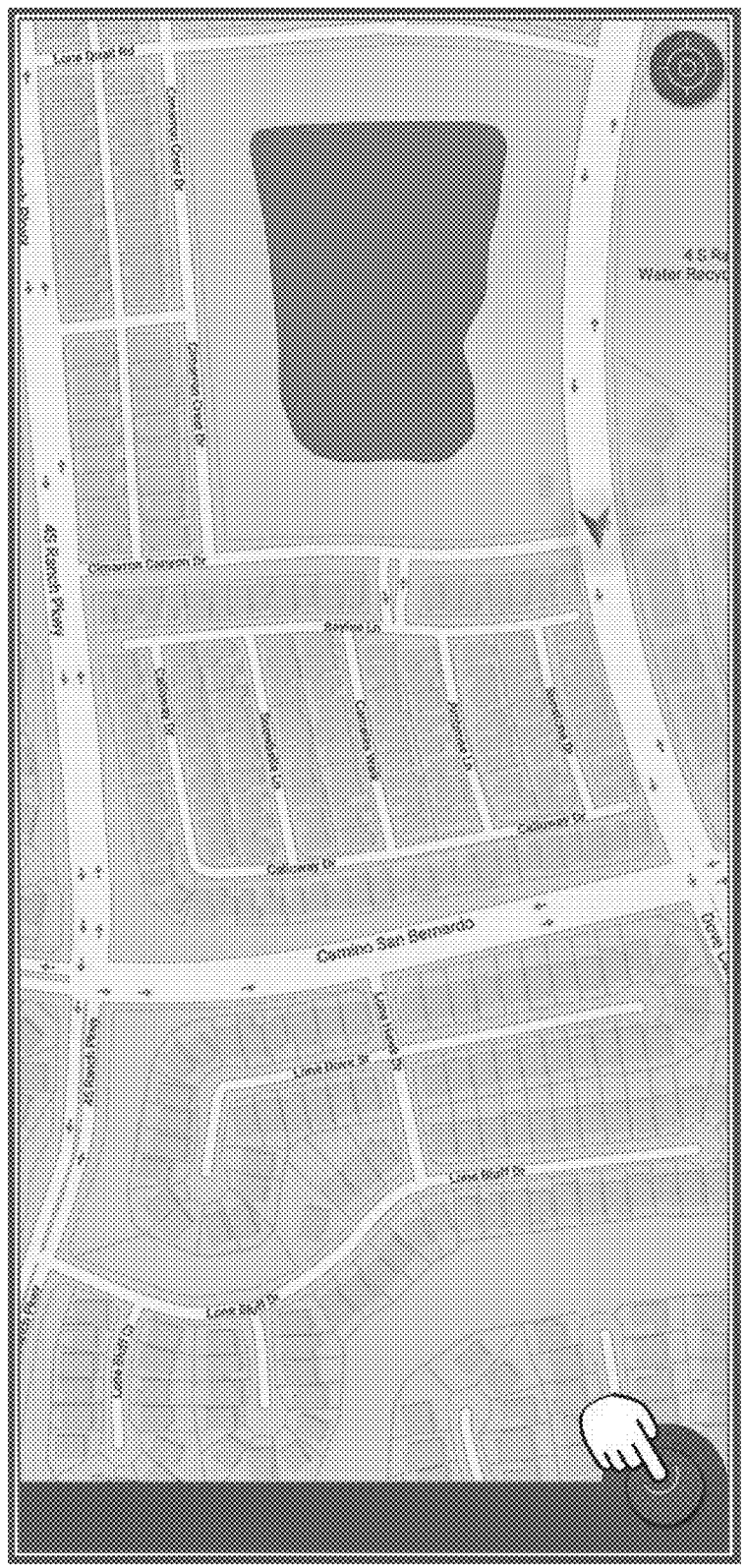
FIG. 16 is an illustration of a player pressing a record button to record a path on a game-view real-world map in accordance with at least one embodiment of the present disclosure.
Figure 17:
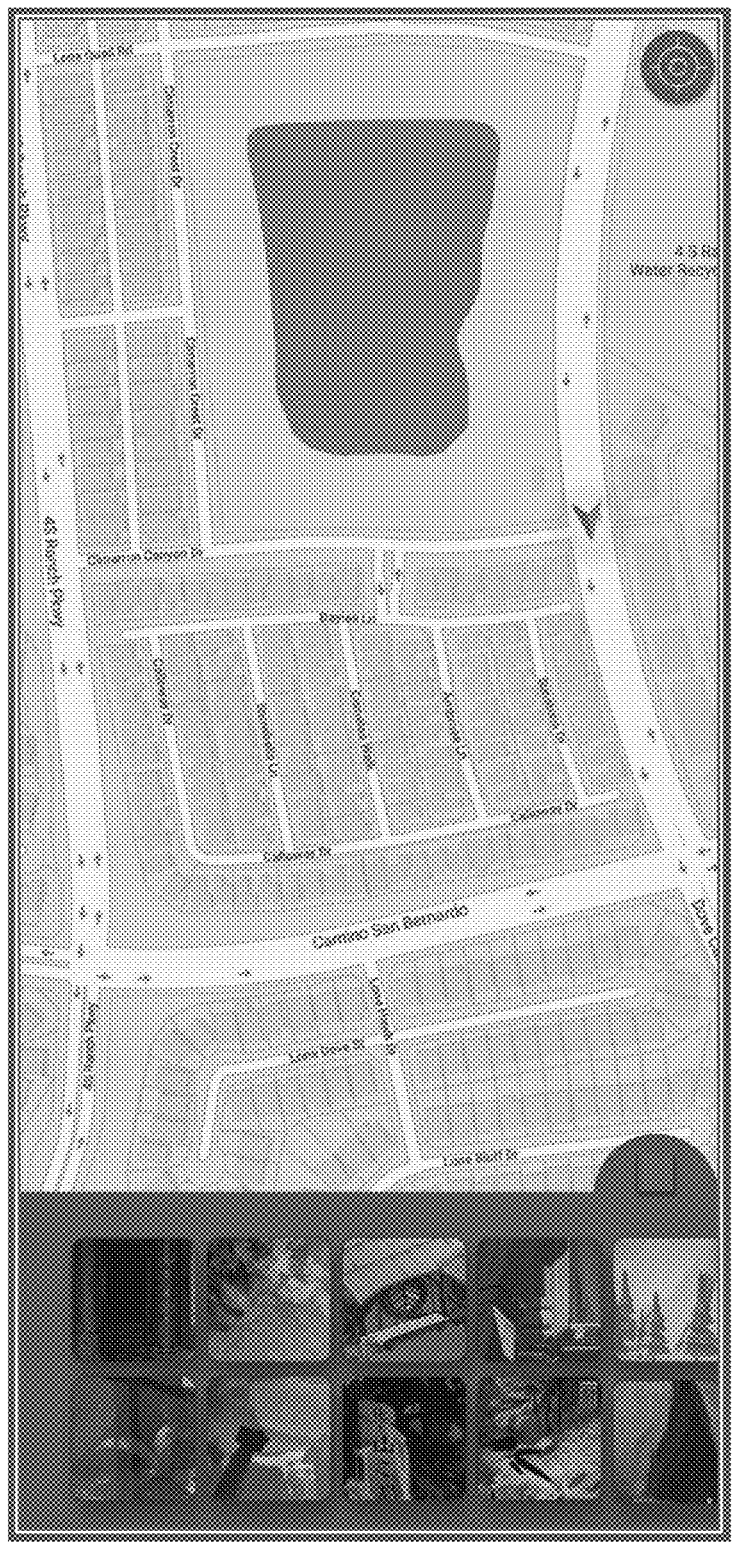
FIG. 17 is an illustration of a panel of encounter tiles for placement on a game-view real-world map in accordance with at least one embodiment of the present disclosure.
Figure 18:
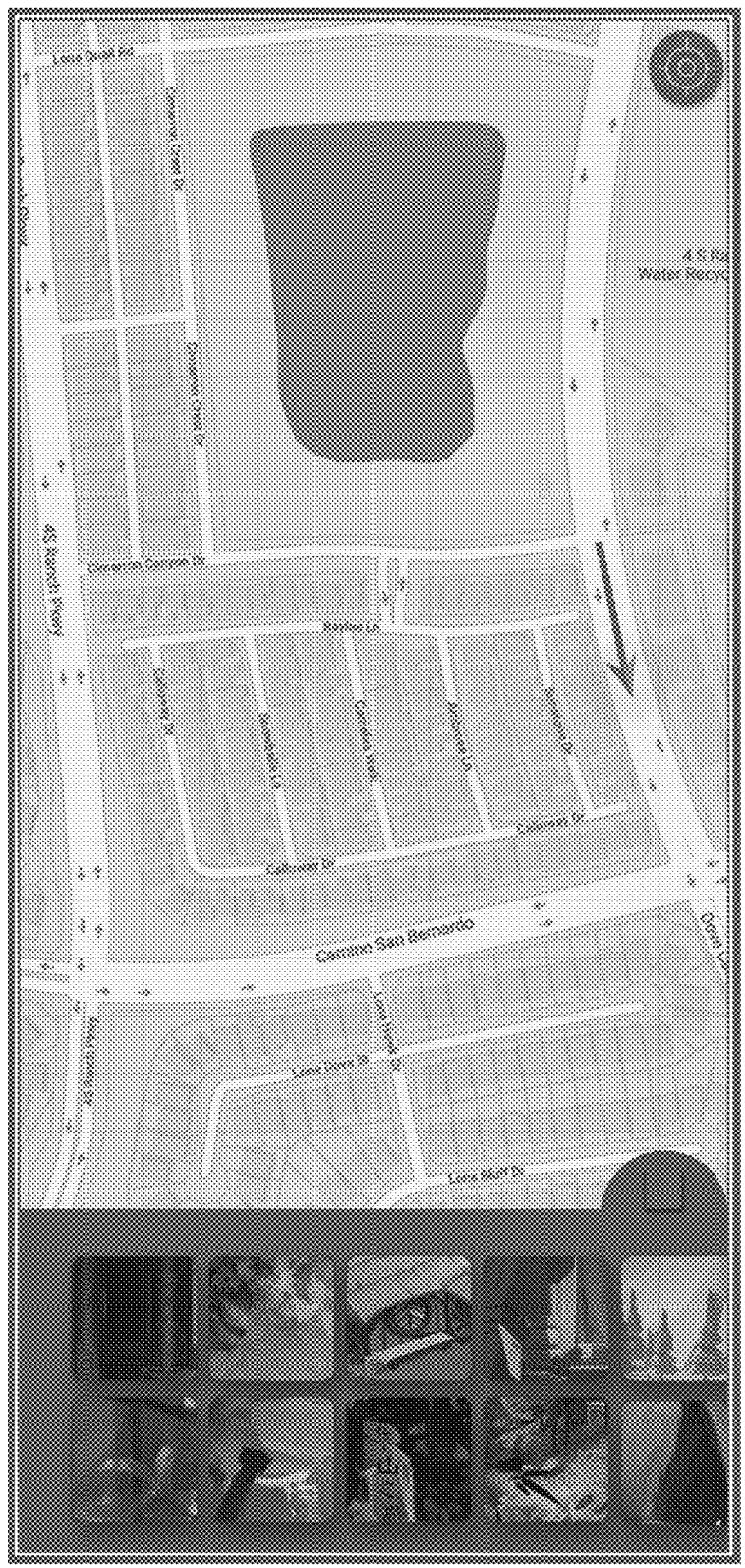
FIG. 18 is an illustration of a path being drawn under a player moving on a game-view real-world map in accordance with at least one embodiment of the present disclosure.
Figure 19:
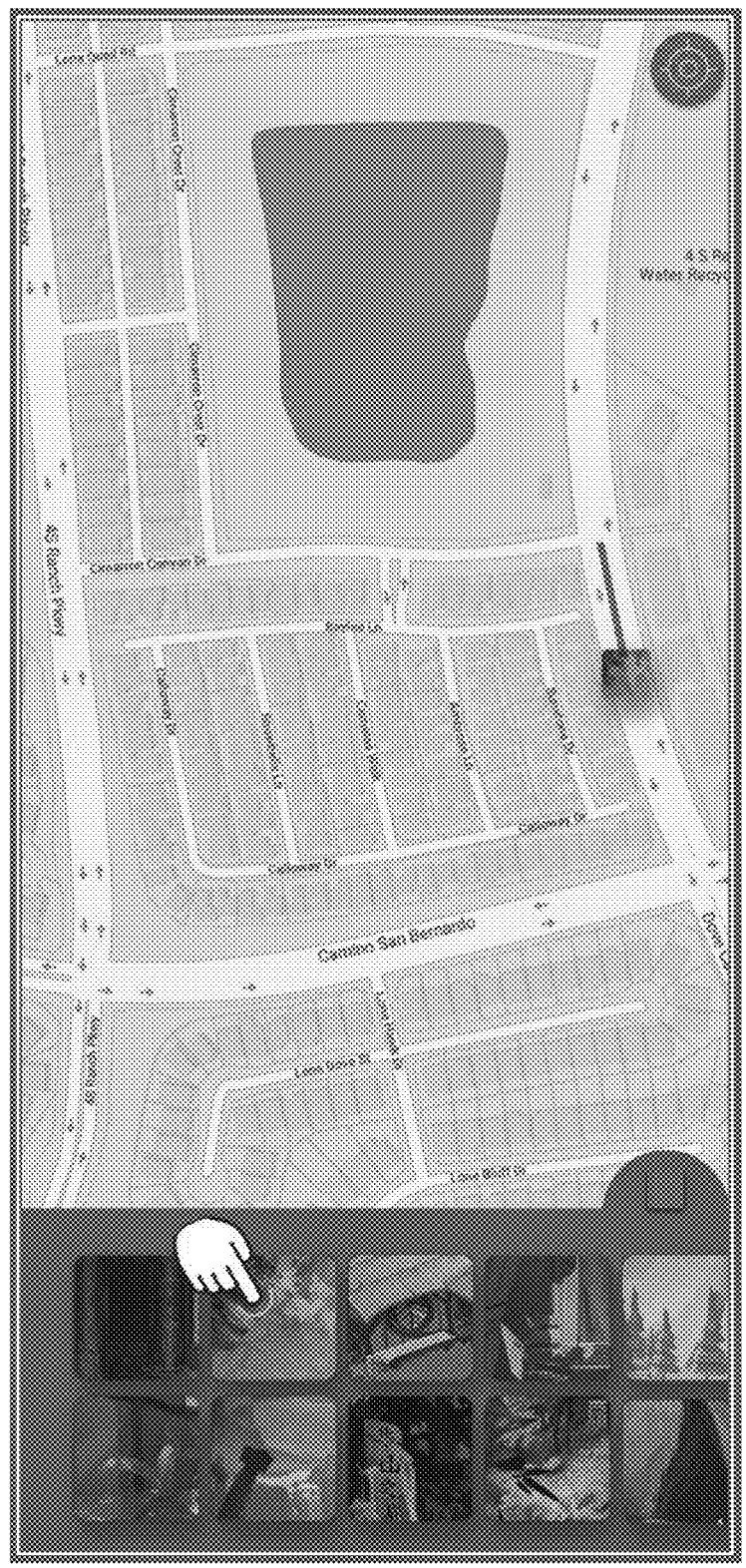
FIG. 19 is an illustration of a player placing an encounter tile on a game-view real-world map in accordance with at least one embodiment of the present disclosure.

Additional details of the application are shown in FIGS. 11-31. Specifically, FIG. 11 is an alternate depiction of FIG. 1; FIGS. 12A-12C are alternate depictions of FIGS. 2A-2C, respectively; FIGS. 13A-13C are alternate depictions of FIGS. 3A-3D; and FIGS. 14A-14B are alternate depictions of FIGS. 4A-4B. FIG. 15 is another example illustration of a dungeon arrangement. FIGS. 16-31 show a series of additional steps illustrating placement of encounter tiles on a game-view real-world map that apply to FIG. 1. More specifically, FIGS. 16-27 illustrate in more granularity the process described above with respect to FIG. 1, whereby a user's real-world path 158 is tracked on a real-world map 150. At various points along the user's path 158, the user may, at the user's discretion, place an encounter tile (e.g., an encounter tile 162, 174). The number of encounter tiles a user is able to place may be based, for example, on the length of the path 158 and/or on a level/ranking of the player. Also, as discussed, above, placement of a tile on the map could trigger or otherwise cause the map to be augmented (e.g., by changing the color and/or attributes of the map) in the area immediately around the tile, based on the tile type. Thus, for example, a wilderness tile could cause trees to appear on the map around the tile, a desert tile may cause sand to appear on the map around the tile, and so forth. As illustrated in FIGS. 28-31, when the user is finished, the user can select a "stop" button, which results in a prompt being displayed to the user asking if the user wishes to complete the path, with options to "complete" the path or to "continue" creating the path. If the user selects "continue," then the "stop" button is again displayed and the user can continue creating the path. If the user selects "complete," then the "stop" button is replaced with a "save" button that, if pressed, will save the newly created dungeon. The user may continue to edit the dungeon, however, including by placing more encounter tiles and/or by filling encounters represented by the encounter tiles with additional content.

A digital content creation system according to one embodiment of the present disclosure comprises: a first memory storing an encounter tile set having one or more encounter tiles, a content tile set having one or more content tiles; a sensor data receiver; a user interface; a display screen; a processor; and a second memory storing instructions for execution by the processor that, when executed, cause the processor to: receive real-world location data via the sensor data receiver, the real-world location data corresponding to a physical location; display, on the display screen and based on the location data, one or more encounter tiles from the encounter tile set; receive, from the user interface, an identification of a selected encounter tile of the displayed one or more tiles of the encounter tile set; and associate, in a computer game, the selected encounter tile with the physical location.

Aspects of the foregoing digital content creation system may include: wherein the second memory stores additional instructions for execution by the processor that, when executed, cause the processor to: display, on the display screen, an encounter space corresponding to the selected encounter tile, the encounter space divided into a plurality of content spaces; wherein the second memory stores additional instructions for execution by the processor that, when executed, cause the processor to: display, on the display screen, one or more content tiles from the content tile set, at least one of the content tiles corresponding to a real-world challenge criterion that requires real-world sensor data to be satisfied and an in-game challenge criterion that can be satisfied without real-world sensor data; associate, based on a first indication received from the user interface, a first selected content tile from the displayed one or more tiles of the content tile set with a first selected content space from among the plurality of content spaces; display the first selected content tile in the first selected content space; and associate, based on a second indication received from the user interface, a second selected content tile from the displayed one or more tiles of the content tile set with a second selected content space from among the plurality of content spaces; and display the second selected content tile in the second selected content space; wherein the second memory stores additional instructions for execution by the processor that, when executed, cause the processor to: adjust, based on a signal received from the user interface, an orientation of the first selected content tile relative to the first selected content space; wherein the first content tile space is adjacent the second content tile space, and further wherein the second content tile may only be associated with the second content tile space if a second characteristic of the second content tile matches a first characteristic of the first content tile; wherein the second memory stores additional instructions for execution by the processor that, when executed, cause the processor to: display a content tile from the set of content tiles in each of the plurality of content spaces, at least one of the displayed content tiles corresponding to a real-world challenge criterion that requires real-world sensor data to be satisfied and an in-game challenge criterion that can be satisfied without real-world sensor data; receive, from the sensor data receiver, real-world sensor data; determine whether the at least one in-game challenge criterion is satisfied and, based on the real-world sensor data, whether the at least one real-world challenge criterion is satisfied; and update a game state of the computer game based on the determination; wherein the real-world challenge criterion corresponds to a change in physical location, and the real-world sensor data comprises location data; wherein the real-world challenge criterion corresponds to a heart rate, and the real-world sensor data comprises pulse data; wherein at least the sensor data receiver, the user interface, the display screen, the processor, and the second memory are provided in a mobile device, the mobile device further comprising a location sensor, a barometer, or an accelerometer; and wherein at least the sensor data receiver, the user interface, the display screen, the processor, and the second memory are provided in a mobile device, the system further comprising: a wearable device comprising a sensor, wherein the mobile device is configured to receive real-world sensor data from the sensor of the wearable device via the sensor data receiver.

A method of creating and using linked content according to another embodiment of the present disclosure comprises: receiving, at a processor of a mobile device, first location information detected by a location sensor; displaying, on a screen of the mobile device, a plurality of encounter tiles for a computer game; associating a selected encounter tile from among a plurality of encounter tiles with a physical location based on the first location information; displaying, on the screen, an encounter space corresponding to the selected encounter tile, the encounter space comprising a plurality of content spaces; receiving, via a user interface, a selection of one of the plurality of content spaces; displaying, on the screen, a plurality of content tiles, at least one of the plurality of content tiles having a first virtual challenge criterion and a first physical challenge criterion; and associating a selected content tile from among the plurality of content tiles with the selected content space.

Aspects of the foregoing method include: wherein the plurality of encounter tiles displayed on the screen comprises a subset of available encounter tiles, the subset selected based on the first location information; wherein the plurality of content tiles displayed on the screen comprises a subset of available content tiles, the subset selected based on the selected content space or a characteristic of a content tile adjacent the selected content space; wherein the first physical challenge criterion may be satisfied only upon receipt, at the processor of the mobile device, of evidence of completion of a physical challenge; wherein the physical challenge comprises at least one of covering a predetermined distance, climbing a predetermined elevation, achieving a predetermined heart rate, logging a predetermined number of steps, moving the mobile device in a predetermined pattern, playing a predetermined sport, reaching a predetermined location, or purchasing a predetermined product; wherein the evidence of completion of the physical challenge is received from a location sensor, an altitude sensor, an accelerometer, a heart rate monitor, an optical sensor, a position sensor, an orientations sensor, or a near field communication sensor; further comprising: associating a content tile with each of the plurality of content spaces to yield a completed encounter, the completed encounter corresponding to the selected encounter tile; and publishing the completed encounter via a wireless communication interface of the mobile device; further comprising: displaying, on the screen, a map and an encounter tile, the encounter tile positioned at a specific location on the map; determining, with the processor and based on second location information received from the location sensor, that the mobile device is located within a predetermined distance of the specific location; requesting user input regarding the encounter tile; displaying, based on a signal generated by the user interface, a completed encounter space corresponding to the encounter tile, the completed encounter space comprising an arrangement of content tiles, at least one of the content tiles comprising a second virtual challenge criterion and a second physical challenge criterion; determining, with the processor, whether the second virtual challenge criterion is satisfied and, based on sensed real-world data received via a sensor data interface, whether the second physical challenge criterion is satisfied; and further comprising: updating, based on the determination regarding the second virtual challenge criterion and the second physical challenge criterion, a game state of the computer game.

A system according to one embodiment of the present disclosure comprises: a processor; a communication interface configured to transmit and receive data via a communication network; and a user database comprising information about each of a plurality of users; and a memory storing: a first plurality of incomplete encounter tiles; a first plurality of standard content tiles, one or more of the first plurality of standard content tiles having a virtual challenge criterion and a real-world challenge criterion, the real-world challenge criterion requiring sensed real-world data to be satisfied; a first plurality of encounters, wherein each of the first plurality of encounters corresponds to a completed encounter tile linked to a specific geographical location and comprising a user-configured arrangement of standard content tiles within an encounter space; instructions for execution by the processor, that, when executed, cause the processor to: receive, via the communication interface, a user-generated encounter; add the user-generated encounter to the first plurality of encounters, wherein each of the first plurality of encounters is available via the communication interface at least a subset of the plurality of users; receive, via the communication interface, a request for the user-generated encounter from a user of the subset of the plurality of users; and transmit, via the communication interface, the user-generated encounter to the user of the subset of the plurality of users.

A game system according to one embodiment of the current disclosure comprises: a processor; and computer memory coupled with the processor and storing a set of processor-executable instructions thereon, the set of processor-executable instructions comprising: a set of instructions that identify, based on information received from a communication interface of a mobile device, an available communication network; a set of instructions that cause a connection to be established, via the communication interface, with the communication network; a set of instructions that receive, via the communication interface and the communication network, first location information detected by a location sensor; a set of instructions that display, on a screen of the mobile device, a plurality of encounter tiles for a computer game; a set of instructions that associate a selected encounter tile from among a plurality of encounter tiles with a physical location based on the first location information; a set of instructions that display, on the screen, an encounter space corresponding to the selected encounter tile, the encounter space comprising a plurality of content spaces; a set of instructions that receive, via a user interface, a selection of one of the plurality of content spaces; a set of instructions that display, on the screen, a plurality of content tiles, at least one of the plurality of content tiles having a first virtual challenge criterion and a first physical challenge criterion; a set of instructions that associate a selected content tile from among the plurality of content tiles with the selected content space; a set of instructions that associate a content tile with each of the plurality of content spaces to yield a completed encounter, the completed encounter corresponding to the selected encounter tile; and a set of instructions that publish the completed encounter via the communication interface of the mobile device.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

Any of the steps, functions, and operations discussed herein can be performed continuously and automatically.

The apparatus, systems, and methods of this disclosure have been described in relation to allowing a user to create virtual and real-world game content. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, etc.), and other hardware known in the art. Some of these devices include processors (e.g., a single or multiple microprocessors, etc.), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using functional or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A digital content creation system, comprising:
    a first memory storing an encounter block set, a content block set, and user data comprising player data and character data associated with the player;
    a sensor data receiver;
    a user interface;
    a display screen;
    a processor; and
    a second memory storing instructions for execution by the processor that, when executed, cause the processor to:
        receive real-world location data via the sensor data receiver, the real-world location data corresponding to a physical location;
        select one or more encounter blocks from the encounter block set based on a combination of the real-world location data and the user data;
        form an aggregated set of encounter blocks that are neighboring one another, wherein each encounter block in the encounter block set comprises multiple edges that define attribute characteristics of the corresponding encounter block;
        validate the aggregated set of encounter blocks to ensure that neighboring tiles in the aggregated set of encounter blocks comprise complimentary edges that mate together based on the attribute characteristics of the neighboring tiles;
        display, on the display screen and in response to the validation, the one or more encounter blocks from the encounter block set and the aggregated set of encounter blocks;
        receive, from the user interface, a user selection that provides an identification of a selected encounter block of the displayed one or more encounter blocks or the displayed aggregated set of encounter blocks; and
        associate, in a computer game, the selected encounter block with the physical location.

2. The digital content creation system of claim 1, wherein the second memory stores additional instructions for execution by the processor that, when executed, cause the processor to:
    display, on the display screen, an encounter space comprising the selected encounter block at the physical location, wherein the encounter space is divided into a plurality of content spaces.

3. The digital content creation system of claim 2, wherein the second memory stores additional instructions for execution by the processor that, when executed, cause the processor to:
    display, on the display screen, one or more content blocks from the content block set, wherein the one or more content blocks are selected based on a combination of the user data and the selected encounter block, and wherein at least one of the content blocks corresponds to a real-world challenge criterion that requires real-world sensor data to be satisfied and an in-game challenge criterion that can be satisfied without requiring real-world sensor data;
    associate, based on a first indication received from the user interface, the user selection with a first selected content block;
    display the first selected content block in a first selected content space;
    associate, based on a second indication received from the user interface, a second selected content block; and
    display the second selected content block in a second selected content space.

4. The digital content creation system of claim 3, wherein the second memory stores additional instructions for execution by the processor that, when executed, cause the processor to:
    adjust, based on a user input received from the user interface, an orientation of the first selected content block relative to the first selected content space.

5. The digital content creation system of claim 3, wherein the first selected content space is adjacent the second selected content space, and further wherein the second selected content block is associated with the second content block space if a second characteristic of the second selected content block matches a first characteristic of the first selected content block.

6. The digital content creation system of claim 2, wherein the second memory stores additional instructions for execution by the processor that, when executed, cause the processor to:
- display a content block from the set of content blocks in each of the plurality of content spaces, wherein at least one of the displayed content blocks corresponds to a real-world challenge criterion that requires real-world sensor data to be satisfied and an in-game challenge criterion that can be satisfied without requiring real-world sensor data;
- receive, from the sensor data receiver, real-world test sensor data;
- validate whether the at least one in-game challenge criterion is satisfied and, based on the real-world test sensor data, whether the at least one real-world challenge criterion is satisfied; and
- update a game state of the computer game based on the validation.

7. The digital content creation system of claim 6, wherein the real-world challenge criterion corresponds to a change in physical location, and the real-world sensor data comprises location data.

8. The digital content creation system of claim 6, wherein the real-world challenge criterion corresponds to a heart rate, and the real-world sensor data comprises pulse data.

9. The digital content creation system of claim 6, wherein the real-world challenge criterion that requires real-world sensor data is based in part a player's physical ability.

10. The digital content creation system of claim 6, wherein the real-world challenge criterion that requires real-world sensor data can be cache and moved to a new physical location.

11. The digital content creation system of claim 6, wherein the real-world challenge criterion that requires real-world sensor data is at least one of the following: a run, a walk, a jog, a run up hill, a climb, a swim, a row, and a preforming of specific motion.

12. The digital content creation system of claim 6, wherein the real-world challenge criterion that requires real-world sensor data is substituted based on a player's impairment.

13. The digital content creation system of claim 2, further comprising scaling the plurality of content spaces based on a player's real-world physical ability.

14. The digital content creation system of claim 1, wherein at least the sensor data receiver, the user interface, the display screen, the processor, and the second memory are provided in a mobile device, the mobile device further comprising a location sensor, a barometer, or an accelerometer.

15. The digital content creation system of claim 1, wherein at least the sensor data receiver, the user interface, the display screen, the processor, and the second memory are provided in a mobile device, the system further comprising:
- a smart watch comprising a sensor, wherein the mobile device is configured to receive real-world sensor data from the sensor of the smart watch via the sensor data receiver.

16. The digital content creation system of claim 1, wherein the player data or the character data comprises one or more of: a player permission level, a character's in game assets, a player subscription level, and a player's authentication level.

17. The digital content creation system of claim 1, wherein the computer game comprises of the following genre of games: a fantasy game, a sci-fi game, a terraforming game, a horror game, a puzzle game, a drama game, a romance game, a rally racing game, an educational game, a sport game, a baseball game, a basketball game, a golf game, a frisbee game, and a curling game.

18. The digital content creation system of claim 1, wherein the processor is further caused to update the one or more selected encounter blocks over time.

19. The digital content creation system of claim 18, wherein the one or more selected encounter blocks are updated based on a player-triggered in-game event.

20. The digital content creation system of claim 19, wherein the in-game event comprises one or more of the following in-game events: a lose life event, a lose health points event, a distance travelled event, a casting spell event, a terraforming event, and an in-game challenge completion event.

21. The digital content creation system of claim 18, wherein the one or more selected encounter block is updated based on a real-world event.

22. The digital content creation system of claim 21, wherein the real-world event comprises one or more of the following real-world events: a weather event, a seasonal event, a natural disaster event, a news store event, and a charity event.

23. A method of creating game content, comprising:
- receiving, at a processor of a mobile device, first location information detected by a location sensor;
- displaying, on a screen of the mobile device, a plurality of encounter blocks selected based on user data for a computer game;
- forming an aggregated set of encounter blocks that are neighboring one another in the computer game, wherein each encounter block in the aggregated set of encounter blocks comprises multiple edges that define attribute characteristics of the corresponding encounter block;
- validating the aggregated set of encounter blocks to ensure that neighboring tiles in the aggregated set of encounter blocks comprise complimentary edges that mate together based on the attribute characteristics of the neighboring tiles;
- displaying, on the screen of the mobile device and in response to the validation, the aggregated set of encounter blocks;
- receiving, via a user interface and a user selection, a selected encounter block from the plurality of encounter blocks or from the aggregated set of encounter blocks;
- associating the selected encounter block from among a plurality of encounter blocks or from the aggregated set of encounter blocks with a physical location based on the first location information;
- displaying, on the screen, an encounter space corresponding to the selected encounter block or the selected aggregated set of encounter blocks, the encounter space comprising a plurality of content spaces;
- receiving, via the user interface and the user selection, a selected content space of the plurality of content spaces;
- displaying, on the screen, a plurality of content blocks selected based on the selected content space and the user data, at least one content file from the plurality of content blocks having a first virtual challenge criterion and a first physical challenge criterion;

receiving, via the user interface and the user selection, a selected content block; and associating the selected content block from among the plurality of content blocks with the selected content space.

24. The method of creating game content of claim 23, wherein the plurality of encounter blocks displayed on the screen comprises a subset of available encounter blocks, the subset selected based on the first location information.

25. The method of creating game content of claim 23, wherein the plurality of content blocks displayed on the screen comprises a subset of available content block, the subset selected based on the selected content space or a characteristic of a content block adjacent the selected content space.

26. The method of creating game content of claim 23, wherein the first physical challenge criterion may be validated only upon receipt, at the processor of the mobile device, of evidence of completion of a physical challenge, the method further comprising:

associating a valid state to the selected encounter block based on the evidence of completion of the physical challenge.

27. The method of creating game content of claim 26, wherein the physical challenge comprises at least one of the following: covering a predetermined distance, climbing a predetermined elevation, achieving a predetermined heart rate, logging a predetermined number of steps, moving the mobile device in a predetermined pattern, playing a predetermined sport, reaching a predetermined location, and purchasing a predetermined product.

28. The method of creating game content of claim 26, wherein the evidence of completion of the physical challenge is received from a location sensor, an altitude sensor, an accelerometer, a heart rate monitor, an optical sensor, a position sensor, an orientations sensor, or a near field communication sensor, the method further comprising:

verifying completion of the physical challenge based on the evidence.

29. The method of creating game content of claim 28, wherein the exercise comprises one of the following exercises: a walk, a run, a jog, a swim, a climb, a boat row, or a gym equipment exercise.

30. The method of creating game content of claim 26, further comprising:

associating a content block with each of the plurality of content spaces, wherein each of the plurality of content spaces not already associated with a content block to yield a completed encounter, the completed encounter corresponding to the selected encounter block with the valid state; and publishing the completed encounter via a wireless communication interface of the mobile device to a game server.

31. The method of creating game content of claim 30, wherein the game server a remote game server located over a network.

32. The method of creating game content of claim 31, wherein the remote game server operates as a transaction server that compensates a content creator.

33. The method of creating game content of claim 23, further comprising:

displaying, on the screen, a map and an encounter block, the encounter block positioned at a specific location on the map;

determining, with the processor and based on second location information received from the location sensor, that the mobile device is located within a predetermined distance of the specific location;

requesting user input regarding the encounter block;

displaying, based on a signal generated by the user interface, a completed encounter space corresponding to the encounter block, the completed encounter space comprising an arrangement of content blocks, at least one of the content blocks comprising a second virtual challenge criterion and a second physical challenge criterion;

determining, with the processor, whether the second virtual challenge criterion is satisfied and, based on sensed real-world data received via a sensor data interface, whether the second physical challenge criterion is satisfied.

34. The method of creating game content of claim 33, further comprising:

updating, based on the determination regarding the second virtual challenge criterion and the second physical challenge criterion, a game state of the computer game.

35. The method of creating game content of claim 23, wherein the computer game comprises at least of the following genre of games: a fantasy game, a sci-fi game, a terraforming game, a horror game, a puzzle game, a drama game, a romance game, a rally racing game, an educational game, a sport game, a baseball game, a basketball game, a golf game, a frisbee game, and a curling game.

36. A system comprising:

a processor;

a communication interface configured to transmit and receive data via a communication network; and a user database comprising information about each of a plurality of users; and a memory storing:

a first plurality of incomplete encounter blocks;

a first plurality of standard content block, one or more of the first plurality of standard content blocks having a virtual challenge criterion and a real-world challenge criterion, the real-world challenge criterion requiring sensed real-world data to be satisfied;

a first plurality of encounters, wherein each of the first plurality of encounters corresponds to a completed encounter block linked to a specific geographical location and comprising a user-configured arrangement of standard content blocks within an encounter space;

an aggregated set of encounter blocks that are formed from at least some of the first plurality of encounters, wherein each encounter block in the encounter block set comprises multiple edges that define attribute characteristics of the corresponding encounter block;

instructions for execution by the processor, that, when executed, cause the processor to:

receive, via the communication interface, a user-generated encounter;

validate the aggregated set of encounter blocks to ensure that neighboring tiles in the aggregated set of encounter blocks comprise complimentary edges that mate together based on the attribute characteristics of the neighboring tiles;

add, in response to the validation, the user-generated encounter to at least one of the first plurality of encounters and the aggregated set of encounter blocks, wherein each of the first plurality of encounters is available via the communication interface at least a subset of the plurality of users;

receive, via the communication interface, a request for the user-generated encounter from a user of the subset of the plurality of users; and transmit, via the communication interface, the user-generated encounter to the user of the subset of the plurality of users.

37. A game system comprising:

a processor; and computer memory coupled with the processor and storing a set of processor-executable instructions thereon, the set of processor-executable instructions comprising:

a set of instructions that identify, based on information received from a wireless communication interface of a mobile device, an available communication network;

a set of instructions that cause a connection to be established, via the wireless communication interface, with the communication network;

a set of instructions that receive, via the wireless communication interface and the communication network, first location information detected by a location sensor;

a set of instructions that display, on a screen of the mobile device, a plurality of encounter blocks for a computer game;

a set of instructions that associate a selected encounter block from among a plurality of encounter blocks with a physical location based on the first location information, wherein each encounter block in the plurality of encounter blocks comprises multiple edges that define attribute characteristics of the corresponding encounter block;

a set of instructions that form an aggregated set of encounter blocks with the selected encounter block and at least one neighboring encounter block;

a set of instructions that validate the aggregated set of encounter blocks to ensure that neighboring tiles in the aggregated set of encounter blocks comprise complimentary edges that mate together based on the attribute characteristics of the neighboring tiles;

a set of instructions that display, on the screen and in response to the validation, an encounter space corresponding to the selected encounter block and the aggregated set of encounter blocks, the encounter space comprising a plurality of content spaces;

a set of instructions that receive, via a user interface, a selection of one of the plurality of content spaces;

a set of instructions that display, on the screen, a plurality of content block, at least one of the plurality of content blocks having a first virtual challenge criterion and a first physical challenge criterion;

a set of instructions that associate a selected content block from among the plurality of content blocks with the selected content space;

a set of instructions that associate a content block with each of the plurality of content spaces to yield a completed encounter, the completed encounter corresponding to the selected encounter block; and a set of instructions that publish the completed encounter via the wireless communication interface of the mobile device.

* * * * *